US012134187B2

United States Patent
Brogardh et al.

(10) Patent No.: US 12,134,187 B2
(45) Date of Patent: Nov. 5, 2024

(54) AGILE ROBOT ARM FOR POSITIONING A TOOL WITH CONTROLLED ORIENTATION

(71) Applicant: COGNIBOTICS AB, Lund (SE)

(72) Inventors: Torgny Brogardh, Molndal (SE); Klas Nilsson, Lund (SE)

(73) Assignee: COGNIBOTICS AB, Lund (SE)

( * ) Notice: Subject to any disclaimer, the term of this patent is extended or adjusted under 35 U.S.C. 154(b) by 231 days.

(21) Appl. No.: 17/782,119

(22) PCT Filed: Dec. 7, 2020

(86) PCT No.: PCT/EP2020/084887
§ 371 (c)(1),
(2) Date: Jun. 2, 2022

(87) PCT Pub. No.: WO2021/122105
PCT Pub. Date: Jun. 24, 2021

(65) Prior Publication Data
US 2023/0010862 A1   Jan. 12, 2023

(30) Foreign Application Priority Data

Dec. 19, 2019 (EP) ..................................... 19217794

(51) Int. Cl.
*B25J 9/00* (2006.01)
*B25J 9/10* (2006.01)
(52) U.S. Cl.
CPC ............. *B25J 9/0072* (2013.01); *B25J 9/104* (2013.01); *B25J 9/1065* (2013.01)
(58) Field of Classification Search
CPC .... B25J 9/1065; B25J 17/0266; B25J 9/0072; B25J 9/0051; B25J 9/1623; B25J 9/0042; B25J 9/06; B25J 9/104
See application file for complete search history.

(56) References Cited

U.S. PATENT DOCUMENTS

2006/0245894 A1   11/2006   Merz et al.

FOREIGN PATENT DOCUMENTS

| EP | 3000565 A2 * | 3/2016 | ............ B25J 9/0018 |
| WO | WO1987003528 | 6/1987 | |

(Continued)

OTHER PUBLICATIONS

English Translation of EP3000565A2 (Year: 2016).*

(Continued)

*Primary Examiner* — Victor L MacArthur
(74) *Attorney, Agent, or Firm* — Shore IP Group, PLLC; Howard J. Klein

(57) ABSTRACT

A robot arm (500) for positioning a tool (44) with controlled orientation. The robot arm (500) comprises an inner-arm linkage (15, 18, 29; 15, 18, 77); an outer-arm linkage (23; 81; 173; 228; 632; 384) and a first actuator (1; 249) configured to rotate the inner-arm linkage about a first axis of rotation (180). The inner-arm linkage includes a first inner link (15) that at an inner end is arranged to rotate around a fourth axis of rotation (185), and a second inner link (18) that at an inner end is arranged to rotate around a different, third axis of rotation (182, 185), wherein the axes of rotation (182, 185) are perpendicular to the first axis of rotation (180), and the rotations result in a geometric reconfiguration of the inner-arm linkage. The inner-arm linkage also includes a connection shaft (29; 77) mounted at an outer end of the first inner link and at an outer end of the second inner link by means of joints of at least one degree of freedom, is connected to the outer-arm linkage via the connection shaft, is connected to the tool and forms a first kinematic chain that gives a first degree of freedom for positioning the tool. A second actuator (2; 254) is configured to rotate the outer-arm linkage around the second axis of rotation, thereby forming a second kinematic chain giving a second degree of freedom (Continued)

for positioning the tool. A third actuator (3) is configured to move the outer-arm linkage by actuating the geometrically reconfigurable inner-arm linkage, resulting in a movement of the second axis of rotation around which the outer-arm linkage is arranged to rotate, thereby forming a third kinematic chain giving a third degree of freedom for positioning the tool. The robot arm also comprises one or more transmission mechanisms that in combination with the outer-arm linkage are arranged to accomplish the controlled orientation of the tool.

20 Claims, 35 Drawing Sheets

(56) References Cited

FOREIGN PATENT DOCUMENTS

| WO | WO2014187486 | 11/2014 |
|----|--------------|---------|
| WO | WO2015188843 | 12/2015 |
| WO | WO2019138025 | 7/2019 |

OTHER PUBLICATIONS

International Search Report on corresponding PCT application (PCT/EP2020/084887) from International Searching Authority (EPO) dated Mar. 4, 2021.
Written Opinion on corresponding PCT application (PCT/EP2020/084887) from International Searching Authority (EPO) dated Mar. 4, 2021.

\* cited by examiner

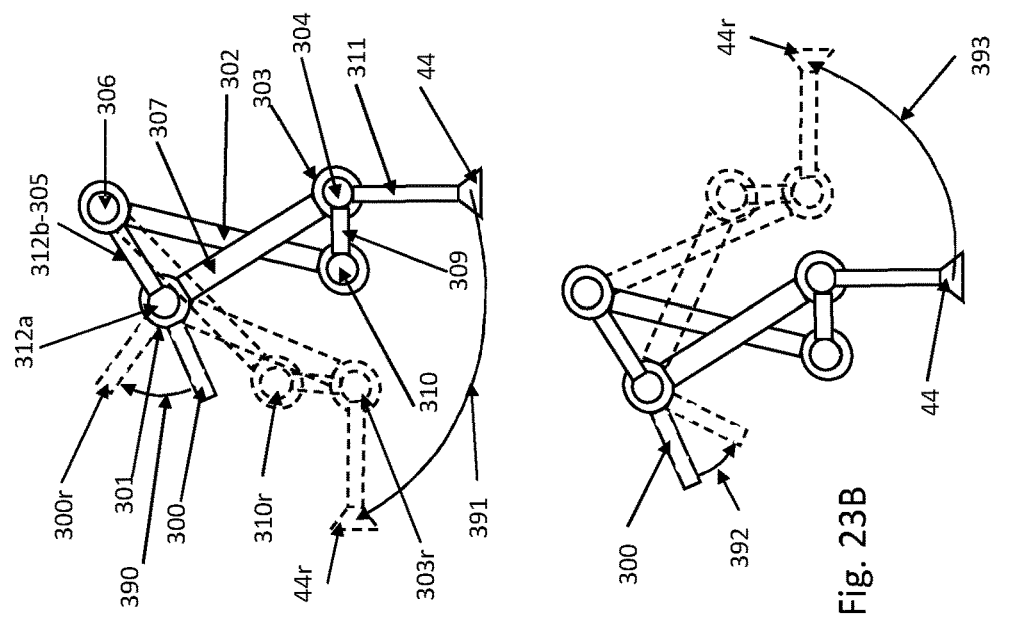
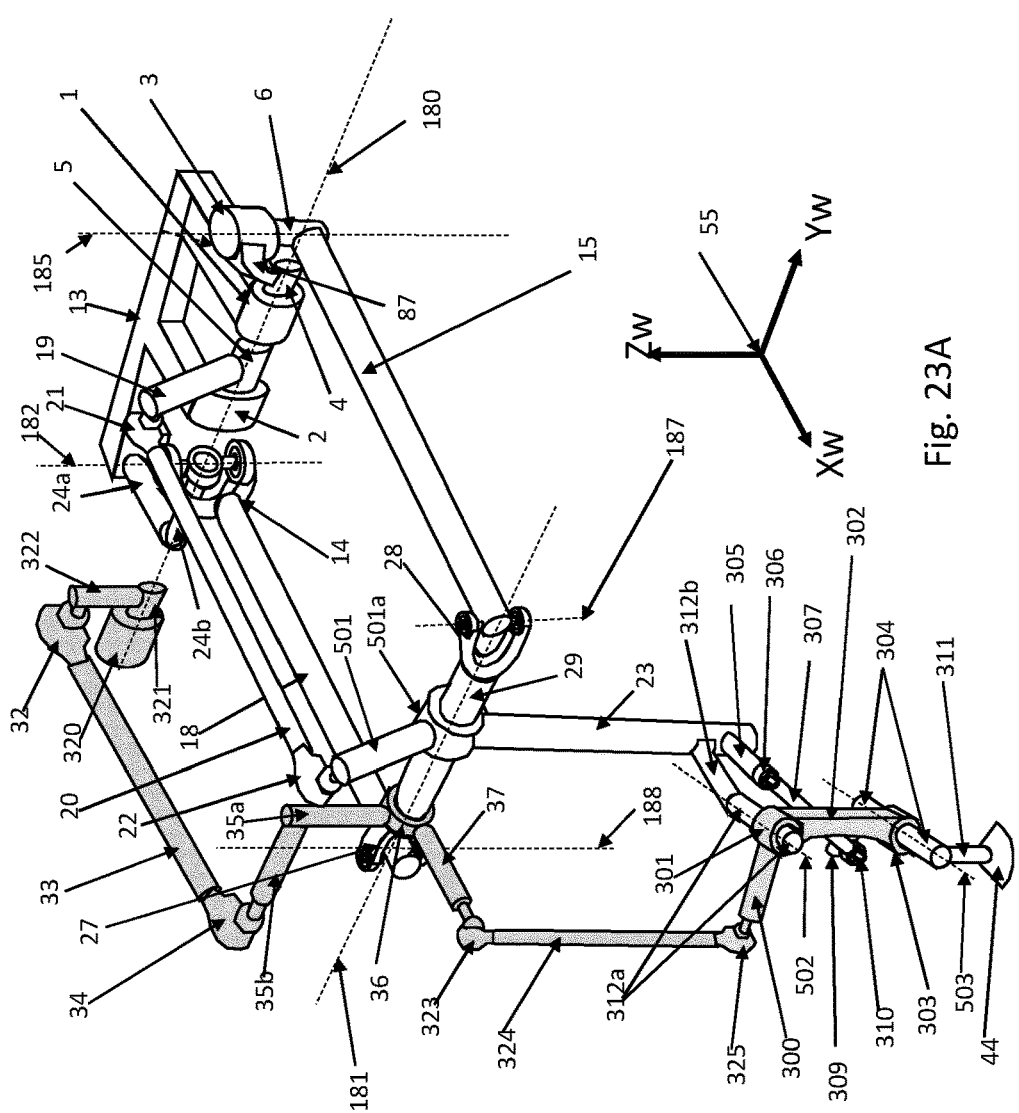
Fig. 23A
Fig. 23B

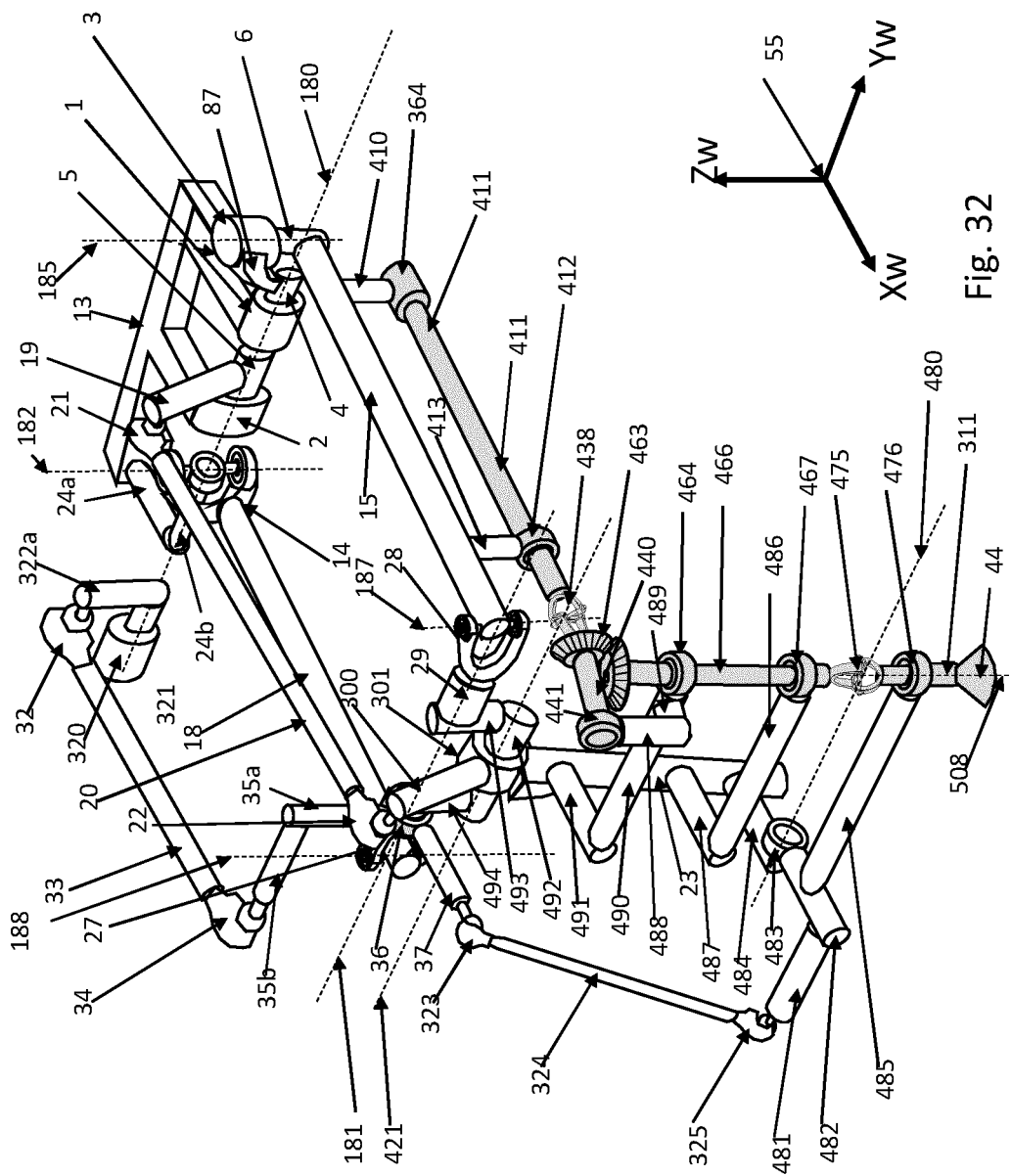

AGILE ROBOT ARM FOR POSITIONING A TOOL WITH CONTROLLED ORIENTATION

CROSS-REFERENCE TO RELATED APPLICATION

This application is the National Phase, under 35 U.S.C. § 371(c), of International Application No. PCT/EP2020/084887, filed Dec. 7, 2020, which claims priority from European Application No. EP 19217794.7, filed Dec. 19, 2019.

FEDERALLY SPONSORED RESEARCH OR DEVELOPMENT

Not Applicable.

TECHNICAL FIELD

The present disclosure belongs to the technical field of industrial robots, and in particular to lightweight robot structures for very fast processes, for extremely fast movements of objects and for high safety robot installations.

BACKGROUND

High safety installations are needed for example at direct collaboration between human and robot and when it is an advantage to use fenceless robot installations. Looking at the state of art, there are parallel kinematic robots (as the Delta robot described in WO1987003528A1), which have all the actuators mounted on a fixed stand and where it is therefore possible to obtain a lightweight structure. However, these parallel kinematic robots have the disadvantage that the arm system occupies a very large space and that therefore the workspace is very small in relation to the space needed for the arm system. As a consequence, these robots can only be used for applications where a large space is available for the arm system and where it is sufficient to have a very restricted workspace, especially in the vertical direction. Thus, the Delta robot is mainly used for pick- and place operations above a flat surface such as a conveyor belt with plenty of space for the robot arm structure.

In the publication WO2014187486, the proposed slim parallel structures will give a larger workspace in relation to the space needed for the arm system, in comparison with for example the Delta robot. In the robot structure of the publication WO2014187486, a first actuator is driving a first arm about a first axis, a first kinematic chain is configured to transmit rotation of the first arm to the movement of an end-effector and the first kinematic chain has a first rod and a first joint between the first arm and the first rod. The first joint has at least two degrees of freedom (DOF) and a second joint is mounted between the first rod and the end-effector. To operate without losing constraints on the six DOF of the end-effector, the design according to WO2014187486 relies on the torsional stiffness of the first rod. However, this means that both the first joint and the second joint of the first rod must have two DOF and not more, which in turn means that it will not be possible to obtain constant tilting angle of the end-effector more than in the middle of the workspace. Therefore, the slim robot concept according to WO2014187486 requires a two DOF wrist even in simple pick- and place operations over a horizontal surface. However, such a wrist will add a substantial weight and the robot will not have an as light-weight arm system as for example a Delta robot. Moreover, cabling will be needed to transmit power and to control the actuators of the wrist.

In the publication WO2015188843, a parallel kinematic robot is described comprising a base and an end-effector that is movable in relation to the base. A first actuator is attached to the base and connected to the end-effector via a first kinematic chain comprising a first arm, a first rod, a first joint between the first arm and the first rod, and a second joint between the first rod and the end-effector. A second actuator is attached to the base and connected to the end-effector via a second kinematic chain comprising a second arm, a second rod, a third joint between the second arm and the second rod, and a fourth joint between the second rod and the end-effector. A third actuator is attached to the base or to the first arm, and connected to the end-effector via a third kinematic chain comprising a first gear wheel and a second gear wheel, the first and second gear wheels being journaled in bearings to the end-effector and intermeshing with each other. At least one element of the third kinematic chain constitutes a kinematic pair with at least one element of the first kinematic chain. A kinematic chain responsible for a translational movement of the end-effector is thereby utilized as a support structure for a kinematic chain responsible for a rotational movement of the end-effector.

In contrast to the slim structures in WO2014187486, WO2015188843 describes a robot structure needing very large space for its arm system. It comprises three separate kinematic chains directly connecting three actuators with the end-effector platform to be moved and therefore significant space is needed for three arms swinging in three different directions.

WO2015188843 includes an arrangement for rotating a tool mounted on the end-effector platform. The arrangement in FIG. 1 of WO2015188843 consists of serially working links and gears. These links are mounted on two of the three separate kinematic chains connecting the actuators with the end-effector platform and restrict the already limited positioning capability. These restrictions depend on the fact that the links are mounted on two separate kinematic chains, on how the connections of the serially working links are made, and on the fact that the working range of the links are reduced significantly when the arms are rotated away from their zero positions. In FIG. 1 of WO2015188843 a rotation of the tool around a first axis will simultaneously rotate the tool around the second axis and to compensate for this, the rotation range will be lost for the second axis. Moreover, the rotation capability will be severely reduced and achieve a large offset the further the end-effector platform is moved away from the center of the workspace. However, the arrangement in FIG. 2 of WO2015188843 will give large rotation ranges but will reduce the limited workspace even more than the concept described in FIG. 1 of WO2015188843. One reason for this is the need of cardan joints in the links between the arms and the end-effector platform. Moreover, several serially connected gear steps are needed in the kinematic chain used to rotate the tool. This will increase arm and end-effector platform weight, increase backlash and friction, and increase the requirements on maintenance.

WO2019138025 describes a PKM that reduces or solves at least some of the problems described above. However, this PKM use at least two parallelograms arranged in the outer arm system, which in some circumstances gives problems with accessibility when used for example for packaging in boxes. The two parallelograms in WO2019138025 are needed to obtain parallel movements of the tool in one direction. In order to obtain parallel movements of the tool in a second direction, a third parallelogram arrangement is used in the outer arm system of WO2019138025.

SUMMARY

It is an objective of the disclosure to provide a robot arm that removes disadvantages with prior art. It is a further objective to provide a robot arm that is space saving at the same time capable of providing three degrees of freedom for positioning a tool with controlled orientation. It is a further objecting to provide a robot arm that is light-weight compared to other robots.

These objectives and others are at least partly achieved by the robot arm according to the independent claims, by the embodiments according to the dependent claims.

According to a first aspect, the disclosure relates to a robot arm for positioning a tool with controlled orientation. The robot arm comprises an inner-arm linkage and an outer-arm linkage. The robot arm also comprises a first actuator configured to rotate the inner-arm linkage about a first axis of rotation. The inner-arm linkage includes a first inner link that at an inner end is arranged to rotate around a fourth axis of rotation, and a second inner link that at an inner end is arranged to rotate around a different, third axis of rotation, wherein the axes of rotation are perpendicular to the first axis of rotation, and the rotations result in a geometric reconfiguration of the inner-arm linkage. The inner-arm linkage also includes a connection shaft mounted at an outer end of the first inner link and at an outer end of the second inner link, by means of joints of at least one degree of freedom. The inner-arm linkage is connected to the outer-arm linkage via the connection shaft. The outer-arm linkage is pivotably arranged to rotate around a second axis of rotation that is parallel or aligned with the connection shaft and is connected to the tool. The inner-arm linkage and the outer-arm linkage thereby forms a first kinematic chain from the first actuator to the tool, which gives a first degree of freedom for positioning the tool. The robot arm also comprises a second actuator configured to rotate the outer-arm linkage around the second axis of rotation, thereby forming a second kinematic chain from the second actuator to the tool, which gives a second degree of freedom for positioning the tool. The robot arm further comprises a third actuator configured to move the outer-arm linkage by actuating the geometrically reconfigurable inner-arm linkage, resulting in a movement of the second axis of rotation around which the outer-arm linkage is arranged to rotate, thereby forming a third kinematic chain from the third actuator to the tool. This gives a third degree of freedom for positioning the tool. The robot arm further comprises one or more transmission mechanisms that in combination with the outer-arm linkage are arranged to accomplish controlled orientation of the tool.

The robot arm provides three degrees-of-freedom for positioning the tool with controlled orientation in a compact way. This makes the robot arm suitable for applications in restricted spaces, where the tool needs to have constant orientation or be rotated in one or more degrees of freedom without any heavy and bulky wrist including actuator equipment.

According to some embodiments, the first inner link and the second inner link of the inner-arm linkage are parts of a first kinematic parallelogram. This parallelogram is defined by crossing points of rotation axes of the mountings of the outer and inner ends of the inner links and guarantees that when a first outer link, as mounted to rotate around an axis parallel or aligned with the rotation axis defined as the line between the crossing points of the rotation axes of the two inner links, will always move the tool without any rotation around its vertical axis and without any tilting around an axis parallel with the horizontal axis perpendicular to the rotation axis of the first outer link. By this well-defined kinematic requirement, it is for example possible to pick and place objects on a plane without changing the orientation of the objects and the possibility to pick hanging objects along a conveyor and always make the pick from the same direction.

According to some embodiments, the first kinematic parallelogram is configured to rotate around the first axis of rotation. In this way it is possible to move the tool in vertical direction constant tool orientation and with constant pick direction for hanging objects.

According to some embodiments, the outer-arm linkage is configured to be rotated with one degree of freedom in a second plane perpendicular to a first plane of the first kinematic parallelogram. This is a requirement to obtain the situation that the tool will always be perpendicular to a plane, which is parallel with the rotation axis of the parallelogram. This plane is in the applications defined as the plane on which the objects that will be picked and/or placed are situated. It is also a requirement in order to pick and/or place hanging objects when the operation must be made in vertical direction.

According to some embodiments, the second kinematic chain comprises a lever mechanism and at least one link, wherein the at least one link connects the lever mechanism to the outer-arm linkage and wherein the second actuator is configured to rotate the outer-arm linkage by actuating the lever mechanism. In this way an efficient light weight concept to move the tool horizontally in and out relative the base is obtained.

According to some embodiments, wherein one of the one or more transmission mechanisms is arranged for rotating the tool around a first axis of rotation of the tool. This makes it possible to either have constant tool tilting angle or to tilt the tool and/or rotate the tool without the use of any bulky and heavy actuators. These actuators are usually electrically driven and need cables that may break with difficult consequences. The electrical system is also dangerous in for example explosive environments.

According to some embodiments, another one of the one or more transmission mechanisms is arranged for rotating the tool around a second axis of rotation of the tool being non-parallel to the first axis of rotation of the tool. This makes it possible to obtain picking of an object in one orientation angle and at one tilt angle and then place the object in another or the same orientation angle and at another or the same tilting angle. Properties needed for picking and placing of for example objects on flat conveyors, leaning objects and hanging objects. This may also be used for processes with symmetrical tools as gluing, painting and cutting.

According to some embodiments, wherein one of the one or more transmission mechanisms includes a bearing with its axis of rotation parallel with or coinciding with the second axis of rotation. This is a good way, with respect to the tool working range for orientation and tilt, to mount the transmission mechanism. This bearing can also be placed on the outer part of one of the inner links, but then the kinematics for the transmission mechanism will not be as efficient.

According to some embodiments, the one or more transmission mechanisms comprises one or more levers configured to transform a rotation to a translation or a translation to a rotation. Thereby the robot can be made more compact, and still achieve the desired orientation.

According to some embodiments, the one or more transmission mechanisms comprises one or more links. A transmission of this type is easy to implement and is useful in applications where infinite rotation is not needed.

According to some embodiments, an inner link of the one or more links has a same kinematic length between its axes of rotation, as the kinematic length of the first inner link between its axes of rotation. In this way an optimal transmission mechanism is obtained with respect to the range of orientation and/or tilt of the tool. It also makes it possible in one design to obtain constant tool tilt angle without any fourth actuator.

According to some embodiments, an outer link of the one or more links and the outer-arm linkage are parts of a second kinematic parallelogram. In this way an optimal transmission mechanism is obtained with respect to the range of orientation and/or tilt of the tool.

According to some embodiments, an inner link of the one or more links is mounted to a base via a joint. With the two previous requirements fulfilled, this makes it possible to obtain constant tilt angle in the whole work-space without the use of any fourth actuator.

According to some embodiments, the robot arm comprises one or more actuators each configured to control an axis of rotation of the tool via one of the one or more transmission mechanisms. The one or more transmission mechanisms comprises one or more of a link transmission, a backhoe transmission, a gear wheels transmission, a belt transmission, a rotating shaft transmission and a cardan joint transmission, connecting one of the one or more actuators with the tool. Thus, the controlled rotation of the tool may be accomplished in a plurality of different ways. When constant tilt angle as obtained above with constant tool orientation is not enough, actuators are needed on the robot arm base or on the inner arms to control the orientation and/or tilt angles of the tool via the one or more transmission mechanisms.

According to some embodiments, the backhoe transmission is configured to increase the rotational movement of one of the one or more additional actuators to a corresponding increase of rotation of an axis of rotation of the tool. This is an efficient way to obtain larger working range for the orientation and tilting of the tool. With respect to tilting it will easily make it possible to pick and place hanging objects in the whole work-space. If a link transmission without backhoe is used, the tool can only be used for picking and placing leaning objects. The backhoe also makes it possible to rotate the tool (at least) one revolution, which is important in many applications.

According to some embodiments, the gear wheels transmission comprise two or more gear wheels of different sizes arranged to transmit a rotational movement of one of the one or more additional actuators to a corresponding rotation of an axis of rotation of the tool. This is another way to obtain larger working ranges for orientation and tilting of the tool. One advantage over backhoe is the possibility to make light weight compact gears in for example plastics. One disadvantage is lower life-time expectancy if light weight plastic gears are used.

According to some embodiments, the one or more transmission mechanisms comprises one or more belt transmissions. In this way it will be possible to obtain infinite rotation of the tool, which will reduce cycle times when objects having random orientation are picked and placed in a certain orientation. Then the most efficient control is to move the tool from present orientation angle to next orientation angle with the shortest change in orientation angle.

According to some embodiments, wherein one of the one or more belt transmissions is arranged for rotating the tool around a first axis of rotation of the tool without rotational angular limits. As mentioned above, the most important use of a belt transmission is to rotate the tool in such a way that objects can be picked and place at different orientations and always move from present orientation angle to next orientation angle with the shortest change in orientation angle.

According to some embodiments, wherein another one of the one or more belt transmissions is arranged for rotating the tool around a second axis of rotation of the tool without rotational angular limits, the second axis of rotation being non-parallel with the first axis of rotation of the tool. This means that for example the tool can also make efficient picking and/or placing of objects place in different directions on a leaning or vertical plane. It will also make it possible to perform processes with symmetric tools in complicated geometries without making stops to rewind the tool.

According to some embodiments, at least one of the belt transmissions is connected in series with at least one cardan joint.

According to some embodiments, an inner link or inner transmission of at least one of the one or more transmission mechanisms is parallel with the first inner link and the second inner link, and an outer link or outer transmission of at least one of the one or more transmission mechanisms is parallel with an outer arm of the outer arm linkage. In this way an optimal kinematic design of the transmission mechanisms is obtained. This means that the transmission mechanism will make a minimum reduction of the position workspace of the robot arm.

According to some embodiments, the one or more transmission mechanisms comprises a fourth transmission mechanism and a fifth transmission mechanism, each configured to control a different axis of rotation of the tool.

According to some embodiments, at least one of the first inner link and the second inner link is configured to rotate around an axis that is fixed to a base and is aligned to the first axis of rotation. This is a prerequisite in order to obtain the needed targeted kinematic property of the robot arm.

According to some embodiments, the second axis of rotation is parallel with the first axis of rotation. This is also a kinematic requirement for the targeted property of the robot arm.

According to some embodiments, the one or more transmission mechanisms comprises one or more cardan joints and where the one or more cardan joints are mounted in such a way that the joint center of each cardan joint is on an axis defined by a center line of a shaft or axis of rotation of a bearing. In this way it is possible to transmit infinite rotations to links or transmissions rotating around the center line of a shaft or a rotation axis of a bearing. This will result in efficient transmission of actuator rotations to the tilting and/or rotation of a tool even at large rotations of the inner and outer arm linkages.

According to some embodiments, the one or more transmission mechanisms comprises a tilting mechanism including a tilting lever, a tilting beam with a first beam bearing in one end of the tilting beam and a second beam bearing in the other end of the tilting beam, a first beam shaft mounted in the first beam bearing, a second beam shaft mounted in the second beam bearing, and wherein the first beam shaft is mounted on the first outer link of the outer arm linkage, the second beam shaft is connected to the tool, and a link connected between the first beam shaft and the second beam shaft via a bearing at each end of the link, wherein the tilting mechanism is configured to transfer a tilting movement of the tilting lever to a correspondingly increased tilting movement of the tool. In this way it is possible to obtain large tool tilting angles in the whole workspace of the robot, meaning that even with large rotations of the inner and outer arm linkages, large tool tilting angles can be achieved.

According to some embodiments, the one or more transmission mechanisms comprises a shaft mechanism including a first shaft part and a second shaft part connected by a bearing with its center of rotation coinciding with center lines of the two shaft parts, a tube configured to rotate, and wherein the shaft parts and the bearing are mounted to slide inside the tube, where one of the shaft parts is arranged to follow the rotation of the tube. This makes it possible to transmit both a rotation and translation in one link, which means a compact design for the transmission mechanism. The transmission can be used for transmission of rotation and tilting of the tool, whereby a compact connection to the tool is also obtained.

According to some embodiments, the one or more transmission mechanisms comprises a rotating shaft mounted above or under one of the first inner link and the second inner link and wherein the rotating shaft is configured to rotate at least one cardan joint. In this way it is possible to mount the cardan joint in such a way that its center will be located in the cross between two axes and it is not necessary to use one cardan joint for each axis. Thus, this will give a simpler and more compact transmission when passing the two axes, defined by the center line of a shaft or axis of rotation of a bearing

BRIEF DESCRIPTION OF THE DRAWINGS

FIG. 23A illustrates a robot arm according to a fourteenth embodiment of the disclosure.

FIG. 23B illustrates kinematics of a tilting mechanism for tool rotation in FIG. 23A.

FIG. 32 illustrates a robot arm according to a twenty-third embodiment of the disclosure.

DETAILED DESCRIPTION

Figure 1:
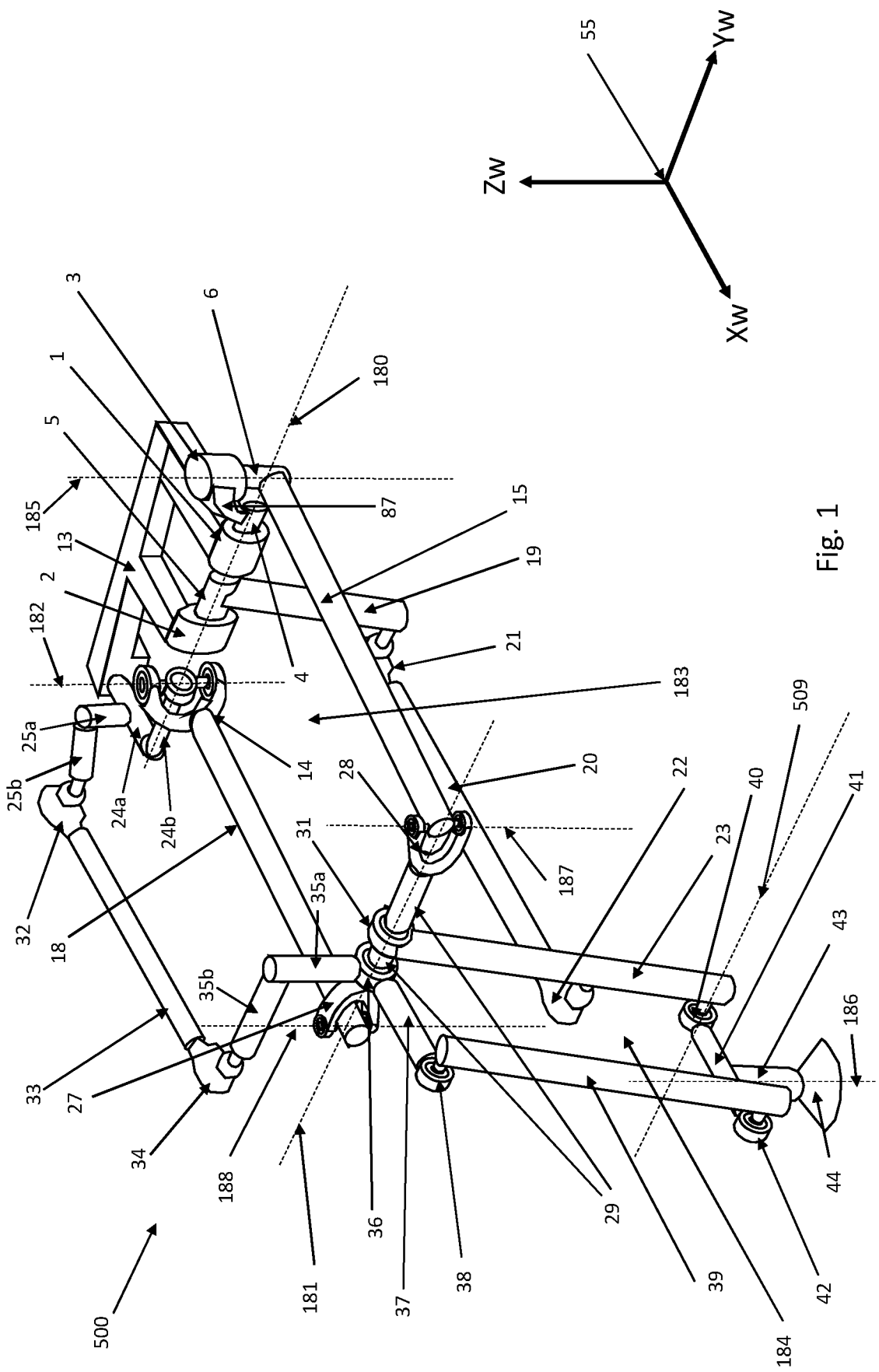
FIG. 1 illustrates a robot arm according to a first embodiment of the disclosure.

In the following disclosure, a robot arm will be described that enables three degrees-of-freedom (DOF) and controlled rotation of a tool, in a light and compact way. The robot arm comprises three kinematic chains establishing three axes, that each is effective in positioning the tool, and one or more transmission mechanisms that are effective in controlling orientation of the tool. The robot arm comprises an inner-arm linkage that changes its configuration when actuated in order to give one of the three DOFs. This inner-arm linkage is also part of one of the other kinematic chains for positioning the tool. This means that one axis of the robot arm is accomplished by re-configuring another axis of the robot arm, which will be more explained in the following. The re-configurable inner-arm linkage gives the robot arm a compact shape while still allowing a large working space. Also, the arrangement enables the actuators to be arranged at a base, and not distributed in the robot arm.

An actuator as disclosed herein is for example a motor configured to rotate an outgoing shaft in one axis of rotation. An actuator may comprise one or more gears and one electric motor. The motor is then often mounted beside the gear, driving the one or more gear with a gear wheel or band transmission and therefore only the output shaft of the gear needs to define the rotation angle of the actuator.

A tool is for example a gripper (e.g. a mechanical claw, a controlled vacuum cup, an electromagnetic unit) or other such as a glue pistol, a laser pistol, a deburring tool, a water jet cutting nozzle. The tool may also be referred to as an end-effector.

An inner-arm linkage comprises a plurality of links connected with joints such that the configuration of the inner-arm linkage can be re-configured without losing stability. The joints of the inner ends of the inner links may have two DOF. The joints at the outer ends of the inner links may have one or two DOF.

An outer arm-linkage comprises an outer link that is connected to the inner-arm linkage. The outer-arm linkage follows the movement of the inner-arm linkage.

A transmission mechanism is herein defined to be a mechanical system capable of transferring a movement from an actuator, or a fixed orientation of a base, to a tool. A transmission mechanism may comprise one or more of a link transmission, a backhoe transmission, a gear wheels transmission, a belt transmission and a rotating shaft transmission.

A link transmission comprises one or more links connected with joints. The link transmission may be referred to as a kinematic chain.

A backhoe transmission comprises a plurality of links connected by means of joints. The plurality of links is connected in such a way that they increase the rotational movement of a thereto connected actuator to a corresponding increase of rotation of an axis of rotation of the tool. The backhoe transmission may be referred to as a backhoe mechanism.

A gear wheel transmission comprises two or more gear wheels of different sizes arranged to transmit a rotational movement of an actuator to a corresponding rotation of an axis of rotation of the tool.

A belt transmission comprises one or more belts, where each belt is arranged around wheels mounted on rotating shafts to transmit a rotational movement of an actuator to a corresponding rotation of an axis of rotation of the tool. Each belt is made of a flexible material or a chain. A belt transmission may be referred to as a belt transmission mechanism.

A rotating shaft transmission is a shaft, which transfers a rotation in one of its ends to its other end. The shaft is mounted through at least one bearing with its rotation axis aligned with the center axis of the shaft.

A link is herein defined to be a mechanical part of a linkage, connecting adjacent parts via joints. A link, as such, can be elastic, or it can be designed to have a variable stiffness, or it can be designed to have elastic and stiff modes depending on the selected mode of operation, or it can be considered to be a rigid body as in a mechanism design based on analysis of kinematic chains. For brevity of the following description, a link is assumed to be a rigid body.

A joint is herein defined to be designed to connect a link with another link or structure, such that motion in at least one degree of freedom is allowed.

A kinematic parallelogram is herein defined by four lines between four points in a plane, where the lines form a closed structure and where the length of opposing lines is the same.

In the implementation of the parallelogram in this invention, the points are defined by crossing rotation axes, formed by bearings.

An agile robot arm is a robot arm that is able to move quickly and lightly. It has a kinematic structure arranged to facilitate minimum inertia by use of light-weight materials for linkages that can be actuated by actuators (motors) located close to a robot base.

A parallel kinematic manipulator (PKM) is defined to be a mechanical structure for manipulation of objects using parallel kinematic linkages forming kinematic loops. In this disclosure the robot arm and includes between two and five kinematic loops. However, from a strict academic terminology, it is not a Parallel Kinematic Manipulator (PKM) but a Hybrid Kinematic Manipulator, also defined as a Parallel-Serial Manipulator. The academic definition for a Parallel Kinematic Manipulator requires that the parallel kinematic linkages forming the kinematic loops connect the actuators directly with the manipulated platform.

The same references are used for the same features in all figures and will not be repeated where already mentioned.

It will furthermore be understood that although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

For clarity of the following description, we refer to an arrangement with tool positioning in Xw, Yw and Zw direction relative to a robot base or framework, and for tool orientation(s) in one (1) or several DOF. Tool orientation include tool rotation, for example rotation around a tool-connecting shaft, or tool tilting around some axis non-parallel with (e.g. perpendicular to) the tool-connecting shaft, or both for five DOF. As will be evident from the following description, the different transmissions for tool orientation can be combined such that all actuators can still be fixed to the robot stand. Thus, more than 5 DOF is possible, but for simplicity not explained in any detail.

FIG. 1 illustrates a robot arm 500 according to a first embodiment. This robot arm 500 designed to move a tool 44 parallel with the XwYw-plane of world coordinate system 55 and always with constant rotation angle perpendicular to the XwYw-plane. This is an important feature in material handling and pick and place operations.

The robot arm 500 comprises an inner-arm linkage 15, 18, 29, an outer-arm linkage, a first actuator 1, a second actuator 2 and a third actuator 3. The robot arm 500 is thus configured to be actuated by the first, second and third actuators 1, 2, 3. The first actuator 1 is mounted on the fixed base 13, that is a fixed framework of the robot arm 500. The first actuator 1 has an outgoing shaft 4 arranged to rotate around a first axis of rotation 180. As the first actuator 1 is fixed to the base, this means that also the first axis of rotation 180 is fixed in relation to the base 13.

The inner-arm linkage includes a first inner link 15, a second inner link 18 and a first connection shaft 29. The first inner link 15 comprises an inner end and an outer end. The first inner link 15 is at its inner end connected to an outgoing shaft 6 of a third actuator 3, that is mounted to the outgoing shaft 4 of the first actuator 1 via a bracket 87. The outgoing shaft 4 is thus connected to the first inner link 15. The first inner link 15 is arranged to rotate around a fourth axis of rotation 185 of the third actuator 3. The fourth axis of rotation 185 is perpendicular to the first axis of rotation 180.

At the outer end, the first inner link 15 is connected to the first connection shaft 29 via a joint 28 with at least one DOF. The second inner link 18 comprises an inner end and an outer end. The second inner link 18 is at its inner end connected to a joint 14. The joint 14 is here connected to a base 13 via attachment mechanic part 24a, 24b. The attachment mechanic part 24a, 24b comprises a first connection 24a and a shaft 24b. The second inner link 18 is mounted on the shaft 24b by means of the joint 14. Joint 14 comprises a bracket and three bearings. Two of the bearings have a common third axis of rotation 182 and are mounted on the third bearing, which axis of rotation coincides with axis of rotation 180. Thus, the center of shaft 24b, on which the third bearing of joint 14 is mounted, will also coincide with the axis of rotation 180. The shaft 24b is mounted on the base 13 via the first connection 24a.

The first inner link 15 is arranged to rotate around the fourth axis of rotation 185 of the joint 14 that is perpendicular to the first axis of rotation 180. At the outer end, the second inner link 18 is connected to the first connection shaft 29 via a joint 27 with at least one DOF. The first connection shaft 29 is thus mounted to the first inner link and second inner link by means of joints 27, 28.

The inner-arm linkage is connected to the outer-arm linkage via the first connection shaft 29. The first connection shaft 29 is as explained mounted between the first inner link 15 and the second inner link 18 by means of the two joints 28 and 27. Each of these joints 28, 27 has a bracket with two bearings, thus a bearing pair, which are mounted on the first inner link 15 and the second inner link 18, respectively. The bearing pairs of these joints have a common axes 188 and 187, respectively, perpendicular to the main extension of the inner links 18, 15. A second axis of rotation 181 is defined by the center of the first connection shaft 29 and should cross the axes of rotation 188 and 187. The second axis of rotation 181 is parallel with the first axis of rotation 180. The axis 188 is referred to as a fifth axis of rotation and the axis 187 is referred to as a sixth axis of rotation.

The outer-arm linkage here comprises a first outer link 23. The first outer link 23 is at one end connected to the first connection shaft 29 via a first connection bearing 31, and at the other end connected to a tool 44 via a tool connecting lever 41 and a tool mounting beam 43. The tool mounting beam 43 may also be referred to as an orientation axis of the tool 44. The outer-arm linkage is pivotably arranged to rotate around the second axis of rotation 181 that is aligned with the first connection shaft 29.

The inner-arm linkage and the outer-arm linkage connected with the first connection shaft 29 forms a first kinematic chain from the first actuator 1 to the tool 44, which gives a first degree of freedom for positioning the tool 44.

When the first actuator 1 rotates outgoing shaft 4, the first inner link 15 will rotate correspondingly up and down around the center axis of the outgoing shaft 4, thus the first axis of rotation 180. This movement causes a movement in the Zw-direction. A rotation of the first inner link 15 will cause a corresponding rotation of the second inner link 18, as they are connected via the first connection shaft 29. Thus, the first actuator 1 is configured to rotate the inner-arm linkage about the first axis of rotation 180. Thus, the first inner link 15 and the second inner link 18 are configured to rotate around an axis of rotation 180 that is fixed in relation to the base 13.

The second actuator 2 of the robot arm 500 is configured to rotate the outer-arm linkage around the second axis of rotation 181, thereby forming a second kinematic chain from the second actuator 2 to the tool 44. This gives a second degree of freedom for positioning the tool 44. The second kinematic chain comprises a lever mechanism and a link 20. The link 20 is connected between the lever mechanism and the outer-arm linkage. The link 20 connects the lever mechanism to the outer-arm linkage. The second actuator 2 is configured to rotate the outer-arm linkage by actuating the lever mechanism. More in detail, the second actuator 2 comprises an outgoing shaft 5. The second actuator 2 is fixed to the base 13. The outgoing shaft 5 is connected to an inner lever 19, which in turn is connected to an end of the link 20 via a joint 21. The link 20 is at its other end connected to the first outer link 23 of the outer-arm linkage. When the second actuator 2 rotates output shaft 5, the outer-arm linkage will swing around the second axis of rotation 181 of the first connection bearing 31, which is mounted in the upper end of first outer link 23. The lever mechanism thus comprises at least the inner lever 19. In FIG. 1 the center of shaft 5 is mounted to coincide with axis of rotation 180, which is an advantage but not necessary.

The third actuator 3 is configured to rotate its outgoing shaft 6 around the fourth axis of rotation 185, here a vertical axis. The fourth axis of rotation 185 here cross first axis of rotation 180 and these axes of rotation 180, 185 are perpendicular to each other. The outgoing shaft 6 is mounted to the first inner link 15, and when the outgoing shaft 6 rotates around the fourth axis of rotation 185, the first inner link 15 will also rotate around the fourth axis of rotation 185. As the first inner link 15 and the second inner link 18 are connected, the rotation of first inner link 15 will also cause a rotation of the second inner link around the third axis of rotation 182. The thereby caused rotation of the first inner link 15 around the fourth axis of rotation 185 and the rotation of the second inner link 18 around third axis of rotation 182 results in a geometric reconfiguration of the inner-arm linkage. It also results in movement in the Yw-direction. Thus, the first inner arm 15 and the second inner arm 18 are actuated to simultaneously rotate around a common geometric axis of rotation, thus the first axis of rotation 180. The inner arms 15, 18 may simultaneously be actuated to rotate around a respective geometric axis of rotation 182, 185 at the inner ends of the inner arms 15, 18. These respective geometric axes of rotation 182, 185 are parallel with each other, and perpendicular to the first axis of rotation 180. Thus, the first inner link 15 is at an inner end arranged to rotate around a fourth axis of rotation 185. The second inner link 18 is at an inner end arranged to rotate around a different, third axis of rotation 182. The rotations result in a geometric reconfiguration of the inner-arm linkage. The first inner link 15 and the second inner link 18 are in this embodiment parts of a first kinematic parallelogram 183. This first kinematic parallelogram 183 is defined by crossing points of rotation axes of the mountings of the outer and inner ends of the inner links 15, 18. The outer linkage 23, as mounted to rotate around an axis parallel or aligned with the rotation axis defined as the line between the crossing points of the rotation axes at the outer ends of the two inner links 15, 18, will then always move the tool 44 without any rotation around its vertical axis and without any tilting around an axis parallel with the horizontal axis perpendicular to the rotation axis of the outer linkage 23. In this embodiment, the first inner link 15 and the second inner link 18 are parallel. During the geometric reconfiguration, they remain parallel. The parallel movements in the Yw-direction is thus obtained by means of a first parallelogram 183 that is connected to at least the first actuator 1 and the third actuator 3. Further, a first plane formed by the first parallelogram 183 is actuated to rotate around the axis of a first actuator 1, thus, the first axis of rotation 180. In other words, the kinematic parallelogram 183 is configured to rotate around the first axis of rotation 180. Furthermore, third actuator 3 is arranged to swing the first inner link 15 and the second inner link 18 in the first plane of the first parallelogram 183, thereby changing the shape of the parallelogram. When the inner-arm linkage is moved in the Yw-direction, the outer-arm linkage and the first connection shaft 29 will move correspondingly, as the inner-arm linkage is connected to the outer-arm linkage via the first connection shaft 29. The third actuator 3 is thus configured to move the outer-arm linkage by actuating the geometrically reconfigurable inner-arm linkage, resulting in a movement of the second axis of rotation 181 around which the outer-arm linkage is arranged to rotate, thereby forming a third kinematic chain from the third actuator 3 to the tool. The third kinematic chain gives a third degree of freedom for positioning the tool 44.

The robot arm 500 also comprises a transmission mechanism that in combination with the inner-arm linkage and the outer-arm linkage is arranged to accomplish controlled orientation of the tool 44. It should be understood that the robot arm 500 may comprise more transmission mechanisms than the one illustrated. The illustrated transmission mechanism comprises a kinematic chain or linkage connected between the base 13 and the tool 44. More in detail, a third connection 25a is connected to the first connection 24a. A fourth connection 25b is connected to the third connection 25a. A joint 32 is mounted on the fourth connection 25b. Alternatively the third connection 25a is mounted directly to the base 13. The joint 32 is mounted to an inner link 33 at one end. At the other end the inner link 33 is mounted to a joint 34. The joint 34 is connected to a first lever 35 comprising a first lever link 35a and a second lever link 35b. The first lever link 35a and the second lever link 35b are mounted at 90 degrees relative each. A second connection bearing 36 is mounted on the first connection shaft 29. The first lever link 35a and a second lever 37 are mounted at 90 degrees relative each other on the second connection bearing 36. The second lever 37 is connected to a link 39 via a bearing 38. The link 39 is connected to one end of a tool connection lever 41 by means of the bearing 42. The tool connection lever 41 is in its other end connected to first outer link 23 by means of a bearing 40. The rotation axes of bearings 31, 36, 38, 40 and 42 are parallel with each other and with the second axis of rotation 181. The joints 32 and 34 are drawn as ball and socket joints, but alternatively rod ends, universal joints or cardan joints could be used. The tool 44 is mounted on a vertical tool mounting beam 43, which is mounted on the tool connection link 41.

In order to obtain parallel movements also in a second direction, the Xw-coordinate direction, a second kinematic parallelogram 184, including the first outer link 23 and the second outer link 39, is used. Thus, the outer link 39 and the outer-arm linkage are parts of a second kinematic parallelogram 184. In the FIG. 1 the plane of the second kinematic parallelogram 184 is always at 90 degrees in relation to the plane of the first parallelogram 183. The configuration of the second parallelogram 184 is controlled by the second actuator 2. Thus, the second parallelogram is re-configurable. The second parallelogram 184 includes the second lever 37, the first outer link 23, the second outer link 39 and the tool connection link 41. The angle of the second lever 37 is controlled by the first lever 35 and the inner link 33, which is connected to the base 13, via the joint 32 and the connections 25a, 25b and 24a. In order to obtain constant tilting angle of the tool 44, the kinematic length of the inner link 33 is the same as the kinematic length of first inner link 18 between their axes of rotation, respectively. The second kinematic parallelogram 184 defines a second plane. The second plane is perpendicular to the first plane. Thus, the outer-arm linkage is configured to be rotated with one degree of freedom in the second plane perpendicular to the first plane of the first kinematic parallelogram 183.

With the design of the robot arm 500 in FIG. 1, the following functionality is obtained:

The first actuator 1 will move the tool 44 up and down (mainly in the Zw-direction) with the tool mounting beam 43 with its center axis 186 always perpendicular to the horizontal XwYw-plane.

The second actuator 2 will move the tool 44 in and out (mainly in the Xw-direction) with the tool mounting beam 43 with its center axis 186 always perpendicular to the horizontal XwYw-plane.

The third actuator 3 will move the tool 44 sideways (mainly in the Yw-direction) with the tool mounting beam 43 with its center axis 186 always perpendicular to the horizontal XwYw-plane.

In all motions the tool 44 will never rotate around axis 186.

The following kinematic requirements are beneficial to obtain the functionality listed above:

The second axis of rotation 181 is parallel with the first axis of rotation 180.

The first axis of rotation 180 is the rotation center of both first inner link 15 and second inner link 18.

The third axis of rotation 182 is parallel with the fourth axis of rotation 185.

Fifth axis of rotation 188 is parallel with sixth axis of rotation 187

The distance between the crossing point between axis 180 and 182 and the crossing point between the first axis of rotation 180 and the fourth axis of rotation 185 is equal to the distance between the crossing point between second axis of rotation 181 and the fifth axis of rotation 188 and the crossing point between the second axis of rotation 181 and sixth axis of rotation 187.

The right-angle distance between the rotation center of first connection bearing 31 and the rotation center of bearing 40 is equal to the right-angle distance between the rotation center of bearing 38 and the rotation center of bearing 42.

The right-angle distance between the rotation center of first connection bearing 31 and the rotation center of bearing 38 is equal to the right-angle distance between the rotation center of bearing 40 and the rotation center of bearing 42.

All the rotation centers of bearings 31, 38, 40 and 42 are parallel The rotation axis of first connection bearing 31 coincides with the rotation axis of second connection bearing 36, but it could be possible to mount second connection bearing 36 directly on any of the arms 15 and 18 (see FIG. 3) or on extensions to these arms.

The distance between the centers of the joints 32 and 34 is the same as the distance between the crossing point of the first axis of rotation 180 and the third axis of rotation 182 and the crossing point of the second axis of rotation 181 and the fifth axis of rotation 188.

In comparison with WO2019138025, the robot arm 500 of the present disclosure does not need any parallelograms at all in the outer arm system to obtain parallel movements of the tool 44 in one direction, and only one parallelogram 184 in the outer arm system to obtain parallel movements of the tool 44 in another direction. The link arrangements in WO2019138025 are used in the outer arm system to implement the transmissions configured to rotate and tilt the tool. These arrangements need space in the same way as the third parallelogram to obtain parallel movements of the tool in a second direction.

The robot concept according to WO2014187486 requires a two DOF wrist even in simple pick- and place operations over a horizontal surface. However, such a wrist will add a substantial weight and the robot will not have an as lightweight arm system as for example a Delta robot. Moreover, cabling will be needed to transmit power and to control the actuators of the wrist. The robot arm 500 of this disclosure does not have these shortcomings.

Figure 4:
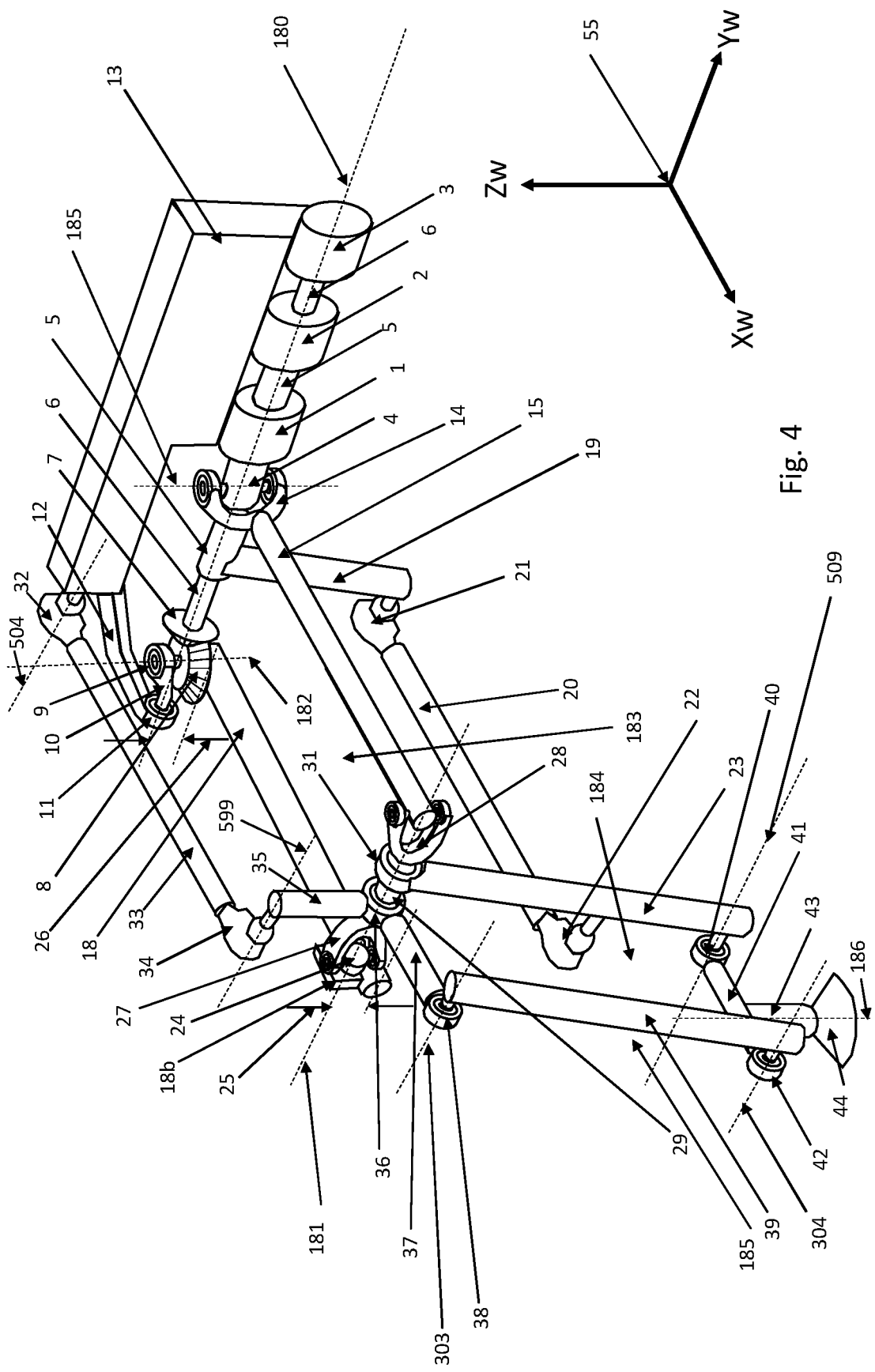
FIG. 4 illustrates a robot arm according to a fourth embodiment of the disclosure.

Such solution is not possible in the structures of WO2014187486 since then the end-effector would lose one constraint and not be controllable with an added degree of freedom between the first arm and the first rod. In FIG. 4 of WO2014187486 there is a structure that is not slim and that requires a large space for the arm system, but which may have a joint that can have three DOF between the first arm and the first rod. However, it is not possible to obtain a slim compact robot structure with the proposed solution in FIG. 4 of WO2014187486 because the vertical movements can in that case only be performed by a separate kinematic chain connected directly to the end-effector platform as in the delta robot case, and thereby requiring lot of space for the arm structure. The robot structure according to WO2014187486 can only control three DOF with the actuators fixed to the stand.

It should also be mentioned that the workspace of the robot structure in WO2015188843 is much smaller than for different variants of the robot arm herein.

In the following a plurality of different robot arm embodiments will be described with reference to the FIGS. 2-22. All these embodiments comprise a first, a second and a third kinematic chain, in similarity with the first embodiment. Theses kinematic chains will not be explained in detailed again, except from where they differ from the first embodiment, or for ease of understanding. The embodiments that will be explained in the following also comprise one or two transmission mechanisms.

Figure 2:
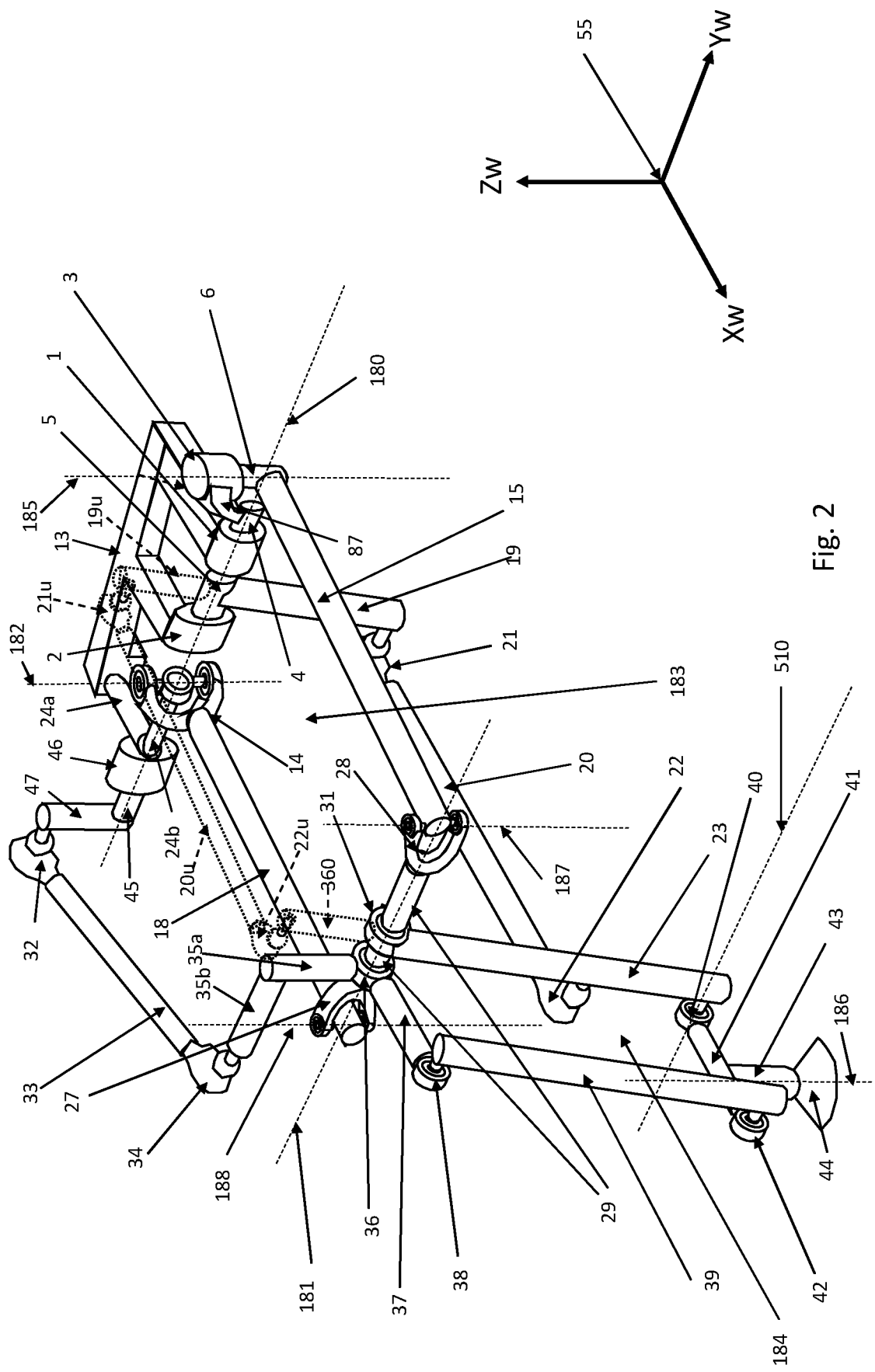
FIG. 2 illustrates a robot arm according to a second embodiment of the disclosure.

FIG. 2 illustrates a robot arm 500 according to a second embodiment of the disclosure. This embodiment has substantially the same components as the first embodiment. However, the transmission mechanism here comprises the links 33 and 39, that is actuated by means of a fourth actuator 46. The transmission mechanism in the first embodiment is instead fixed to a base. In more detail, the robot arm 500 according to this second embodiment comprises the option to control the tilting angle of the tool 44 around an axis of rotation parallel with the Yw-axis of the world coordinate system 55. This axis of rotation may be considered as a first axis of rotation of the tool 44. Thus, joint 32 of inner link 33 is now mounted on an actuated third lever 47, which is configured to be rotated around the rotation center of the fourth actuator 46. The third lever 47 is mounted on the output shaft 45 of the fourth actuator 46. The output shaft 45 is in the FIG. 2 mounted to have its axis of rotation coinciding with the first axis of rotation 180. Alternatively, the axis of rotation of the fourth actuator 46 does not coincide with the first axis of rotation 180. The functionality obtained in FIG. 2 is that when the fourth actuator 46 rotates the outgoing shaft 45, then the third lever 47 will swing around the axis of rotation of the outgoing shaft 45 and the inner link 33 and the second outer link 39 connected through the first lever 35 (first lever link 35a, second lever link 35b) and the second lever 37 will rotate the tool connection lever 41 around the bearing 40 and consequently tilt the beam 43 and the tool 44. Thus, the fourth actuator 46 rotates the tool 44 around a second axis of rotation 510 of the tool. The axis of rotation 510 is defined by the bearing 40. In comparison with the first embodiment in FIG. 1, the new components are the fourth actuator 46, the outgoing shaft 45 and the third actuated lever 47. The rest of the components are the same as described for FIG. 1. However, the requirements on the kinematics of the first outer link 23, the inner link 33, the second lever 37, the second outer link 39, the tool connection lever 41 and the first lever 35 no longer need to fulfill that the tool is always perpendicular to the horizontal plane. For example, the first outer link 23 and the second outer link 39 do not need to be parallel anymore, and the kinematic length of inner link 33 does not need to be equal to the kinematic length of second inner link 18. The only requirement that still needs to be fulfilled with respect to these components is that all the rotation centers of bearings 31, 38, 40 and 42 are parallel. The transmission 33-39 includes the second connection bearing 36 with its axis of rotation coinciding with the second axis of rotation 181.

FIG. 2 also illustrates with dotted lines the possibility to implement the transmission mechanism between the second actuator 2 and the first outer link 23 above the parallelogram 183. In this configuration the shaft 5 is connected to the link 20u via the lever 19u and the joint 21u. The link 20u is then connected to the first outer link 23 via the joint 22u and a fourth lever 360.

In applications for pick- and place operations of components when picking is made of leaning or hanging components and the placing is to lay down the components, the tilting range of the tool 44 should be at least +/−45 degrees for picking and leaning components or +/−90 degrees for picking and hanging components. With the design in FIG. 2, tool tilting +/−45 degrees will be possible in most of the workspace of the robot arm 500. However, if tool tilting of +/−90 degrees or even larger tool tilting angle is needed in the whole workspace, then backhoe- and/or gear mechanisms as in FIG. 3 can be used.

Figure 3:
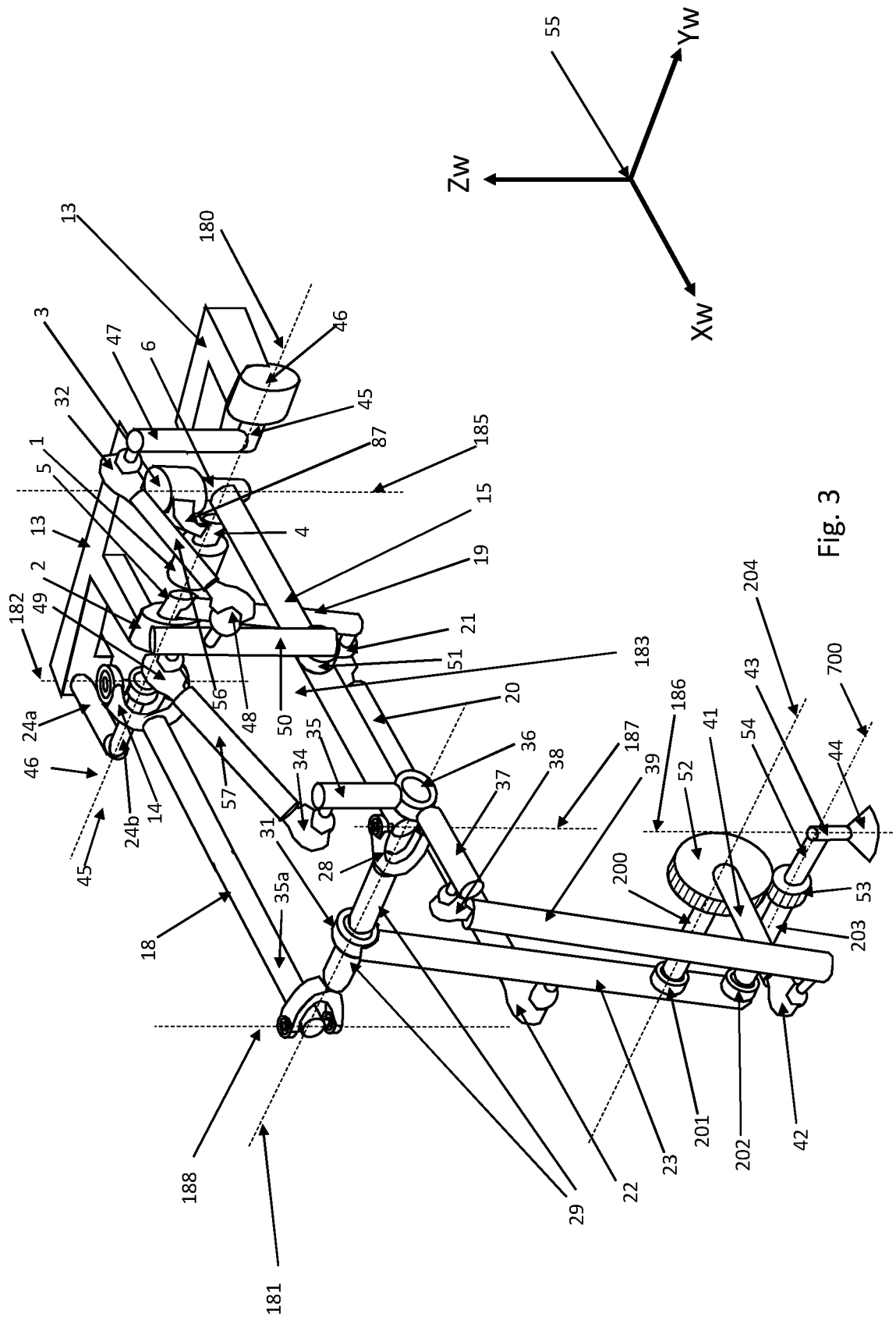
FIG. 3 illustrates a robot arm according to a third embodiment of the disclosure.
Figure 7:
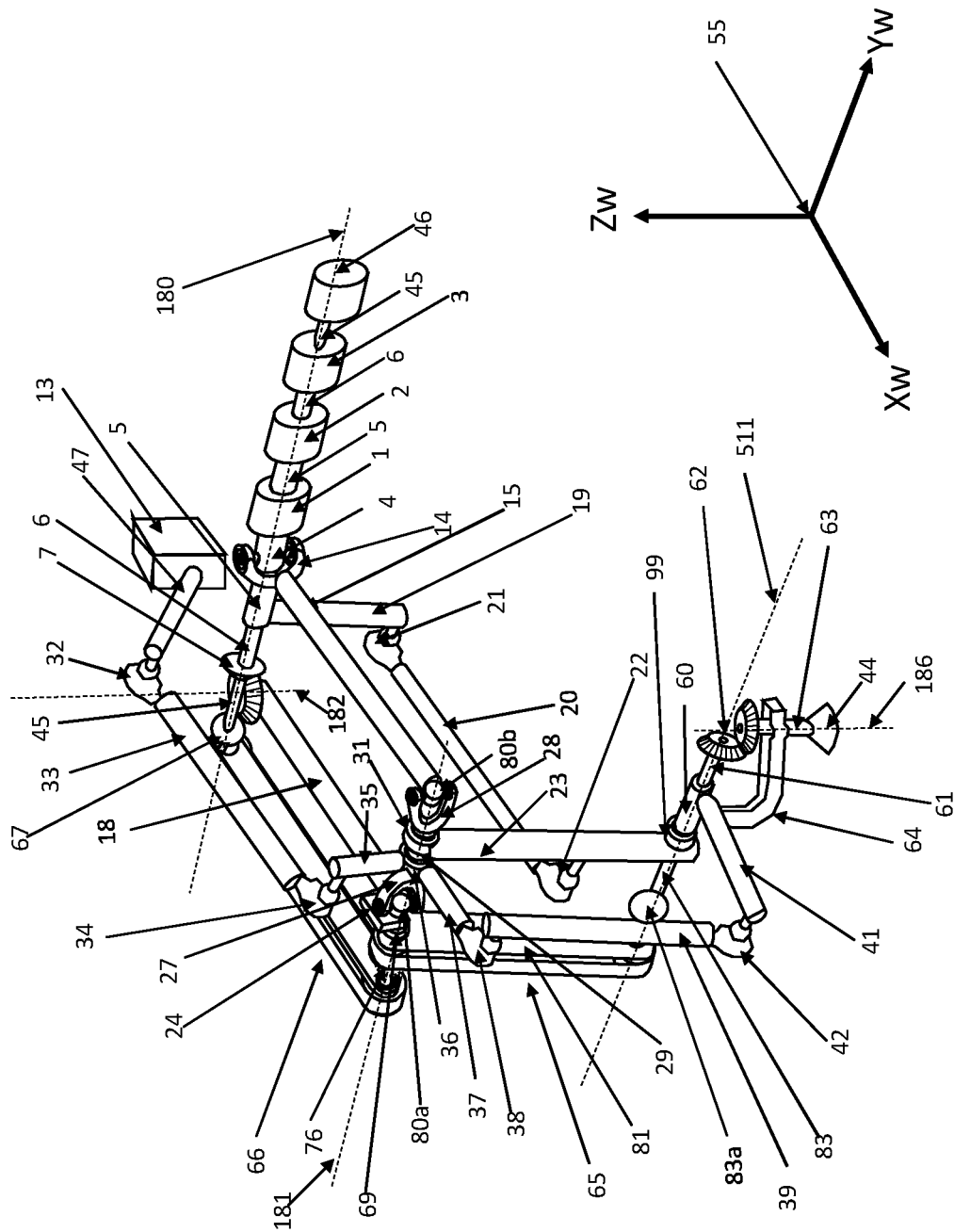
FIG. 7 illustrates a robot arm according to a sixth embodiment of the disclosure.

FIG. 3 illustrates a robot arm 500 according to a third embodiment. An additional transmission mechanism is here arranged on the opposite side of the robot arm 500, seen from the first connection bearing 31. In more detail, the robot arm 500 comprises one additional transmission mechanism arranged to rotate the tool 44 around a second axis of rotation 700 of the tool 44. Thus, the fourth actuator 46 rotates the tool 44 around the second axis of rotation 700. All axes of rotation of the tool that are horizontal as the axis of rotation 700 of the tool 44 may be referred to as a second axis of rotation of the tool 44. A second axis of rotation will thus tilt the tool in a direction given by the direction of the second axis of rotation. The first axis of rotation of the tool is defined by the line 186 in the figure. In FIG. 7 it is shown how the tool can be actuated to rotate around this axis of rotation. Here, a backhoe transmission is placed between the actuated third lever 47 and the first lever 35. A backhoe transmission can be made in different ways to obtain a larger rotation angle of the first lever 35 than the third lever 47 when the third lever 47 is actuated to be rotated by the outgoing shaft 45, driven by the fourth actuator 46. In the FIG. 3, a first backhoe link 56 is mounted between the actuated third lever 47 and an intermediate fifth lever 50. The intermediate fifth lever 50 is mounted via the bearing 51 on the second inner link 18 to swing around the axis of rotation of the bearing 51. The first backhoe link 56 is mounted on the third lever 47 with the joint 32 and on the intermediate fifth lever 50 with the joint 48. A second backhoe link 57 is mounted between the intermediate fifth lever 50 and the first lever 35. The second backhoe link 57 is mounted on the fifth lever 50 with the joint 49 and on the first lever 35 with the joint 34. In order to obtain an angular magnification, the rotation radius of the center of joint 49 around the bearing 51 should be larger than the corresponding rotation radius of the center of joint 48. Moreover, the rotation radius of the center of joint 49 around the bearing 51 should be larger than the rotation radius of the center of joint 34 around the axis of the second connection bearing 36. Thus, the additional kinematic chains comprise two backhoe transmissions 50, 57, 56 configured to increase the rotational movement of the fourth actuator 46 to a corresponding increase of rotation of the axis of rotation 700 of the tool 44. In order to further magnify the tilting rotation of the tool 44 around the axis of rotation 700, the first gear wheel 52 and the second gear wheel 53 are mounted on the first outer arm 23 via bearings (not shown in the figure). The tool connection link 41, now acting as a lever, is mounted on the first gear wheel 52 in such a way that when the second lever 37 is actuated to move up and down, the first gear wheel 52 will rotate and by means of gearing also the second gear wheel 53 will rotate. The tool 44 is mounted on the second gear wheel 53 via the shaft 54 and the tool mounting beam 43 and the tool 44 will rotate with the rotation of the second gear wheel 53. Thus, the tool 44 is arranged to rotate around a second axis of rotation 700 of the tool. To obtain larger rotation of the tool 44 than that of the rotation of the tool connection link 41, the diameter of the first gear wheel 52 must be larger than the diameter of the second gear wheel 43. The tool connection lever 41 is connected to the gear wheel 52 via joint 38, the second outer link 39, joint 42 and the tool connection link 41, which is mounted on the first gear wheel 52. The joints 38 and 42 could alternatively be implemented as simple bearings with rotation axes parallel with the second axis of rotation 181. It should be mentioned that the second outer link 39 together with the gear wheels 52 and 53 used to increase the rotation capability of the tool 44, may be replaced by one or more backhoe transmissions corresponding to the one shown between the third lever 47 and the first lever 35. In that case the joints 51 and second connection bearing 36 of the fifth lever 50 and the first lever 35, respectively, are mounted on the first outer link 23 with axes of rotation parallel with the second axis of rotation 181. It is correspondingly possible to use the gear wheel transmissions on the first inner link 15 instead of a backhoe transmission. Then the gear wheel 53 is mounted on the second connection bearing 36 and the second gear wheel 53 is mounted on the second inner link 18 by means of a bearing like a bearing 201. The bearing 201 is mounted between link 200 and the first outer link 23. Alternatively, gear transmissions may be used both on the second inner link 18 and the first outer link 23 and backhoe solutions may also be used in both cases. The second connection bearing 36 is here mounted on the first inner link 15 but may alternatively be mounted on the first connecting shaft 29 as in FIG. 2. The second connection bearing 36 together with bearing 51 could also be mounted on the second inner link 18. It should also be mentioned that it is also possible to use rack-and pinion gears to magnify the rotation capability of the tool 44. For description of other components in this FIG., see the text for FIG. 1.

FIG. 4 illustrates a robot arm according to a fourth embodiment of the disclosure. The fourth embodiment illustrates an alternative way to actuate the basic structure in FIG. 1. The goal here is to have all the actuators fixed to the base 13, meaning that all the actuators are loaded with minimum mass inertia. A plane formed by the first parallelogram 183, including the first inner link 15 and the second inner link, is actuated to rotate around the axis 180 of a first actuator 1. The third actuator 3 swings the first inner link 15 and the second inner link 18 in the plane of the first parallelogram 183, thereby changing the shape of the parallelogram. In order to obtain parallel movements also in a second direction, thus the Xw direction, a second parallelogram 184, including the first outer link 23 and the second outer link 39 is used. The plane of the second parallelogram 184 is always at 90 degrees in relation to the plane of the first parallelogram 183. The first parallelogram 183 comprises the first rotation axis 180, thus the rotation axis of shaft 4 of the first actuator 1, the first inner link 15, the second inner link 18 and the first connecting shaft 29. The second parallelogram 184 comprises the second lever 37 and the first outer link 23, the second outer link 39 and the tool connection link 41. The outer link 39 is parallel with the first outer link 23 of the outer arm linkage. The inner link 33 is parallel with the first inner link 15 and the second inner link 18. The angle of the second lever 37 is controlled by the first lever 35 and the inner link 33. The inner link 33 has a same kinematic length between its axes of rotation 504, 599 as the kinematic length of the first inner link 15 between its axes of rotation 185, 187. The inner link 33 is here mounted to the base 13 via the joint 32. The robot structure is actuated by the three rotating actuators 1, 2 and 3. The first actuator 1 is connected to the first inner link 15 via the rotating outgoing shaft 4 of the first actuator 1 and via joint 14 including two bearings and a bracket connected to the second inner link 15. This joint 14 in FIG. 4 is the same kind of joint 14 as illustrated in FIGS. 1-3, however there it was implemented for the second inner link 18. In FIG. 4, when the first actuator 1 rotates outgoing shaft 4, the first inner link 15 will thus rotate up and down around the center axis of outgoing shaft 4. The second actuator 2 has the output rotating shaft 5, which goes through the first actuator 1 that is hollow, and through the outgoing shaft 4 that is also hollow. The outgoing shaft 5 is connected to an inner lever 19, which in turn is at one end connected to one end of a link 20 via a joint 21. Link 20 is in its other end connected to the first outer link 23 of the second parallelogram 184 via joint 22. Thus, when the second actuator 2 rotates outgoing shaft 5, the first outer link 23 will swing around the axis of first connection bearing 31, which is mounted in the upper end of the first outer link 23. The third actuator 3 rotates its output shaft 6, which is mounted through the first actuator 1 and the second actuator 2 with corresponding output shafts 4 and 5. A 90-degree gear is mounted at the end of outgoing shaft 6. This gear comprises a first gear wheel 7 and a second gear wheel 8, with the first gear wheel 7 mounted on the end of shaft 6 and the second gear wheel 8 mounted on a bearing 9, which in turn is mounted on another bearing 11 via a mechanical attachment 10. The gear wheels 7, 8 and bearings 9, 11 are mounted in such a way that the common center axis of shafts 4, 5 and 6 coincides with the rotation axes of the first gear wheel 7 and bearing 11 and that the rotation axis of the first gear wheel 8 coincides with the rotation axis of bearing 9 and that this rotation axis is at 90 degrees angle in relation to the center axis of shafts 4, 5 and 6 and that the rotation axis of the gear wheel 8 will cross the rotation axis of the first gear wheel 7. The second inner link 18 is mounted on the second gear wheel 8 and thus a rotation of the third actuator 3 will swing the second inner link 18 around the rotation axis of bearing 9. Bearing 11 is mounted on the base 13 via the beam 12. The actuators 1, 2 and 3 are also mounted on the base 13, which means that no actuators are needed in the arm system, making it possible to design an extremely light-weight robot.

A first connecting shaft 29 is mounted between the first inner link 15 and the second inner link 18 by means of two joints. Each of these joints 27, 28 comprises a bracket respectively, mounted on the ends of first connecting shaft 29. A first bracket of the first joint 27 includes a pair of bearings mounted with rotation axes perpendicular to the second inner link 18. In order to compensate for an offset 26 at the 90 degrees gear, a mechanical extension 18b including a cylindrical part 24 is used for an offset mounting 18b of the bearing for bracket 27. A second bracket of a second joint 28 also includes a pair of bearings but these are mounted directly on the first inner link 18. The first and second brackets are mounted in such a way on the second inner link 18 and the first inner link 15, respectively, that the center axis of first connecting shaft 29, here the second axis of rotation 181, is parallel with the first axis of rotation 180 of shafts 4-6. The offset mounting 18b gives an offset 25 relative the common center line of second inner link 18, corresponding to the offset 26 between the first axis of rotation 180 being the rotation center of the shafts 4-6 and the common center line of second inner link 18.

A second connecting bearing 36 is mounted on the first connection shaft 29 and two levers, a first lever 35 and a second lever 37 are mounted at 90 degrees relative each other on the second connection bearing 36. The first lever 35 is connected to the base 13 via the inner link 33, which is mounted to the base 13 with the joint 32 and to the first lever 35 with the joint 34. The second lever 37 is connected to the second outer link 39 via bearing 38. The second outer link 39 is then connected to one end of the tool connection lever 41 by means of bearing 42, and the tool connecting lever 41 is in its other end connected to the first outer link 23 by means of bearing 40. The rotation axes of bearings 31, 36, 38, 40 and 42 are parallel with each other and the first axis of rotation 180, thus the center axis of the shafts 4, 5 and 6. The joints 32 and 34 are drawn as ball and socket joints, but also rod ends, universal joints or cardan joints could be used. The tool 44 is mounted on a vertical tool mounting beam 43, which is mounted on the tool connecting link 41, that here is horizontal. With this design the same functionality is obtained as the robot arm according to the first embodiment in FIG. 1, and the same kinematic requirements are fulfilled.

Another way to obtain large tilt angles of the tool 44 is to use an additional transmission mechanism comprising belt transmissions. This is exemplified in FIG. 5A, where a robot arm according to a fifth embodiment of the disclosure is illustrated. In the fifth embodiment, the belt transmission comprises two steps: a first step with an inner transmission along the second inner link 18 (alternatively, along the first inner link 15) and a second step with an outer transmission along a belt transmission beam 81. Here, the inner transmission 66 is parallel with the first inner link 15 and the second inner link 18. The outer transmission 65 is parallel with the first outer link 23 of the outer arm linkage. The belt transmission beam 81 is here part of the outer arm linkage. Alternatively, only one step can also be used, where the belt transmission in that step may be combined with a backhoe- or a gear transmission in the other step. Then the belt transmission can either be along the second inner link 18 or along first inner link 15 or along the belt transmission beam 81. With two step belt transmission, infinite rotation is obtained. Thus, the belt transmissions 66-65 are arranged for rotating the tool 44 around a second axis of rotation 700 of the tool 44 without rotational angular limits. The third actuator 3 with the outgoing shaft 6 is mounted on the outgoing shaft 4 of the first actuator 1 via a mechanical connection 87. Thus, the outgoing shaft 4 is connected to a joint bracket of joint 14 to swing the first inner link 15 in the plane 183 of the first parallelogram. As in earlier figures, the first actuator 1 rotates the outgoing shaft 4 to swing the first inner link 15 up and down, and the second actuator 2 rotates the outgoing shaft 5 to swing the inner lever 19. An outgoing shaft 45, rotated by a fourth actuator 46, is now connected to an input belt wheel of a first belt transmission 66 via a first cardan joint 67 (represented by a sphere). Thus, the first belt transmissions 66 is connected in series with the first cardan joint 67. The output belt wheel of the first belt transmission 66 is connected to a second connecting shaft 77 via a second cardan joint 76. Thus, the first belt transmissions 66 is connected in series with also the second cardan joint 76. The second connecting shaft 77 is mounted between the bearings 80a and 80b of the first joints 27 and the second joint 28, respectively. The input belt wheel of the second band transmission 65 is mounted on the second connecting shaft 77 to be rotated. The belt transmission beam 81 is connected to the second connecting shaft 77 via the bearing 79. The output belt wheel of the second belt transmission is connected to the tool mounting beam 44 via the shaft 83, which can rotate in the bearing 82, mounted on the belt transmission beam 81.

In order to avoid that the first belt transmission 66 with the cardan joints 67 and 76 will tilt, a bearing 88 between the first belt transmission 66 and the bearing 92 is introduced. Thus, the outer ring of the bearing 89 is mounted on the belt transmission beam 71 via the mechanical interface 89 and the inner ring of the bearing 89 is mounted on the outer ring of the bearing 92 via the shaft 90 and a mechanical interface 91. The rotation center of the bearing 88 should cross the center of the first cardan joint 67. A similar arrangement with a bearing like the bearing 88 can be made between the belt transmission beam 71 and the bearing 80.

The herein described belt transmissions are space saving, which make it possible to obtain a slim outer arm system even when both rotation and tilting of the tool 44 is controlled. Space saving is important in the outer arm system, but in for example WO2019138025 the outer arm system is less suited for belts since the necessary kinematic movements either would require belt wheels moving axially/sidewise or would need a number of additional cardanic joints, both options being complex and bulky. In the present disclosure, hinge joints that rotate with axes being parallel facilitates the use of the space-saving belt drives.

Figure 5A:
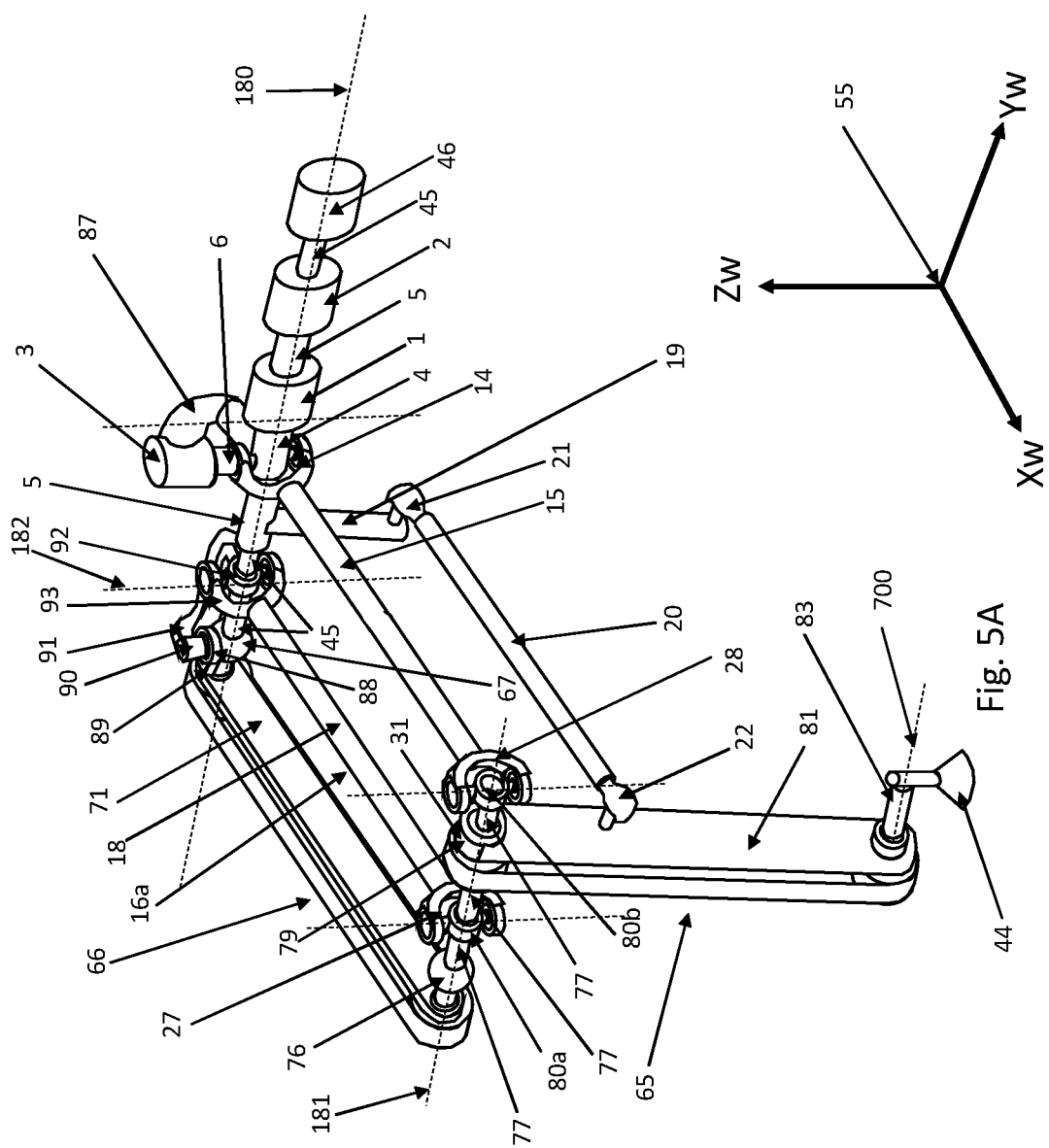
FIG. 5A illustrates a robot arm according to a fifth embodiment of the disclosure.
Figure 5B:
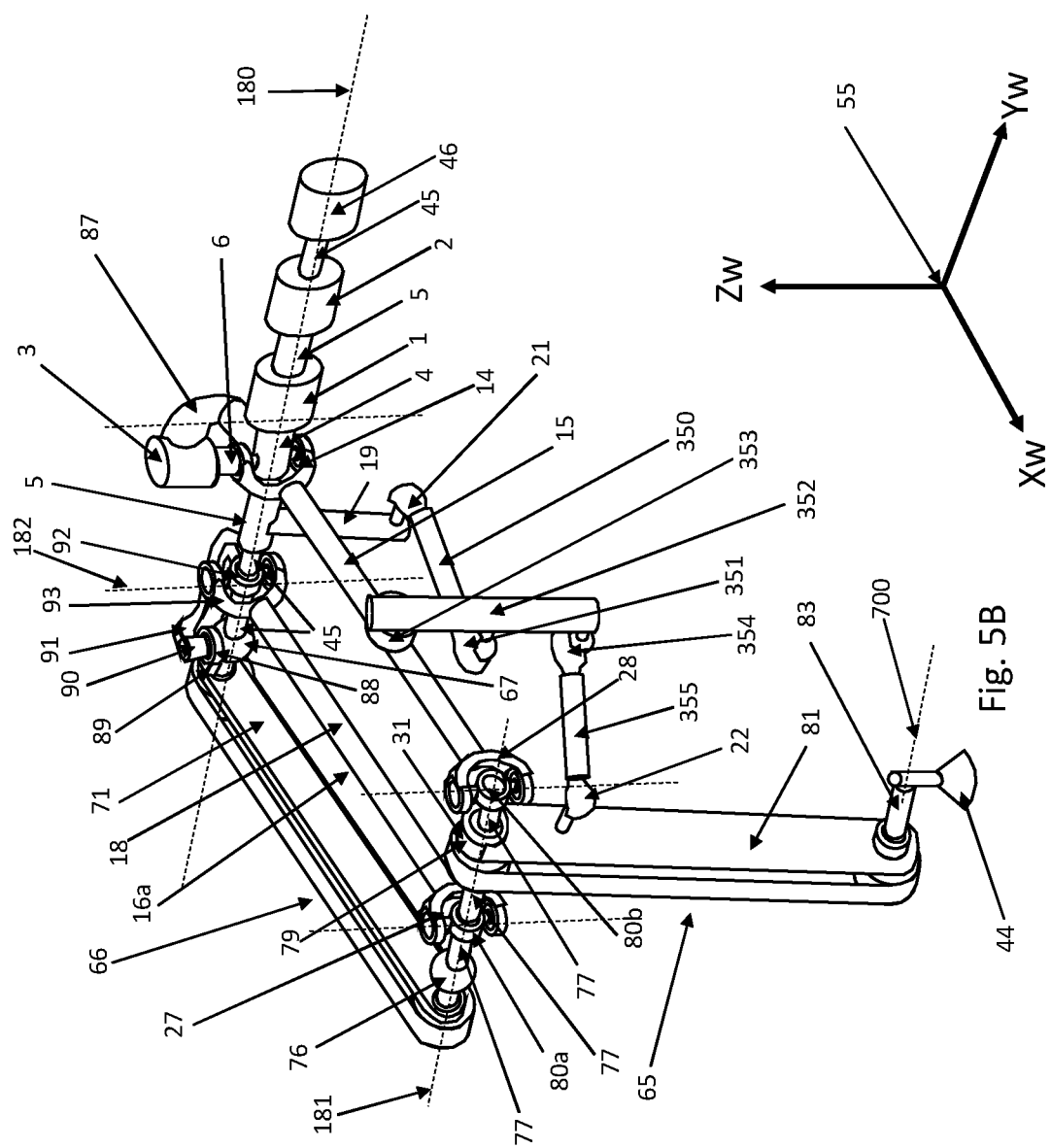
FIG. 5B illustrates an alternative robot arm to the robot arm illustrated in FIG. 5A.

FIG. 5B illustrates the possibility to use a backhoe transmission to enhance the working angle range for the belt transmission beam 81. Using a transmission with large rotation capability it is possible to control the rotation or tilt of the tool 44 even when the belt transmission beam 81 performs large rotations and for example rotates from a downward to an upward direction in FIG. 5B, a movement named backward bending for industrial robots. The backhoe in FIG. 5B is obtained by the serially connected links 350 and 355. The link 350 is mounted with the joints 21 and 351 between the levers 19 and 352 and the link 355 is mounted between the lever 352 and the belt transmission beam 81. The lever 352 is mounted via the bearing 350 on the first inner link 15 and is actuated to swing in the XwZw-plane. In order to obtain an angular magnification, the distance between joint 14 and the center of first inner link 15 should be larger than the distance between joint 351 and the center of bearing 353 and the distance between joint 354 and the center of bearing 353 should be larger than the distance between joint 22 and the center of second connecting shaft 77. Of course, a gearing mechanism could also be used to obtain large rotation angles for the outer link (see gear mechanism at the tool in FIG. 3) and even a belt transmission could be used together with cardan joints. Alternatively, the shaft 5 of the second actuator 2 can be connected with the outer link 81 using a belt transmission with cardan joints or using a link combined with a gear.

Figure 6:
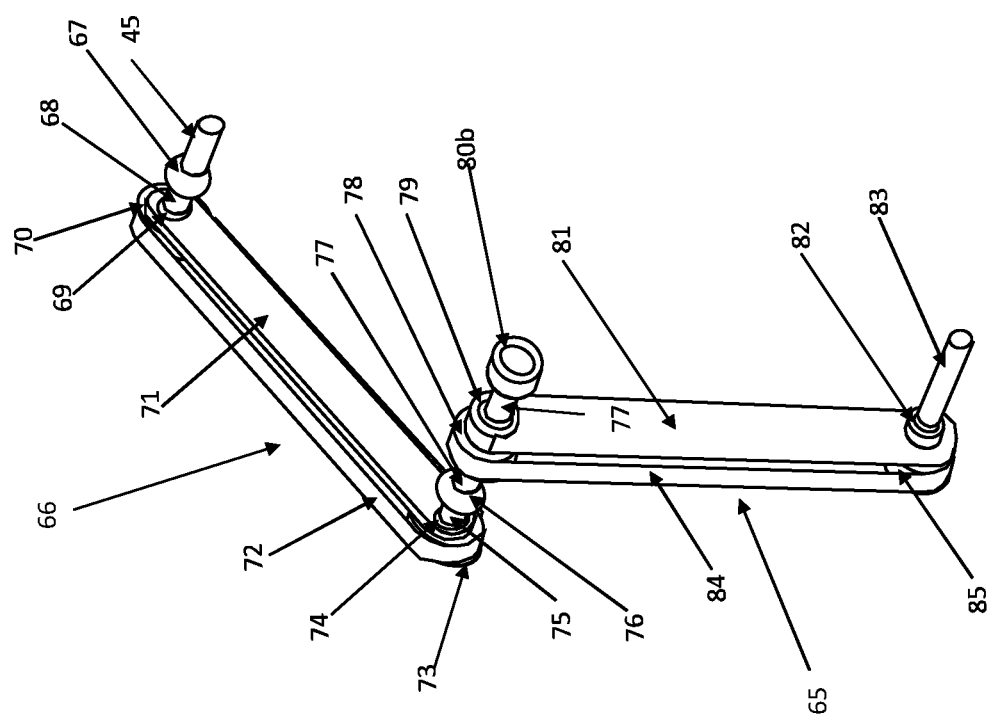
FIG. 6 illustrates a belt transmission mechanism according to some embodiments in isolation.
Figure 13:
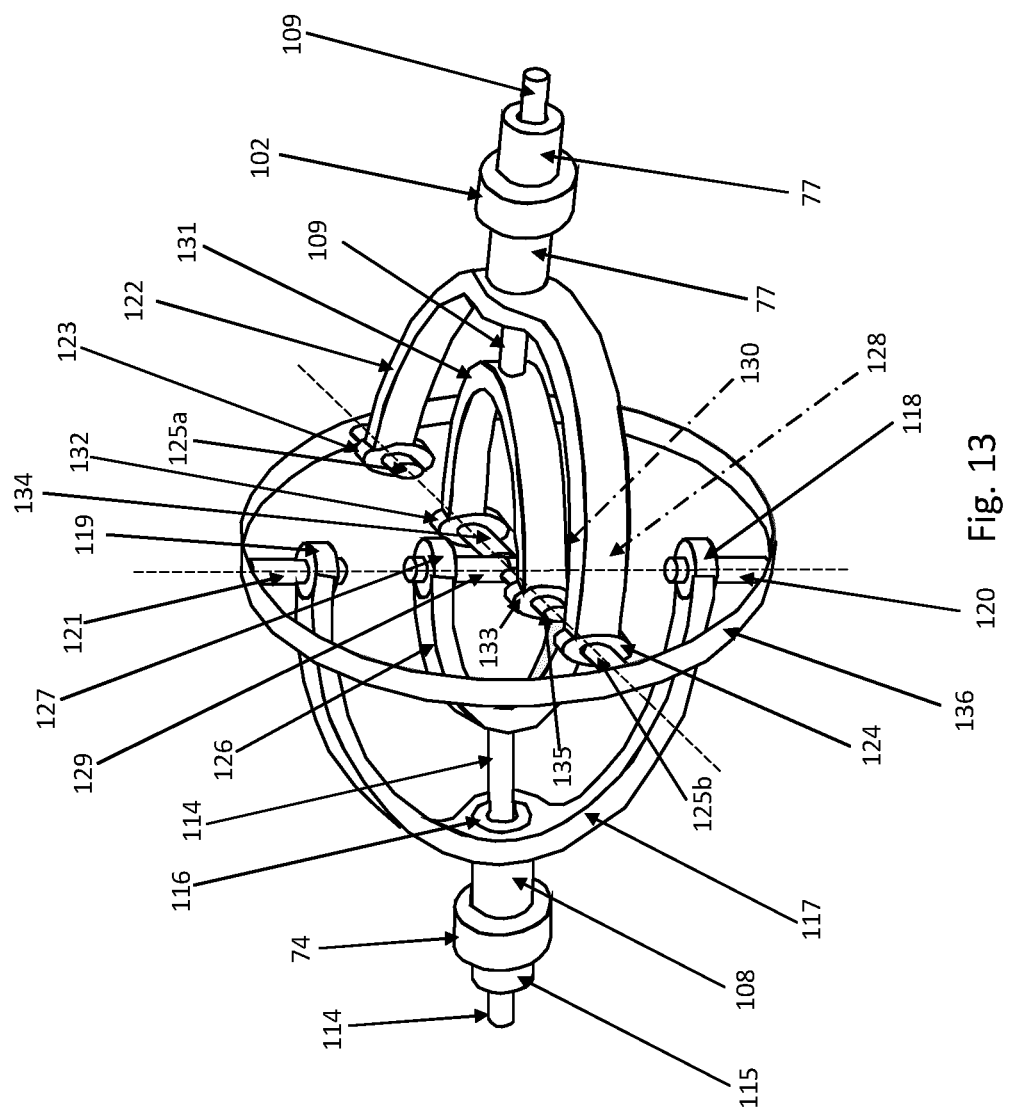
FIG. 13 illustrates a double cardan joint according to some embodiments of the disclosure.

FIG. 6 illustrates a belt transmission mechanism according to some embodiments in isolation. More specifically, FIG. 6 gives some more details about the belt transmissions in FIG. 5. The actuated outgoing shaft 45 transmits rotation via the first cardan joint 67 to the belt transmission input shaft 68. The belt transmission input shaft 68 rotates in the bearing 69, which is mounted on the belt transmission beam 71. The belt transmission input shaft 68 is connected to an input belt wheel 70 and thus rotation is transmitted from the outgoing shaft 45 to the input belt wheel 70. Rotating the input belt wheel 70 will make the output belt wheel 73 to rotate because of the belt 72, connecting the input and output belt wheels. The output belt wheel 73 is mounted on the belt transmission output shaft 75, which is connected to the second connecting shaft 77 via the second cardan joint 76. The belt transmission output shaft 75 is rotates inside the bearing 74, mounted on the belt transmission beam 71. The second connecting shaft 77 is the belt transmission input shaft for the belt transmission 65 and is connected to the input belt wheel 78 of the second belt transmission 65. Here the belt transmission beam 81 also has the function of the band transmission beam and thus the second connecting shaft 77 rotates in the bearing 79 of belt transmission beam 81 (see FIG. 5), which is also the outer arm linkage of the robot arm 500 in this case. As can be seen in FIG. 4, the second connecting shaft 77 also rotates in the bearings 80a and 80b, of which the bearing 80b is shown in FIG. 5. Rotation of the second connecting shaft 77 thus makes the input belt wheel 78 to rotate and via the belt 84 the output wheel 85 will rotate. The output belt wheel 85 is connected to the belt transmission output shaft 83, rotating in the bearing 82 and thus rotating the tool 44 according to FIG. 4. The first cardan joint 67 before the input belt wheel 70 and the second cardan joint 76 after the output belt wheel 73 of the first belt transmission 66 are necessary since the outgoing shafts 45 and second connecting shaft 77 are included in the first parallelogram with the first inner link 15 and the second outer link 18. Since no parallelogram is needed for sideways movements of the belt transmission beam 81, no cardan joints are needed before the input wheel 78 and after the output wheel 85 of the second belt transmission 65. A description of the design of the cardan joints 67 and 76 can be retrieved from the text related to FIG. 13, showing a double cardan joint type. For the design of a single cardan joint type as for cardan joints 67 and 76, either the inner cardan joint with a connecting cross or the outer cardan joint with a connecting ring as shown in FIG. 13 can be used. In order to increase the accuracy of the transmission, the diameter of the output gear wheels could be made larger than the diameter of the input gear wheels. This is possible since the transmissions have infinite rotation capabilities. It should also be mentioned that it is easy to encapsulate the belt transmissions. Then circular sealings are needed between the encapsulations and the shafts 68, 75, 77 (both sides) and 83.

In FIG. 5, the belt transmissions 65 and 66 are used to perform tilting of the tool 44. However, it is also possible to use the belt transmissions 65 and 66 to obtain rotation of the tool 44. Using this possibility on the basic three axes design shown in FIG. 4, a robot arm 500 with constant tool tilting angles and controlled infinite tool rotation angle is obtained according to FIG. 7.

FIG. 7 illustrates a robot arm according to a sixth embodiment of the disclosure. The sixth embodiment comprises two transmission mechanisms, besides the three kinematic chains controlling the position of the tool 44. The two transmission mechanisms may be referred to as a fourth transmission mechanism and a fifth transmission mechanism, each configured to control a different axis of rotation 186, 511 of the tool 44. In this sixth embodiment, a first actuator 1 controls the up/down swinging of the first inner link 15 and second inner link 18, just as in the fourth embodiment illustrated in FIG. 4. Second actuator 2 controls the in/out swing of the first outer link 23 and the third actuator 3 controls the sideways swinging of the first inner link 15 and the second inner link 18. In the case of first inner link 15, the sideway swinging is via the first and second joints 27 and 28 and the first connection shaft 29. A fourth actuator 46 has now been added in relation to FIG. 4, and its output shaft 45 rotates a belt transmission input shaft of the belt transmission 66 via the first cardan joint 67. The belt transmission output shaft of belt transmission 66 rotates the belt transmission input shaft of a second belt transmission 65 via the second cardan joint 76. In comparison with FIG. 5, the belt transmission beam 81 is now separate and is no longer the same as the first outer link 23. The inner ring of the bearing 69, which is mounted on the belt transmission beam 81 with its outer ring, is now mounted on the second inner link 18. To compensate for this, a third cardan joint 83a is used on the shaft 83. Actually, the third cardan joint 83a makes it unnecessary to implement second cardan joint 76 and this joint is drawn with broken lines. The belt transmission output shaft 61 of the second belt transmission 65 is mounted via the third cardan joint 83a with a bearing (not shown) in the tube 60. This tube can rotate in relation to the shaft 61 and to the first outer link 23. The shaft 61 rotates the input gear of the 90 degrees gear assembly 62, whereby the output gear of 62 rotates the tool mounting shaft 63 and thus the tool 44 around the first axis of rotation 186 of the tool. Thus, the fourth actuator 46 rotates the tool 44 around the first axis of rotation 186 of the tool. All axes of rotation of the tool that are parallel with this axis of rotation may be referred to as a first axis of rotation of the tool 44. The tool mounting shaft 63 rotates in a bearing (not shown) in the mechanical part 64, which is connected to a tool connecting lever 41 of the second parallelogram including the first outer link 23 and the second outer link 39. The tool connecting lever 41 is connected to the tube 60 and controls the rotation of the mechanical part 64 in such a way that the tool mounting shaft 63 will always be perpendicular to the horizontal plane. This additional kinematic chain is connected to the base 13 via the third lever 47. The separation of the belt transmission beam 81 and the first outer link 23 means that other solutions can be used for implementing the joints 24 and 28. Thus, the brackets of these joints are now mounted on the first connection shaft 29 instead of the link 18 and the link part 17 and the bearings 80a and 80b are instead mounted on the link 18 and link part 17 respectively.

Figure 8:
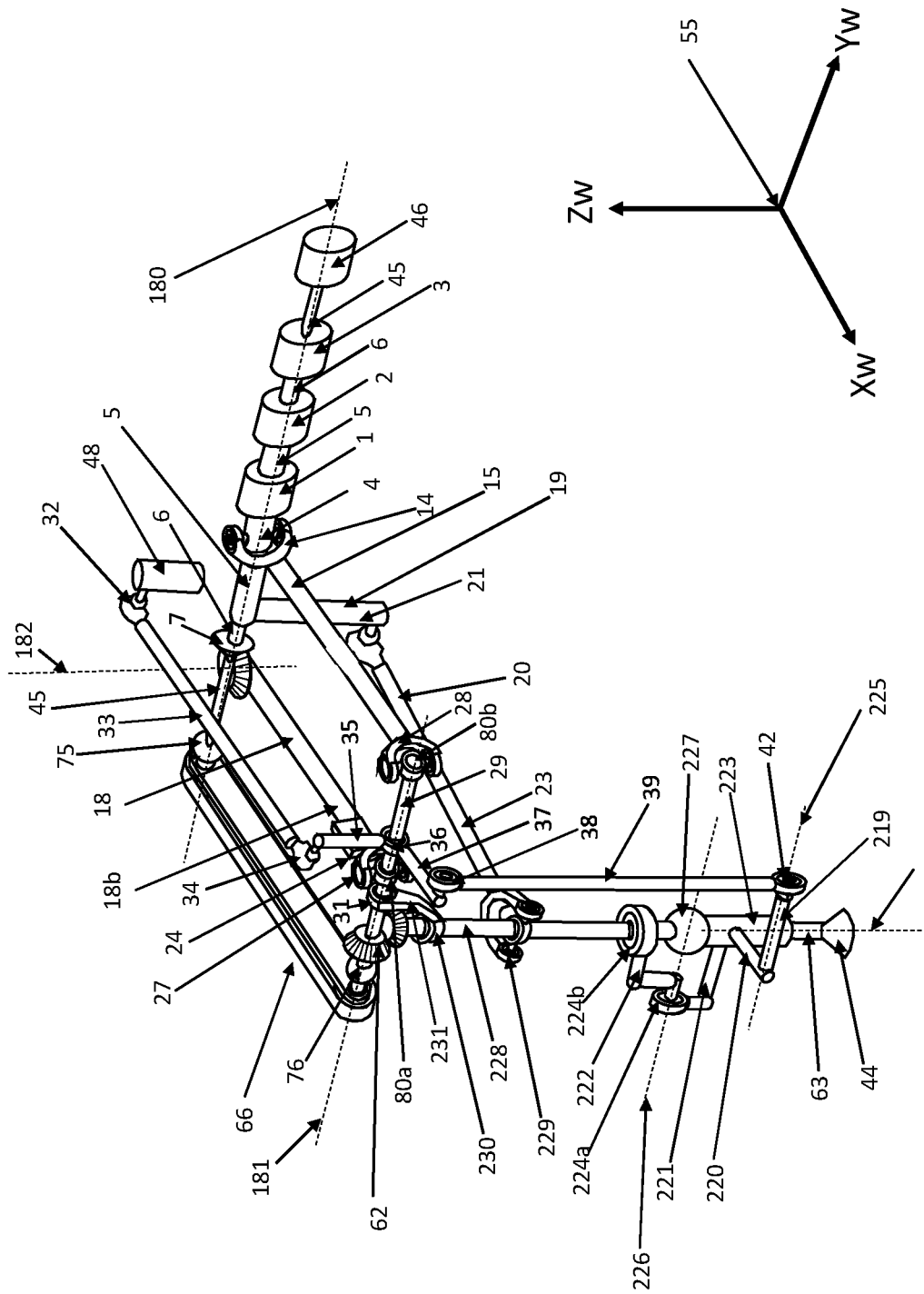
FIG. 8 illustrates a robot arm according to a seventh embodiment of the disclosure.
Figure 9:
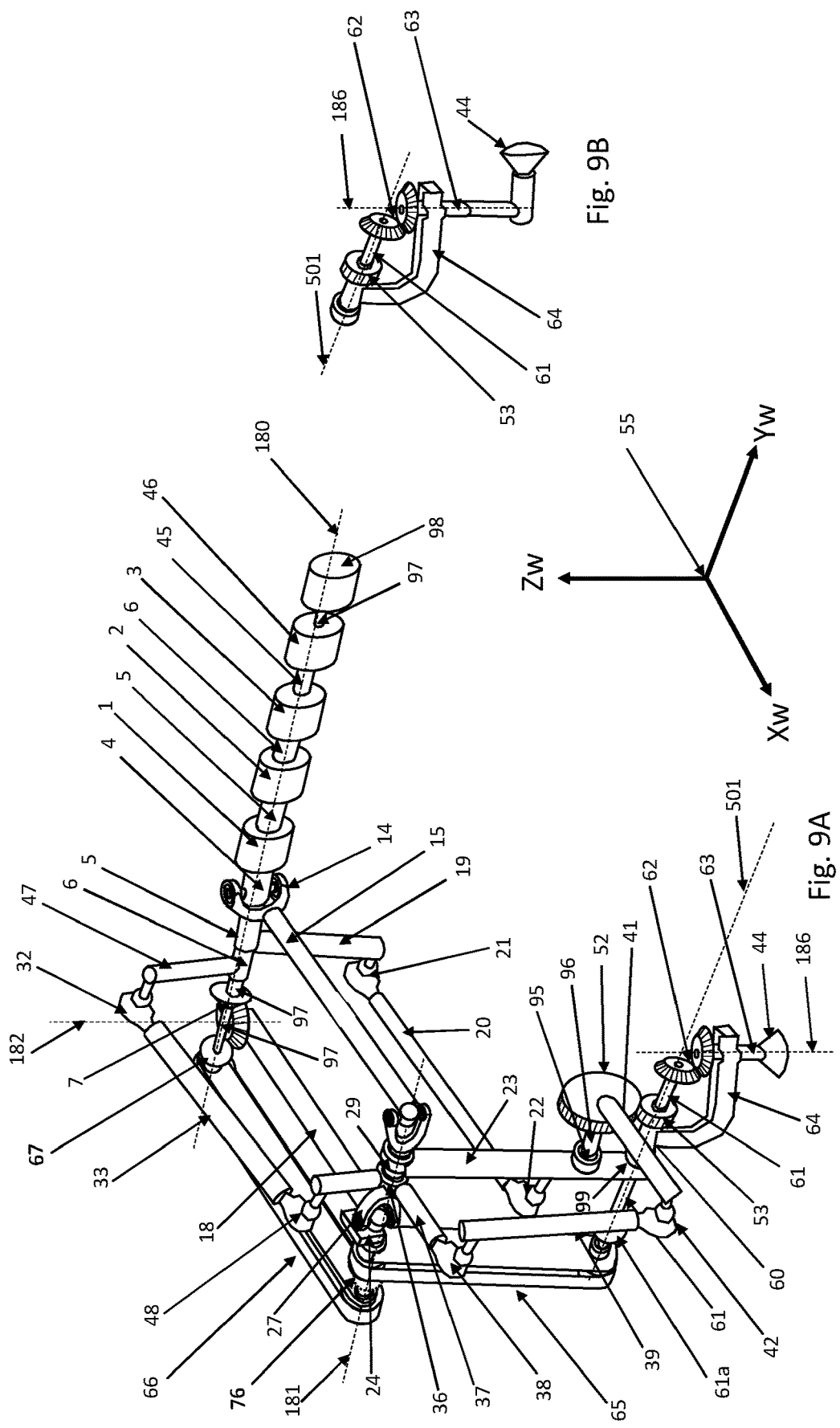
FIG. 9A illustrates a robot arm according to an eight embodiment of the disclosure.
FIG. 9B illustrates an alternative mounting of a tool.

FIG. 8 illustrates a robot arm according to a seventh embodiment of the disclosure. In detail, the seventh embodiment is an alternative design to the design in FIG. 7 with the target to obtain infinite tool rotation simultaneously with constant tool tilt angle. Thus, this seventh embodiment also comprises two transmission mechanisms to control orientation of the tool 44, in addition to three kinematic chains that controls position of the tool 44. In this design, the outer belt transmission is replaced by a rotating shaft 228, which simultaneously is the first outer link of the robot arm 500. Thus, the output of the second cardan joint 76 now drives a 90 degrees gear 62. The output of this gear 62 is connected to the shaft 228, which rotates in the bearing 230 and swings by means of the first connection bearing 31. The first connection bearing 31 is mounted on the first connection shaft 29 and the bearing 230 is connected to the first connection bearing 31 via the beam 231 in such a way that the rotation axis of bearing 230 is perpendicular to the second axis of rotation 181 of the first connection bearing 31. The shaft 228 is made to swing around the second axis of rotation 181 by means of the first outer link 23 connected to the shaft 228 via the joint 229. The joint 229 has one bearing with its rotation axis coinciding with the rotation axis of the shaft 228 and a pair of bearings with a common rotation axis perpendicular to the rotation axis of the shaft 228. At the lower end of the shaft 228 there is a fourth cardan joint 227, which transmits the rotation of the shaft 228 to the shaft 63. The shaft 63 rotates inside the hollow shaft 223 with inner bearing (not seen in the figure) and makes the tool 44 to rotate. Thus, the fourth actuator 46 rotates the tool 44 around the first axis of rotation 186 of the tool. A bearing 224a is used to constrain the fourth cardan joint 227 to tilt around the horizontal axis 227. The bearing is mounted between the hollow shaft 223 and the bearing 224b. by means of the mechanical connections 221 and 222. The shaft 228 rotates inside the bearing 224b and the axis of rotation 226 of bearing 224a is vertical and crosses the center of the fourth cardan joint 227. In order to keep the tilting angle of the tool 44 constant in the work-space of the robot arm 500, the hollow shaft 223 is connected to a lever 220, which in turn is connected to a link transmission 39, 33 as in FIG. 9A. Since this link transmission has an offset in the Yw-direction relative the shaft 228, an offset beam 219 is needed between the lever 220 and the bearing 42 of the link 39.

FIG. 9A illustrates a robot arm according to an eighth embodiment of the disclosure. The eighth embodiment includes the possibility to combine two different transmission mechanisms to obtain the kinematics for a 5 DOF robot arm 500, which can both rotate the tool around axes parallel with the Zw-axis and tilt the tool 44 around axes parallel with the Yw-axis of the coordinate system 55. This is what is needed to pick or place hanging and leaning objects and simultaneously rotate the objects. Thus, the eighth embodiment also comprises two transmission mechanisms that may be referred to as a fourth transmission mechanism and a fifth transmission mechanism, each configured to control a different axis of rotation 186, 501 of the tool 44. Thus, the fourth actuator 46 rotates the tool 44 around the second axis of rotation 501 of the tool. The fifth actuator 98 rotates the tool 44 around the first axis of rotation 186 of the tool. The parallelogram including the first inner link 15 and the second inner link 18 is designed in the same way as in FIG. 4. The transmission mechanism for rotating the tool 44 is the same as in FIG. 7. This transmission mechanism is actuated by a fifth actuator 98 (fourth actuator 46 in FIG. 5) and comprises the rotating outgoing shaft 97, (outgoing shaft 45 in FIG. 5), the first cardan joint 67, the belt transmission 66, the second cardan joint 76, the second belt transmission 65, a fifth cardan joint 61a (which replaces the second cardan joint 76), the rotating shaft 61, the 90 degrees gear assembly 62 and the rotating tool mounting shaft 63. The transmission mechanism for tilting the tool 44 is a combination of the transmission mechanisms in FIGS. 2 and 3. As in FIG. 2, the transmission mechanism from the third lever 47 to the second lever 37 comprises joint 32, link 33, joint 34 and an outer ring of the second connection bearing 36. Then the transmission mechanism from the second lever 37 to the tool 44 comprises joint 38, link 39, joint 42, tool connecting link 41, gear wheel 52, gear wheel 53, mechanical component 64 and the tool mounting shaft 63. With this design a robot arm with infinite tool rotation capabilities and at least +/−90 degrees tool tilting is obtained.

FIG. 9B illustrates the possibility to mount the tool 44 horizontal, whereby a five DOF arrangement for applications as painting, arc welding, laser welding and laser cutting is obtained.

Figure 10:
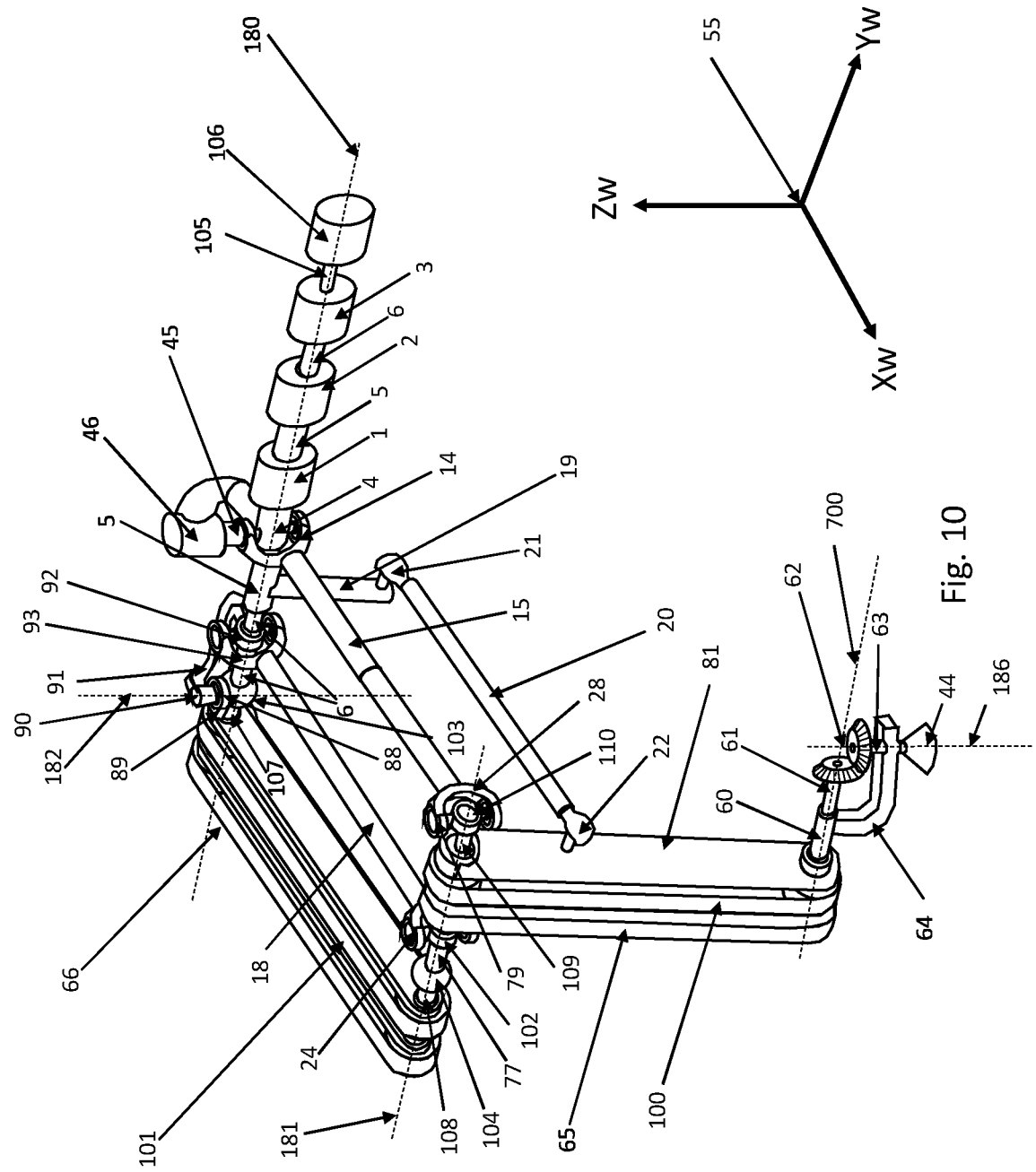
FIG. 10 illustrates a robot arm according to a ninth embodiment of the disclosure.

FIG. 10 illustrates a robot arm according to a ninth embodiment of the disclosure. The ninth embodiment comprises two transmission mechanisms, that enable both infinite tool tilting and tool rotation obtained by using two parallel belt transmissions. Here, the cardan joints 67 and 76 as of FIG. 9A have been replaced by double cardan joints 103 and 104 in order to make it possible to drive two belt transmissions 66 and 101 in parallel, and to output two concentric shafts for driving the two parallel belt transmissions 65 and 100. Thus, a sixth actuator 106 rotates outgoing shaft 105, which is connected to a belt transmission input shaft (not shown) of belt transmission 66 via the inner cardan joint of the double cardan joint 103 (see FIG. 13 for the design of a double cardan joint). The third actuator 3 rotates its outgoing shaft 6, which is connected to the belt transmission input shaft 107 via the outer cardan joint of the double cardan joint 103. Thus, the shaft 105 rotates inside the shaft 6 and the belt transmission input shaft for belt transmission 6 rotates inside the belt transmission input shaft for belt transmission 101. The belt transmission output shaft of belt transmission 66 rotates inside the belt transmission output shaft 108 of belt transmission 101 and via the inner cardan joint of double cardan joint 104 it is connected to the belt transmission input shaft 109 of the belt transmission 100. The shaft 109 is also mounted inside the bearing 110 of the joint 28. The belt transmission output shaft 108 of belt transmission 101 is hollow and is rotating outside the belt transmission output shaft of belt transmission 66. It is connected to the second connecting shaft 77 of the second belt transmission 65 via an outer cardan joint of the double cardan joint 104. The second connecting shaft 77 is also mounted inside the bearing 102 of the joint 24. The belt transmission output shaft 61 of second belt transmission 65 is connected to the 90 degrees gear assembly 62 and rotates the tool 44 via the tool mounting shaft 63. The belt transmission output shaft 60 of belt transmission 100 rotates the mechanical component 64, which tilts the tool 44. Thus, the third actuator 3 will rotate the tool 44 around the tool mounting shaft 63, thus a first axis of rotation 186, while the sixth actuator 106 will tilt the tool around a second axis of rotation 700 of the tool.

Figure 11:
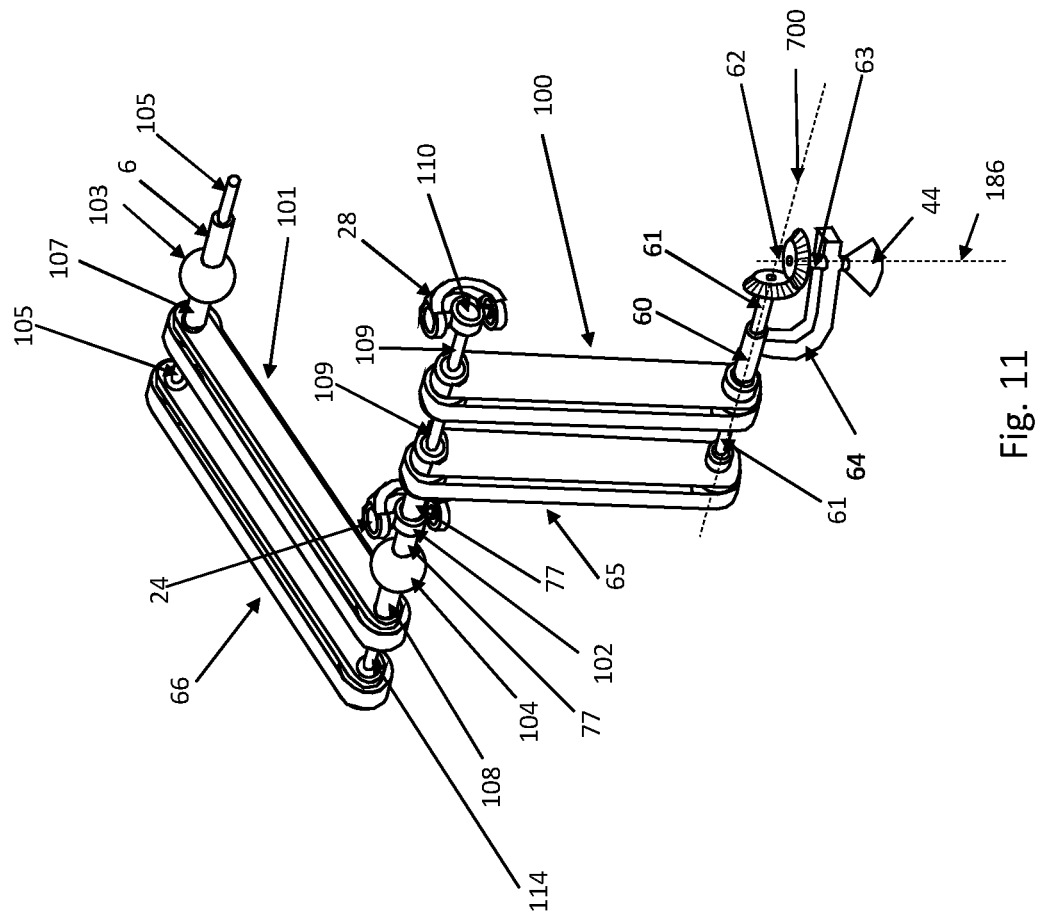
FIG. 11 illustrates another belt transmission mechanism according to some embodiments in isolation.

The concept with parallel belt transmissions is shown in more detail in FIG. 11. In this alternative belt transmission mechanism, the parallel belt transmissions have been separated to show the belt transmission input, and output shafts for all the belt transmissions. The components of the belt transmissions have already been described in connection with FIG. 6 and will not be repeated here. However, following the transmissions from output to input, the following is obtained:

Rotating shaft 105 will tilt the tool 44 via inner cardan joint of the double cardan joint 103, belt transmission input shaft 105, belt transmission output shaft 114, inner cardan joint of double cardan joint 104, belt transmission input shaft 109 and belt transmission output shaft 60.

Rotating shaft 6 will rotate the tool 44 via outer cardan joint of the double cardan joint 103, belt transmission input shaft 107, belt transmission output shaft 108, outer cardan joint of double cardan joint 104, second connecting shaft 77, belt transmission output shaft 61 and gear assembly 62.

Figure 12:
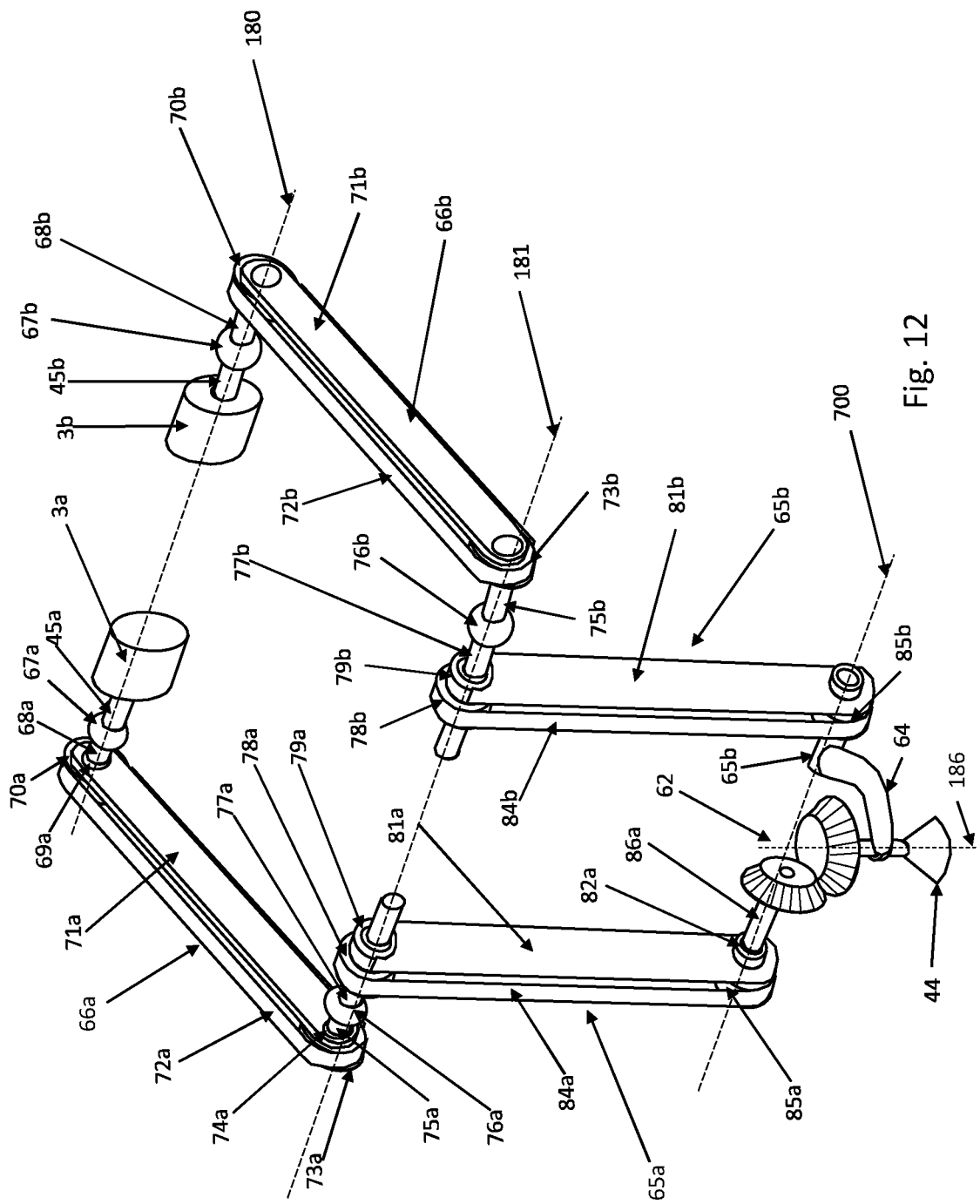
FIG. 12 illustrates a further belt transmission mechanism according to some embodiments in isolation.

FIG. 12 illustrates a further belt transmission mechanism according to some embodiments in isolation. In more detail, FIG. 12 shows an alternative way to use two belt transmissions. Here two sets of the belt transmissions illustrated in FIG. 8 have been used. The advantage in relation to FIG. 11 is that no double cardan joints are needed, but simultaneously the band transmissions will need more space. The notations are the same as in FIG. 8 with added "a" to the left-hand-side notations and "b" to the right-hand-side notations in the figure. The shaft 86a rotates the tool 44 via the 90 degrees bearing 62 and the shaft 86b tilts the shaft via the arm 64. Thus, the other actuator 3a rotates the tool 44 around a first axis of rotation 186 of the tool. The still other actuator 3b rotates the tool 44 around a second axis of rotation 700 of the tool. The shafts 86a and 86b rotate around a common axis 190. Another third actuator 3a drives the shaft 45a and still another third actuator 3b drives the shaft 45b. Another possible but less compact design is to mount the right belt transmissions "b" to the left-hand-side and the left belt transmissions "a" to the right-hand side. Then the shaft 86a will be mounted behind the belt wheel 85a and the shaft 86b in front of the belt wheel 85b. The shaft 86b will then be connected to the gear 62 and the shaft 86a to the arm 64.

FIG. 13 illustrates a double cardan joint according to some embodiments of the disclosure. The double cardan joint comprises an inner cardan joint and an outer cardan joint with coinciding joint centers. An inner shaft 106 is connected to a bracket 131 of the inner cardan joint. The bracket 131 is mounted on outer rings of bearings 132 and 133. The inner rings of the bearings 132 and 133 have coinciding rotation centers and are mounted on shafts 134 and 135, which are parts of a cross. The other shafts of the cross, 129 and 130 (130 hidden in the figure) are mounted inside inner rings of bearings 127 and 128 (128 hidden in the figure). A bracket 126 is mounted on the outer rings of the bearings 127 and 128 and is connected to a shaft 114. Thus, rotating the shaft 109 will rotate the shaft 114. A bearing (not shown in the figure) is used between the second connecting shaft 77 being hollow and the shaft 109 and another bearing (not shown in the figure) is used between the hollow shaft 115 and the shaft 114. The shafts 77 and 115 are in turn mounted inside bearings 102 and 74, respectively. The second connecting shaft 77 is connected to a bracket 122 of the outer cardan joint. The bracket 122 is mounted on the outer rings of the bearings 123 and 124. Inner rings of bearings 123 and 124 have coinciding rotation centers and are mounted on shafts 125a and 125b, which are mounted on a ring 136 with coinciding center axes. Two other shafts 120 and 121 with coinciding center axes are mounted on the ring 136 in such a way that the common center axis of shafts 120 and 121 cross the common center axis of the shafts 125a and 125b and that the common center axis of the shafts 120 and 121 are in the same plane as the common center axes of shafts 125a and 125b. The shafts 120 and 121 are mounted inside the bearings 118 and 119 respectively and the outer rings of bearings 118 and 119 are mounted on the bracket 117. The bracket 117 is in turn mounted on the shaft 108. Thus, rotating the second connecting shaft 77 will rotate the shaft 108 independent of the connection between the shafts 109 and 114. Of course, the shafts 129, 130, 134 and 135 could also be mounted like the shafts 125a, 125b, 120 and 121 on a ring.

Different types of transmission mechanisms have been shown to obtain rotation and tilting of the tool 44. The transmission types previously illustrated herein are single link transmission, link transmission including a backhoe transmission, link transmission including a gear assembly and belt transmission. These transmission types can be combined in different ways. One example of this is shown in FIG. 11, which includes one single link transmission, one link transmission including a gear and two belt transmissions.

Figure 14:
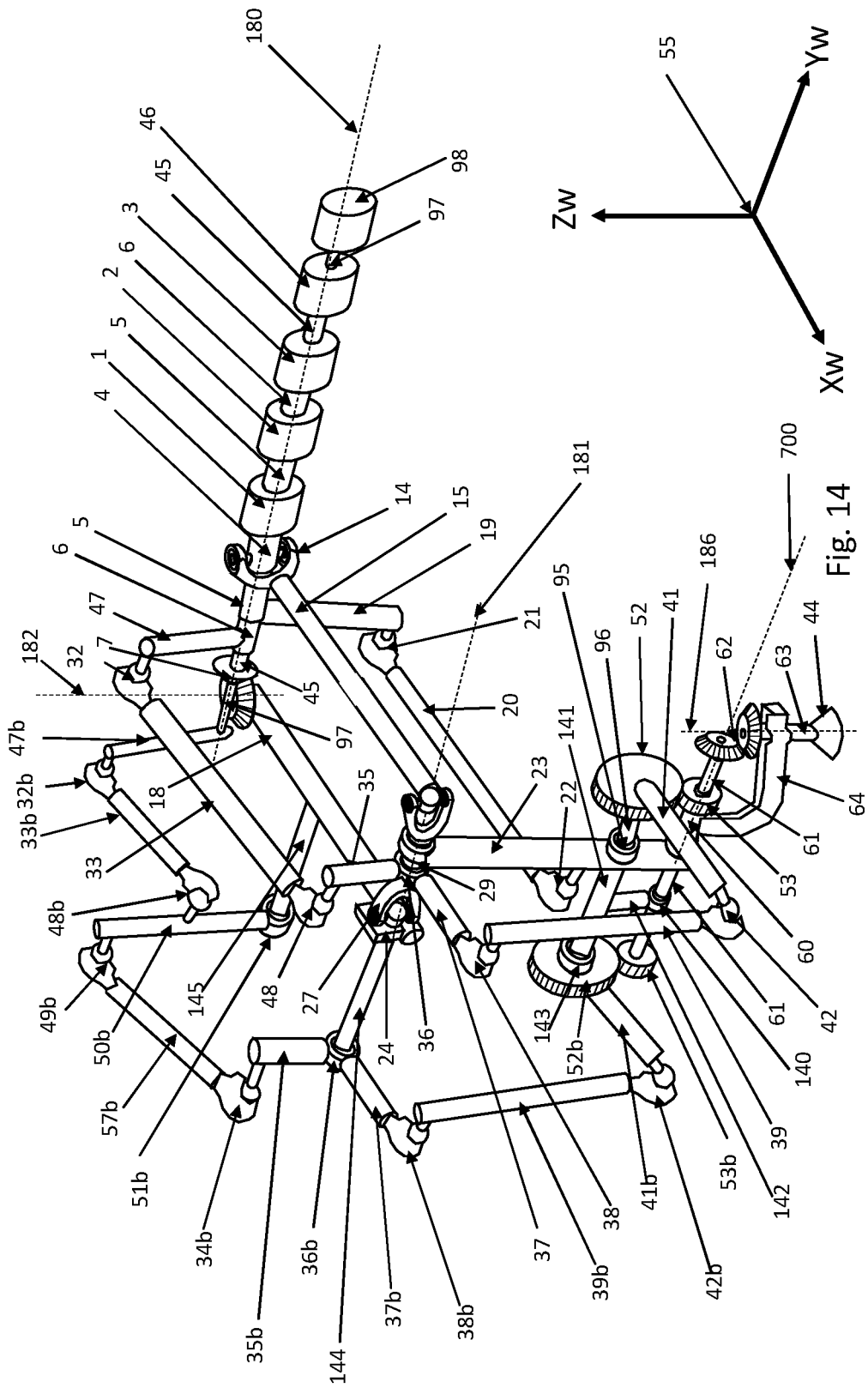
FIG. 14 illustrates a robot arm according to a tenth embodiment of the disclosure.

In FIG. 14, which illustrates a robot arm according to a tenth embodiment of the disclosure, another combination has been made, which is useful for pick- and place operations for hanging/leaning/laying objects, where the tool rotation does not need to be infinite. The tenth embodiment comprises two transmission mechanisms. In the tenth embodiment, the tool tilting is made with the same gear based second part of the transmission mechanism as used for tool tilting in FIG. 3, and the tool rotation is made with the same transmissions mechanism that was used for the first part of the transmission mechanisms for tool tilting in FIG. 3. The components of the transmission mechanisms controlling the rotation of the tool 44 have got the same numbering as the identical transmission mechanism used for tilting of the tool 44 in FIG. 3, only the letter b has been added to the numbers. In order to mount the transmission mechanism for the tool rotation, the extension 145 is introduced between the second inner link 18 and the bearing 51b, the extension 144 between the second inner link 18 and bearing 36b, extension 141 between first outer link 23 and bearing 143 and extension 142 between extension 141 and the bearing 140. The fifth actuator 98 actuates the transmission for tool rotation via the rotating shaft 97, on which a sixth lever 47b is mounted. Thus, the fifth actuator 98 rotates the tool 44 around a first axis of rotation 186 of the tool and the actuator 46 rotates the tool around a second axis of rotation 700.

Figure 15:
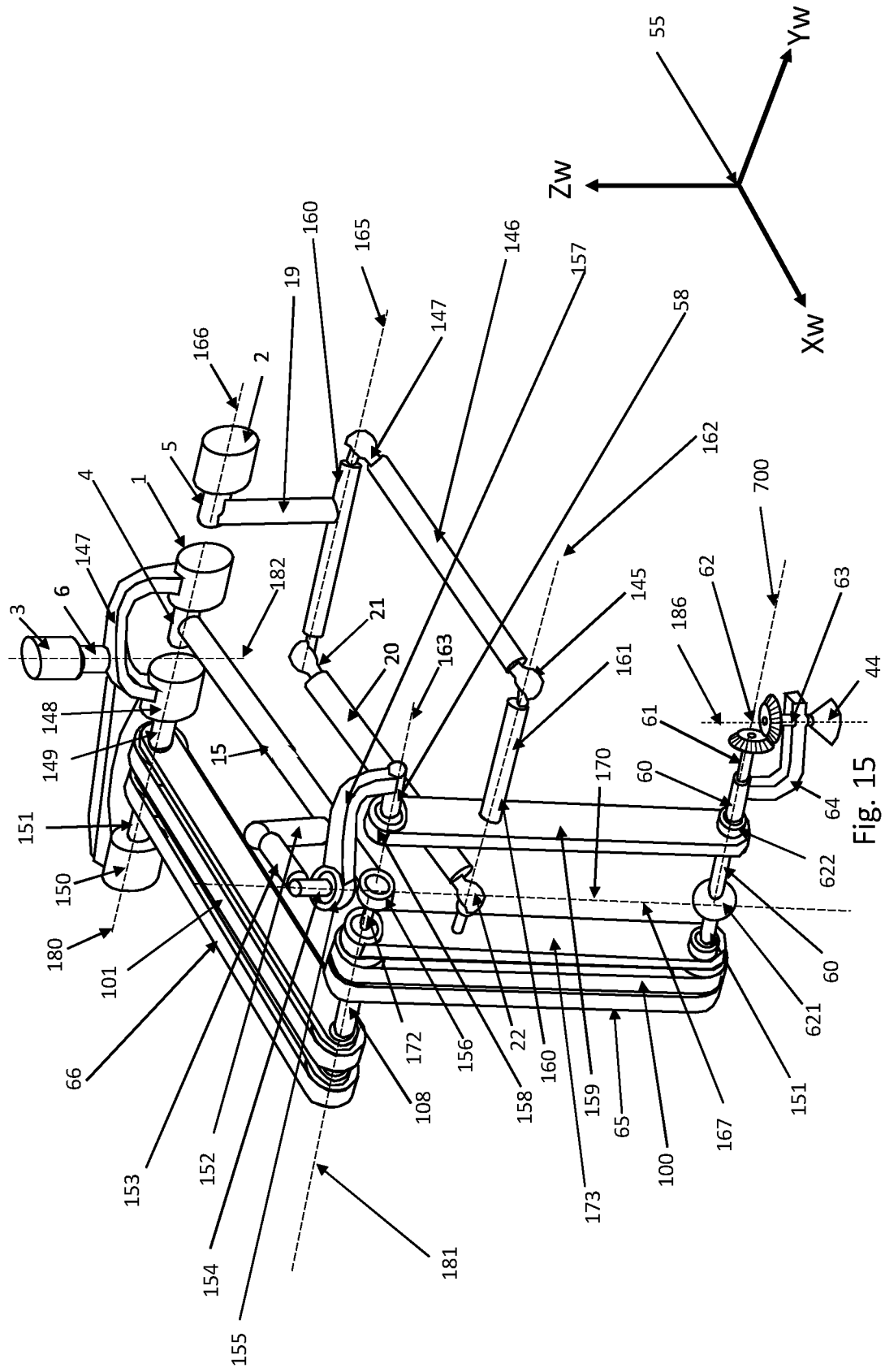
FIG. 15 illustrates a robot arm according to an eleventh embodiment of the disclosure.

FIG. 10 illustrated how to obtain both infinite tool rotation and tool tilting by means of four belt transmissions. FIG. 15 illustrates a robot arm according to an eleventh embodiment of the disclosure. In FIG. 15 the same result is obtained as in FIG. 10, with four belt transmissions but with only one double cardan joint. The eleventh embodiment thus comprises two transmission mechanisms. The robot arm structure in FIG. 15 is somewhat different from the one in FIG. 10 and will therefore be described in detail. Thus, the shaft 6 of the third actuator 3 is now rotating the first actuator 1, a seventh actuator 148 and an eight actuator 150 as these are connected to the shaft 6 by means of the bracket structure 147. First actuator 1 swings the second inner link 18, which is mounted on the shaft 4 of first actuator 1, up and down. Seventh actuator 148 rotates the belt transmission input shaft 149 of belt transmission 101 and eight actuator 150 rotates the belt transmission input shaft 151 of belt transmission 66. Since no double cardan joint is needed, the belt transmission input shaft 151 can be connected on the opposite side of the belt transmission 66. There is neither a need of a double cardan joint on the belt transmission output joints 108 and 172. The belt transmission output shaft 172 of belt transmission 66 rotates inside the belt transmission output shaft 108 of belt transmission 101 and is the belt transmission input of belt transmission 100, rigidly connected to the input belt wheel of belt transmission 100, and is in its end rotating in the bearing 156, which is mounted with its outer ring on the second inner link 18. The belt transmission output shaft 172 of belt transmission 66 is the belt transmission input of second belt transmission 65 and is rigidly connected to the input belt wheel of second belt transmission 65. Second actuator 2 rotates the shaft 5, whereby it swings the inner lever 19. Second actuator 2 and third actuator 3 are rigidly mounted on a stand, like the base 13 in FIG. 3. The inner lever 19 is connected to a beam 160, which in turn is connected to the parallel links 20 and 146 via the joints 21 and 147, respectively. Link 20 is connected to the belt transmission beam 173 of belt transmission 100 via the joint 22 and link 146 is connected to the extension beam 161. The extension beam 161 is mounted on the link 159, which is mounted to swing around the shaft 58 by means of the bearing 158. The shaft 58 is mounted on the extension 157, which is mounted on the outer ring of bearing 155. The inner ring of bearing 155 is mounted on the shaft 154, which is mounted on link 18 via the extension beams 152 and 153. The belt transmission output shafts of belt transmissions 65 and 100 are connected to a double cardan joint 621. The inner shaft 61 from the double cardan joint 621 rotates inside the outer shaft 60 from the double cardan joint 621 and is connected to the 90 degrees bearing 62. The outer shaft 60 from the double cardan joint 621 is mounted in the inner ring of bearing 622 and rotates the mechanical component 64. Thus, belt transmission 100 will transmit rotation for tilting the tool 44 and second belt transmission 65 will transmit rotation for the rotating of the tool 44. Thus, the seventh actuator 148 rotates the tool 44 around a first axis of rotation 186 of the tool. The eight actuator 150 rotates the tool 44 around a second axis of rotation 700 of the tool. In order to obtain proper functionality of the robot arm, the following mounting rules should be applied:

A straight line 162 through joints 22 and 145 should be horizontal and parallel with line 165 through the joints 21 and 165 and also parallel with the rotation axis 166 of the shaft 5.

Link 20 should have the same kinematic length as link 146

Line 167 should go through the center of double cardan joint 621, joint 22 and the point where the rotation axes of bearings 155 and 158 intersect.

Figure 16:
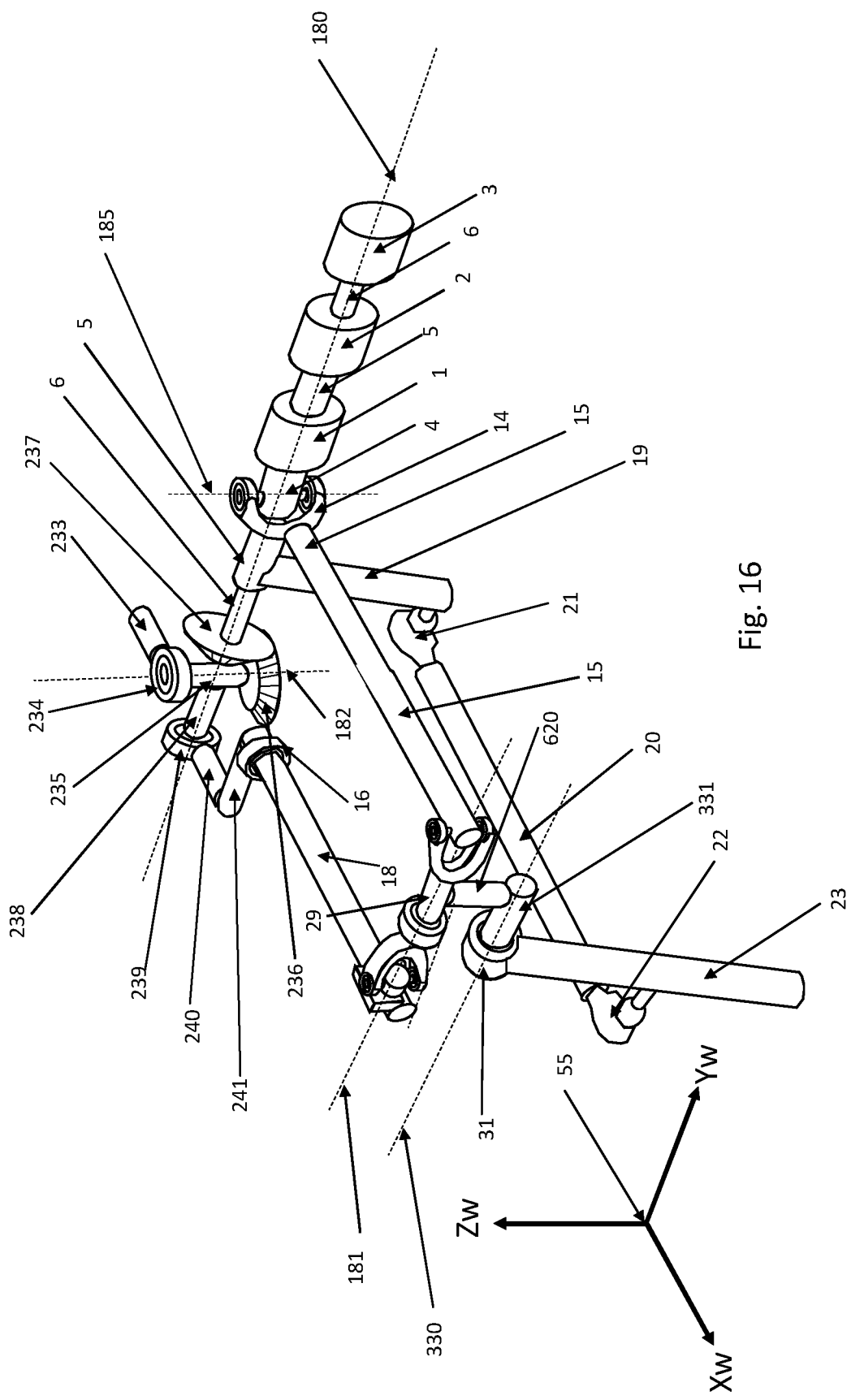
FIG. 16 illustrates an alternative configuration of the actuation order of joint axes for one of the actuated joints of the robot arm.

FIG. 16 illustrates an alternative configuration of the actuation order of joint axes for one of the actuated joints of the robot arm. In this configuration, a 90 degrees gear with input gear wheel 237 and output gear wheel 236 rotates the shaft 235 around a fixed vertical axis 182. The bearing 234 is thus mounted to a fixed base (not shown) via the beam 233. The rotation of axis 6 will swing the second inner link 18 in the plane of the first parallelogram. The second inner link 18 is also allowed to swing up and down, by means of the bearing 239 that is mounted on the shaft 238, which in turn is mounted at right angle to the shaft 235. The rotation axis of bearing 239 coincides with first axis of rotation 180. The second inner link 18 is mounted on the bearing 238 via the bearing 16, and the mechanical extensions 241 and 240. The bearing 16 is necessary in order to obtain working kinematics of the robot arm. The FIG. 16 outlines only the components dependent on the change in rotation order of the rotation axes for the axes 180 and 182. This solution will make the control of the 90 degrees gear simpler but will add the bearing 16. It should be mentioned that instead of a 90 degrees gear and a transmission with the shaft 6 from third actuator 3 through the first actuator 1 and the second actuator 2, a vertically mounted third actuator 3 on the fixed base 13 can be used. The output shaft 6 of third actuator 3 will then also be the shaft 235. FIG. 16 also shows that it is not necessary to mount the first outer link 23 on the first connection shaft 29. It is thus also possible to mount the first outer link 23 on a separate shaft 331 via the first connection bearing 31. However, an axis of rotation 330 of the first connection bearing 31 should be parallel with the second axis of rotation 181. In the FIG. 16 the shaft 331 is mounted on the first connection shaft 29 by means of the extension rod 620.

Figure 17A:
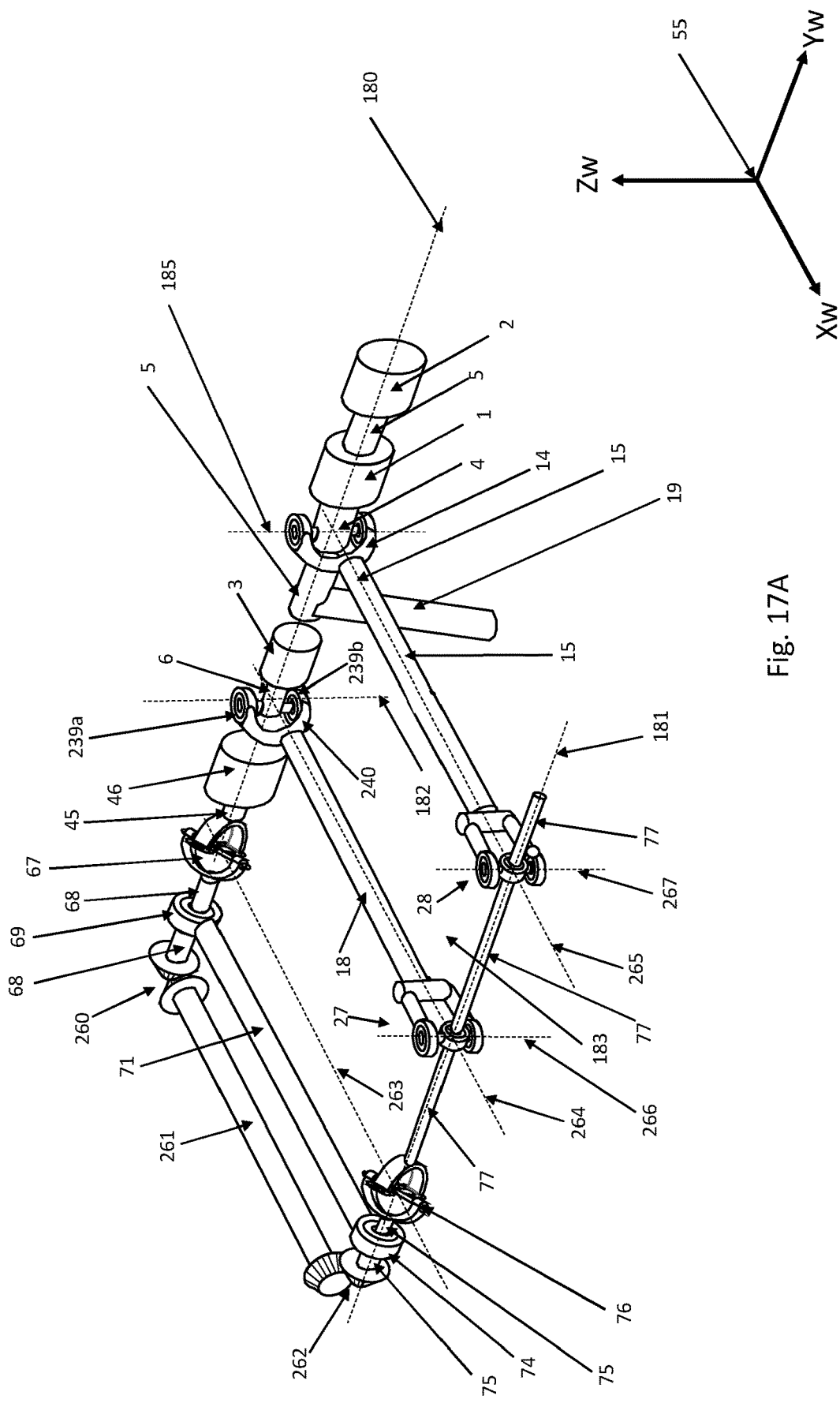
FIG. 17A illustrates another alternative where one belt transmission has been replaced by a shaft transmission.

FIG. 17A illustrates another alternative where one belt transmission has been replaced by a shaft transmission. The shaft transmission is parallel with the parallelogram 183. Here the 90 degrees gear in FIG. 4 has been omitted and the third actuator 3 that drives the 90 degrees gear in FIG. 4 is mounted on the base 13 close to the inner end of the second inner link 18. Thus, the second inner link 18 is mounted on the shaft 6 via a bracket 240 and a pair of bearings 239a and 239b. The common rotation axis of the bearings 239a and 239b is at right angle to the axis 180 and coincides with the axis 182. A fourth actuator 46 with output shaft 45 rotates the input of the first cardan joint 67 around the axis 180. The output shaft 68 of the first cardan joint 67 engages the 90 degrees joint 260 and is mounted in the bearing 69. The 90 degrees gear 260 is connected to the 90 degrees gear 262 via a shaft 261 (bearings for the shaft, mounted on the beam 71, not shown in the figure). The output of the 90 degrees gear 262 rotates the shaft 75, which is mounted in the bearing 74. The bearings 69 and 74 are mounted in each end of the beam 71. The shaft 75 is connected to the second cardan joint 76, which in turn is connected to the second connecting shaft 77. The line 263 between the centers of the cardan joints 67 and 76 should be parallel with the line 264 between the crossing of lines 266 and second axis of rotation 181 and the crossings between the first axis of rotation 180 and third axis of rotation 182. Rotating shaft 45 of the fourth actuator 46 will rotate the second connecting shaft 77. The second connecting shaft 77 can then be connected to for example the input wheel of a belt transmission or a shaft transmission as in FIG. 8. The mechanism with the bearing 88 as in FIG. 5 to constrain the cardan joint transmission is needed also in FIG. 19, but not included. Of course, the two 90 degrees gears 260 and 262 together with the shaft 261 can be replaced by a belt transmission.

Figure 17B:
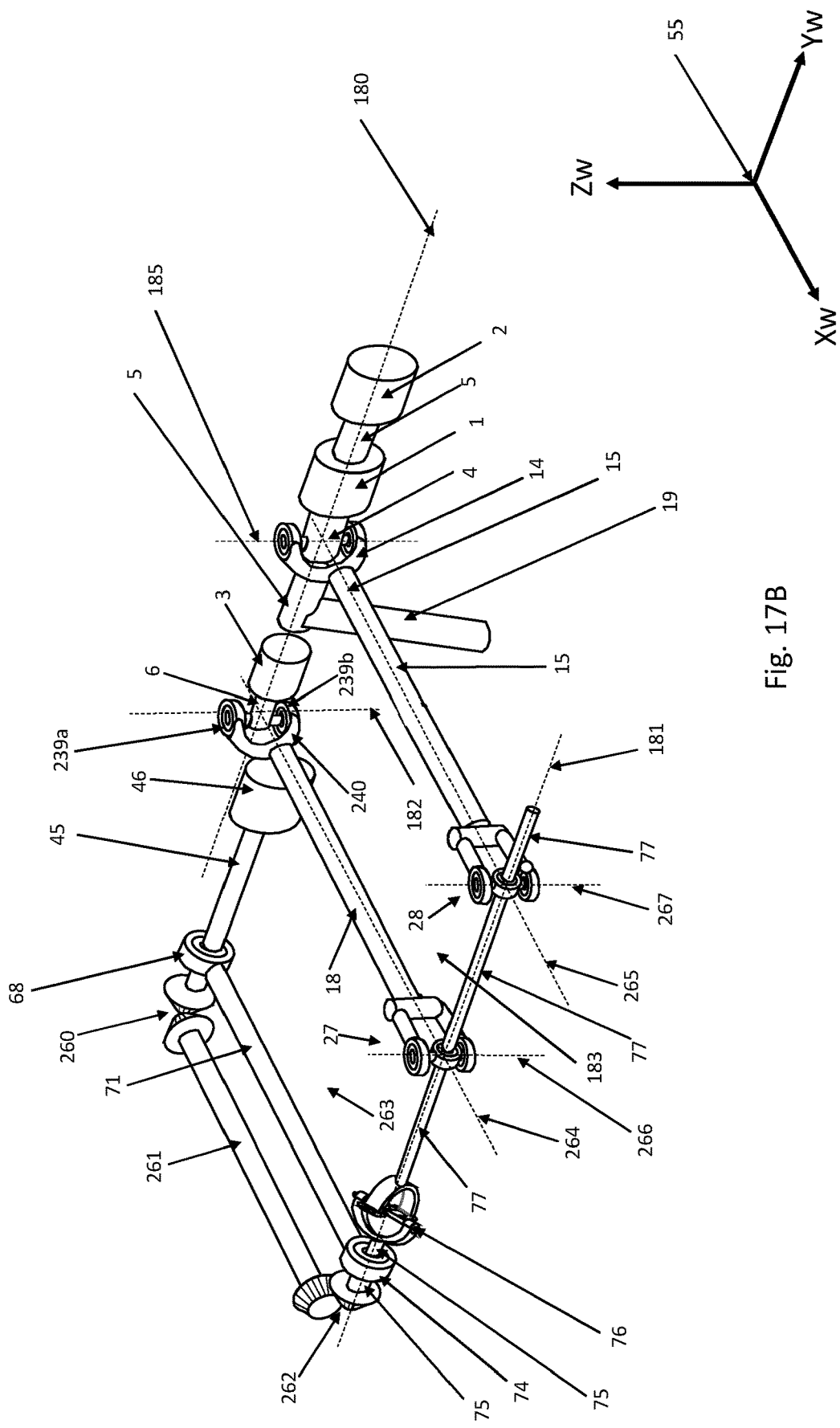
FIG. 17B illustrates still another alternative where one belt transmission has been replaced by a shaft transmission.

FIG. 17B illustrates a variant of FIG. 17A. In FIG. 17B the fourth actuator 46 is mounted on the second inner arm 18, which will increase the inertia for third actuator 3, but simultaneously the first cardan joint 67 in FIG. 17A is no longer needed. This possibility to mount an actuator for rotation or tilt control of the tool 44 may be used for all the transmission mechanisms, even if in the cases when cardan joints are not needed.

Figure 17C:
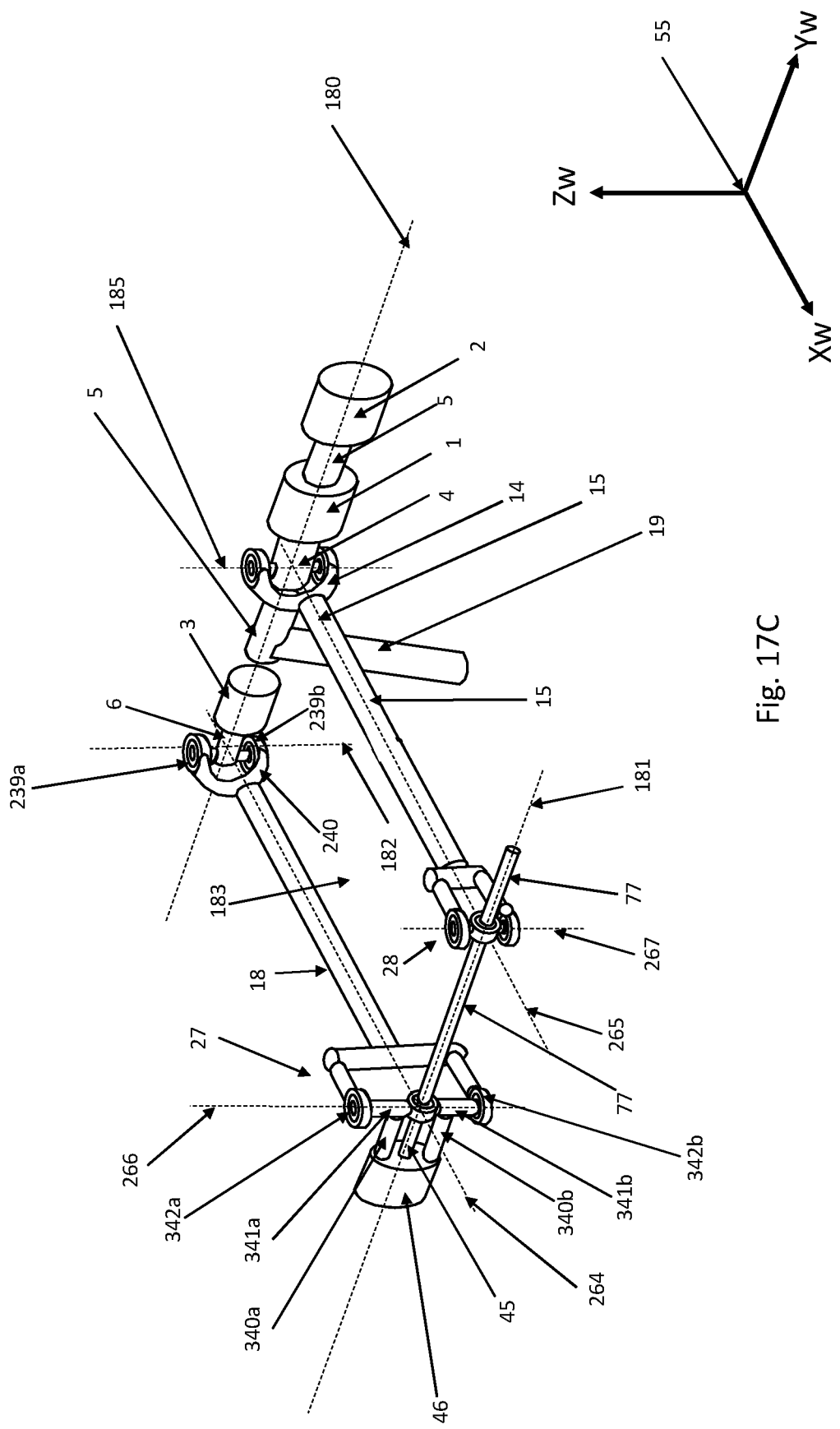
FIG. 17C illustrates a further alternative of FIG. 17A.

FIG. 17C illustrates a still further variant of the embodiment of FIG. 17A. In FIG. 17C, the possibility to mount the fourth actuator 46 for rotation or tilt control of the tool 44 on the joint 27 is illustrated. Alternatively, the same can be made on joint 28 and can be used to drive all the types of transmission mechanisms connected to the outer link 23. In the FIG. 17C the fourth actuator 46 is mounted by means of mechanical connections 340a and 340b on shafts 341a and 341b of the joint 27. The shafts 341a and 341b rotate in the joint bearings 342a and 342b and thus the fourth actuator 46 will obtain the direction of the second connecting shaft 77, which is also the output shaft 45 of the fourth actuator 46. Of course, it is not necessary to use the bearings 342a and 342b with the shafts 341a and 341b to connect the fourth actuator 46 to the second inner arm 18. Instead a separate bearing with the center of rotation aligned with the axis 266 can be used to connect the fourth actuator 46 with the second inner arm 18.

Figure 18:
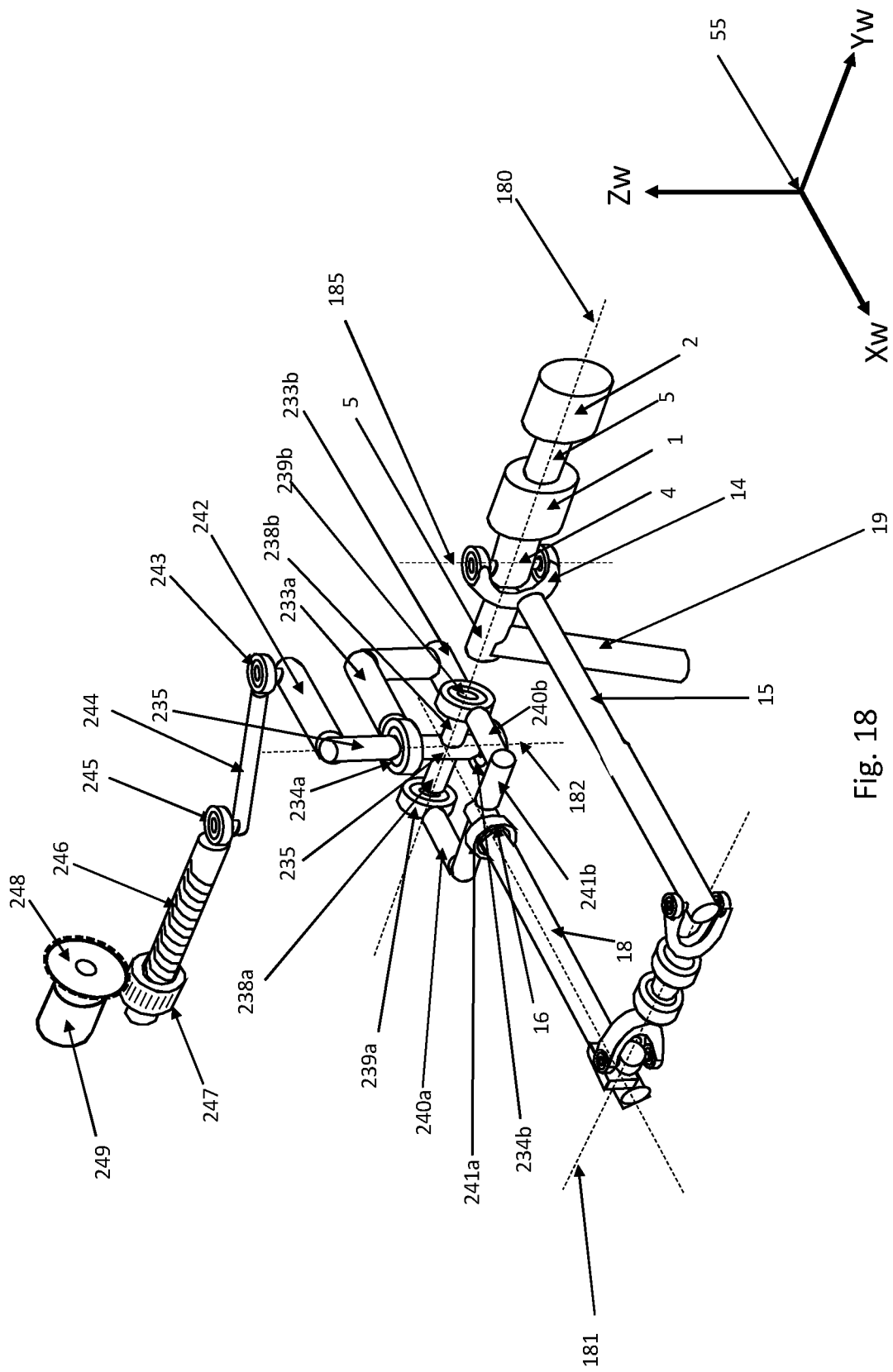
FIG. 18 illustrates an alternative design to the embodiment in FIG. 16.

FIG. 18 illustrates an alternative design to the embodiment in FIG. 16. In more detail, the embodiment in FIG. 18 illustrates a modification of the design in FIG. 16 with respect to the actuation of the second inner link 18 around the axis 182. In FIG. 18 the rotation around the axis 182 is obtained by a ball screw arrangement. Thus, a ninth actuator 249 rotates a nut 247 by means of a gear wheel 248, whereby a screw moves the bearing 245. The movement of bearing 245 is transferred to movement of bearing 243 via a link 244 and since the bearing 243 is mounted on a lever 242, a shaft 235 will rotate around the vertical rotation axis 182. The shaft 235 is mounted in bearings 234a and 234b with a common rotation axis coinciding with the third axis of rotation 182. The bearings 234a and 234b are mounted on a base (not shown) via beams 233a and 233b. The second inner arm 18 is mounted on bearings 239a and 239b as in FIG. 19, and the bearings 239a and 239b are turn mounted on a shaft 235 via shafts 238a and 238b. The bearings 239a and 239b have a common axis of rotation, which is perpendicular to the third axis of rotation 182. It should be noted that a linear bearing is needed for the ball screw 246. Reasons for using a solution with a ball screw actuator are possible smart engineering solutions and low-cost components.

Figure 19:
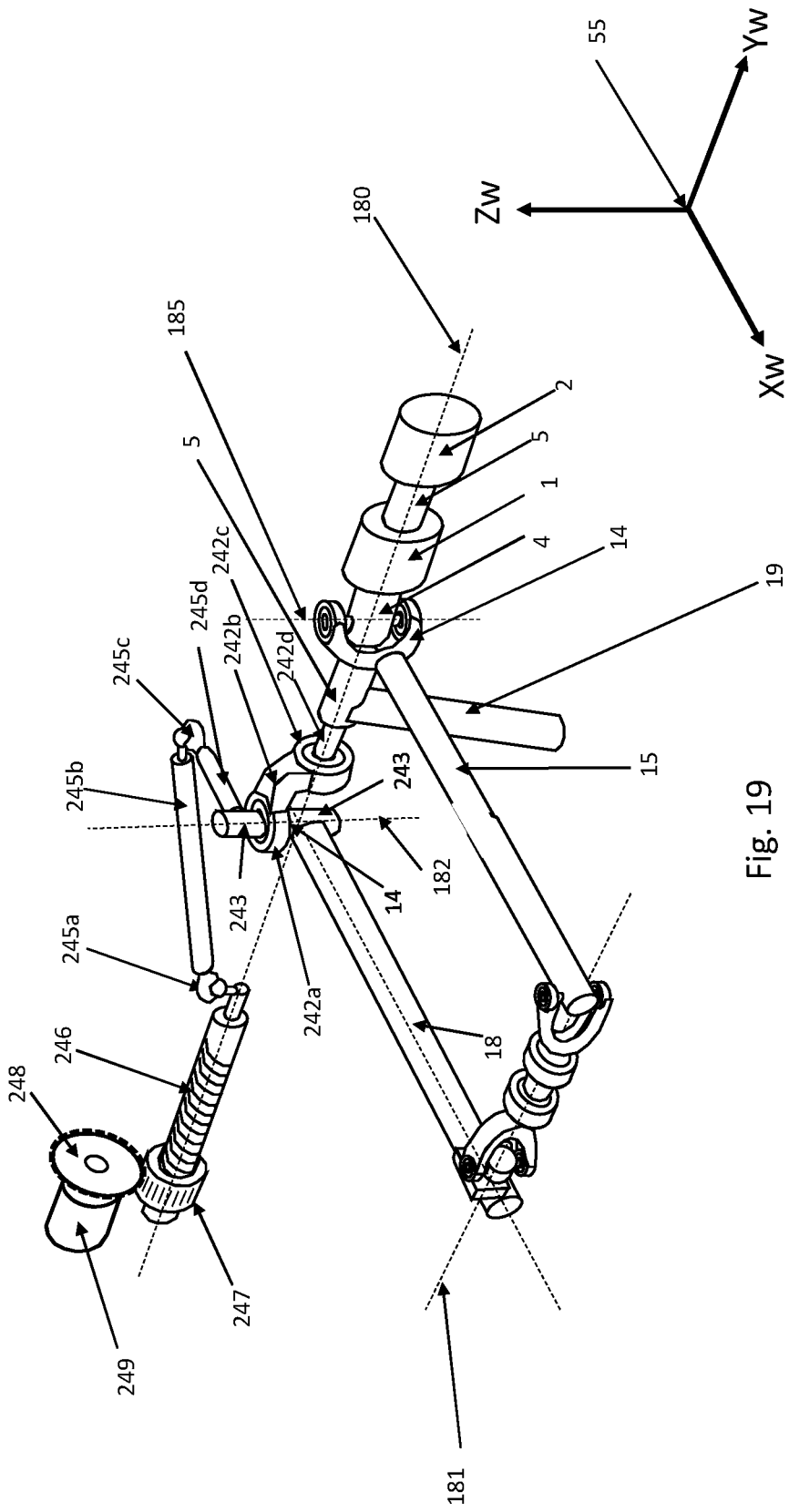
FIG. 19 illustrates an alternative design to the embodiment in FIG. 18 with respect to the actuation of a second inner link around a third axis of rotation.

FIG. 19 illustrates an alternative design to the embodiment in FIG. 18 with respect to the actuation of a second inner link 18 around the third axis of rotation 182. In FIG. 18 the ball screw arrangement rotates the second inner link 18 around a fixed third axis of rotation 182, but in FIG. 19 the ball screw rotates the second inner link 18 around the third axis of rotation 182 when the third axis of rotation 182 is rotated around the first axis of rotation 180. In this way the bearing 16 in FIG. 18 is not needed. Thus, the ninth actuator 249 rotates a nut 247 by means of a gear wheel 248, whereby a screw moves the bearing 245a. The movement of bearing 245a is transferred to movement of bearing 245c via a link 245b and since the bearing 245c is mounted on a lever 245d, a shaft 243 will rotate around the vertical third axis of rotation 182. The shaft 243 is mounted in a bearing 242a and rotates the second inner link 18 around the third axis of rotation 182. Bearings 234a and 234b are mounted on a fixed base (not shown) via a beams 233a and 233b. The second inner arm 18 is mounted on bearings 239a and 239b and the bearings 239a and 239b are in turn mounted on the shaft 235 via shafts 238a and 238b. The bearing 242a is mounted on the bearing 242c via the attachment 242b. The first axis of rotation 180 is the rotation axis also for bearing 242c and bearing 242c is mounted on the shaft 5 of second actuator 2 via the shaft 242d. Of course, the bearing 242c could also be mounted directly to the fixed base (not shown) for the robot arm. It may also be possible to use a bearing 242c of larger diameter and place it to the left of the bearing 242a and have the ball screw go through inside the bearing 242c. Reasons for using a solution with a ball screw actuator are possible smart engineering solutions and low-cost components.

Figure 20:
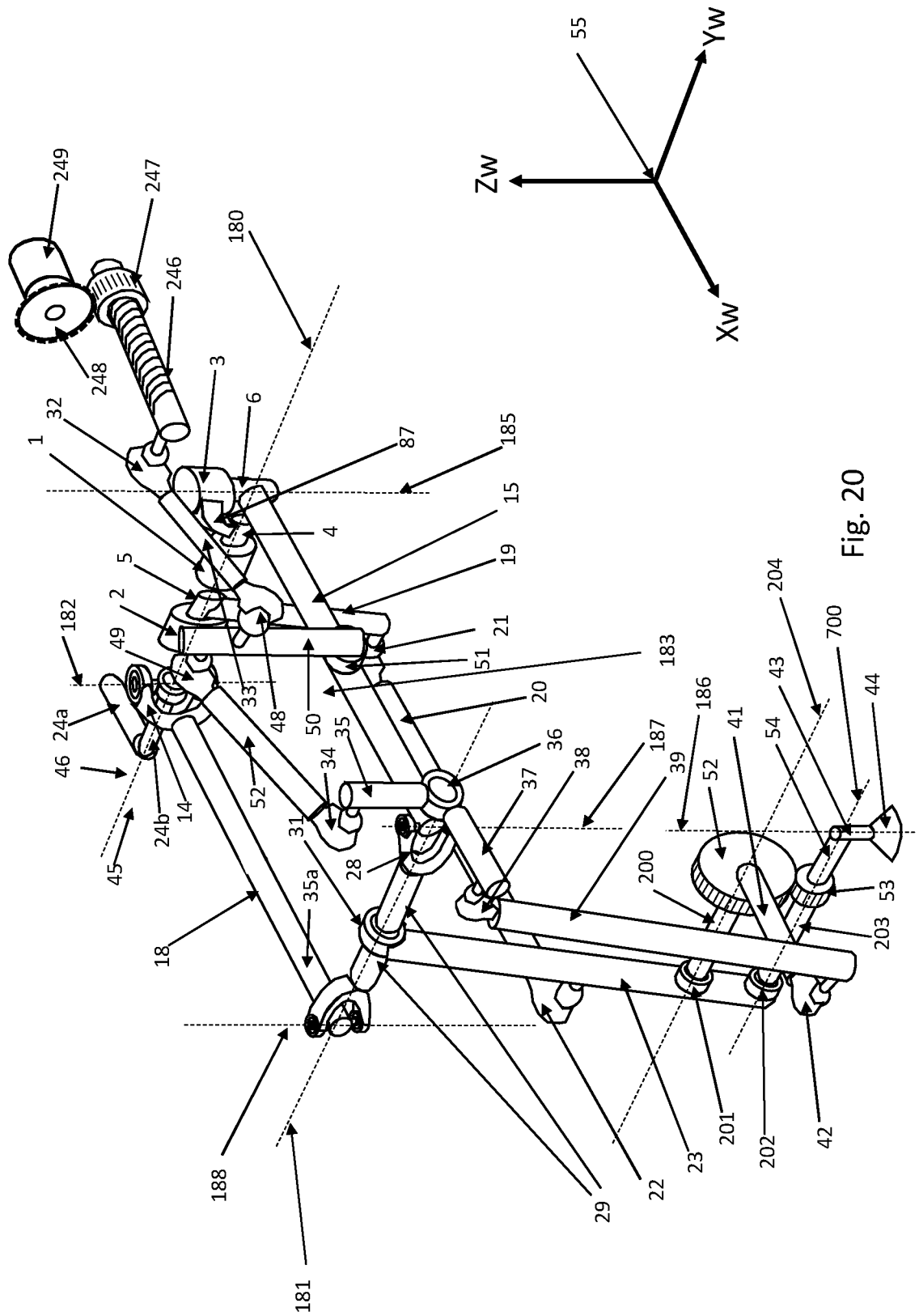
FIG. 20 illustrates a robot arm according to a twelfth embodiment of the disclosure.

FIG. 20 illustrates a robot arm according to a twelfth embodiment of the disclosure. The twelfth embodiment illustrates the possibility to use a solution with a ball screw also to drive a transmission mechanism including a backhoe transmission and a gear transmission. Thus, FIG. 20 is a copy of the embodiment of FIG. 3, where the fourth actuator 46, the shaft 45 and the third lever 47 have been replaced by a ball screw arrangement. The joint 32 is here mounted directly on the ball screw, which is actuated by the rotation of the nut 247. A ninth actuator 249 rotates the nut 247 by means of a gear 248. The same actuation concept with a ball screw can be used if the gear mechanism 52 to 53 is mounted on the first inner link 15 or if a single link transmission is used as in FIG. 2. In this figure the actuator 249 rotates the tool 44 around a second axis of rotation 700.

Figure 21:
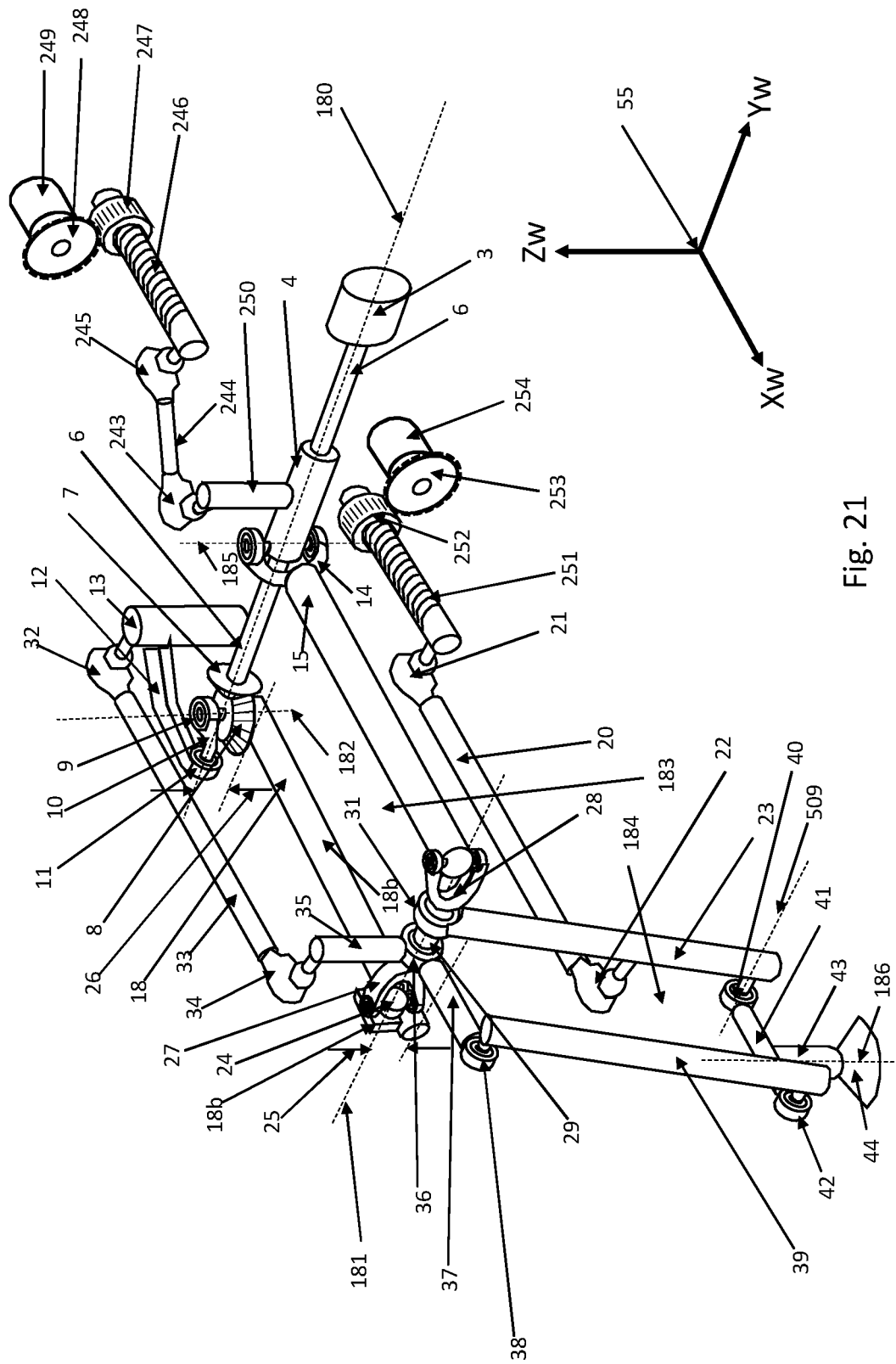
FIG. 21 illustrates a robot arm according to a thirteen's embodiment of the disclosure.

FIG. 21 illustrates a robot arm according to a thirteen's embodiment of the disclosure. This embodiment illustrates more possibilities to use a ball bearing concept for actuation of the robot arm. FIG. 21 is based on FIG. 4. In FIG. 21, both the first actuator 1 and the second actuator 2 are replaced by ball screw concepts as those shown in FIGS. 18 to 20. A ball screw 246 is thus connected to rotate a shaft 4 via a lever 250 and a link 244. When the ninth actuator 249 rotates a gear 248, a nut 247 will rotate, the ball screw will move a joint 245, the link 244 will transfer this movement to a joint 243 and the lever 250 will rotate the shaft 4 around the first axis of rotation 180. A tenth actuator 254 will rotate a gear 253, which rotates a nut 252, which moves a ball screw 251 and a joint 21 will move a link 20, which makes the first outer link 23 to rotate around the first connection bearing 31. The lever mechanism here thus comprises a ball screw 251.

Figure 22:
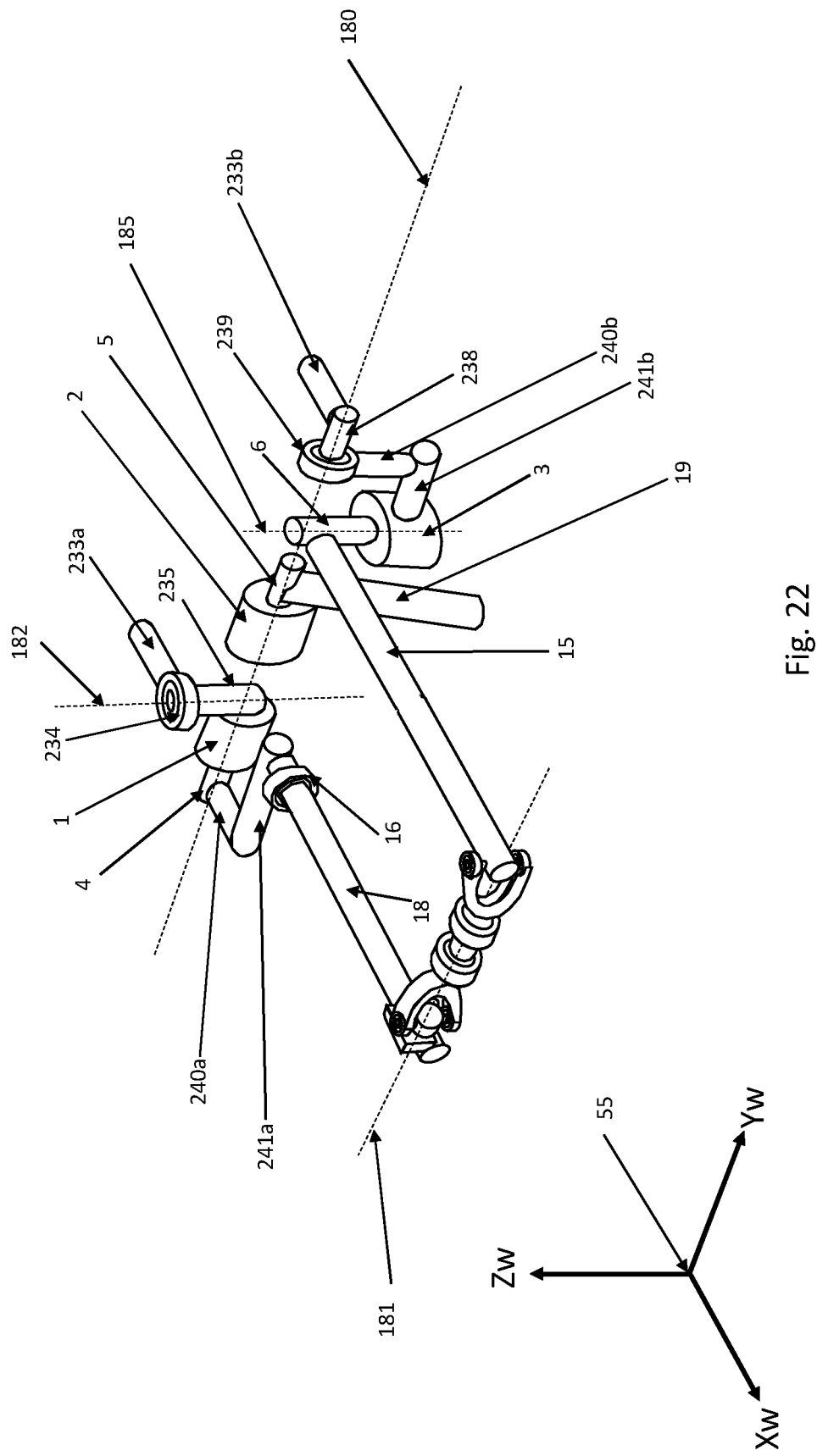
FIG. 22 illustrates an alternative design to the embodiment in FIG. 19.

FIG. 22 illustrates an alternative design to the embodiment in FIG. 19. In more detail, FIG. 22 gives one more example how the inner ends of the first inner link 15 and the second inner link 18 can be mounted relative a base by means of bearings and rotating actuators. There are many possibilities to mount the inner ends of the inner links 15, 18 on the base with respect to the axis of rotation 180, 182 and 185. To obtain the desired kinematic performance, the possibilities in which the order of which the serially connected implemented first axis of rotation 180 and third axis of rotation 182, and the serially connected implemented first axis of rotation 180 and sixth axis of rotation 185 are mounted are, however, limited. Thus, it is necessary that either the first axis of rotation 180 is implemented closer to the base than the third axis of rotation 182, and/or the first axis of rotation 180 is implemented closer to the base than the sixth axis of rotation 185. Both the third axis of rotation 182 and the sixth axis of rotation 185 cannot be implemented as closest to the base. In FIGS. 1-14, 17, 19 and 21, the first axis of rotation 180 is implemented by bearings or actuators to be mounted on the base both for first inner link 15 and second inner link 18. In FIGS. 16 and 18, the first axis of rotation 180 is implemented on the base only for first inner link 15. In this case a bearing 16 is needed, otherwise it will not be possible to maintain that the second axis of rotation 181 and first axis of rotation 180 are parallel in the workspace.

In order to obtain the targeted functionality, it is also beneficial that one actuator is connected to the inner end of first inner link 15 and/or the inner end of the second inner link 18 in order to rotate the inner links 15, 18 around the first axis of rotation 180. With respect to the first axis of rotation 180, an actuator can be connected either to the inner end of first inner link 15 or the inner end of second inner link 18, or the actuator can have a shaft reaching both inner ends of first inner link 15 and second inner link 18. With respect to the third axis of rotation 182 and the sixth axis of rotation 185, an actuator is either connected to the inner end of first inner link 15 or the inner end of second inner link 18. Of course, an actuator can also be connected both to the inner end of first inner link 15 and the inner end of second inner link 18 by means of for example a belt transmission.

In FIG. 22, the first actuator 1 rotates the second inner link 18 around the first axis of rotation 180 via the shaft 4 and extensions 240a and 240b. Since the third axis of rotations 182 is implemented as fixed to the base by means of the shaft 235, the bearing 234 and the extension 233a, a bearing 16 is needed for the second inner link 18. Third actuator 3 rotates the first inner link 15 around the sixth axis of rotation 185 and the first inner link 15 rotates around the first axis of rotation 180 by means of the bearing 239, which is fixed to the base via the shaft 238 and the extension 233b. The third actuator 3 is mounted on the bearing 239 via the extensions 241b and 240b.

FIG. 23A illustrates a robot arm according to a fourteenth embodiment of the disclosure. In more detail, FIG. 23A illustrate an alternative to FIG. 3 to increase the tilting range of the tool 44. In FIG. 3 a gear train is used to increase the tilting range of the tool and in FIG. 23A the gear mechanism has been replaced by a linkage mechanism, which has the advantages that no gear box lubrication is needed and that the tilting of the tool is combined with a movement of the tool to increase its accessibility. In FIG. 3 there is also a backhoe transmission and such a mechanism can of course also be used in FIG. 23A. The base structure in FIG. 23A with the first inner link 15 and the second inner link 18 and the first connection shaft 29 is the same as in FIG. 2. The link 20 is now mounted above the parallelogram formed by the links 15 and 18 and therefore the inner lever 19 is working upwards and the first outer link 23 is connected to a joint 501a via a seventh lever 501. This will increase the accessibility for the first outer link 23 with respect to the environment. The mechanism with the kinematics shown in FIG. 23B is mounted at the end of first outer link 23. This mechanism is actuated by an eleventh actuator 320 with an outgoing shaft 321, on which an eight lever 322 is mounted. The joint 32 is mounted on the eight lever 322 and by means of the inner link 33, the joint 34, the first lever 35a-35b and the second connection bearing 36, the second lever 37 will swing up and down around the second axis of rotation 181 when the eight lever 322 is swinging around the first axis of rotation 180. The second connection bearing 36 is mounted on the first connection shaft 29. Swinging the second lever 37 up and down will make a tilting lever 300 also to swing up and down around a first beam shaft 312a. The first beam shaft 312a can be mounted in different directions dependent on in which direction the tilting is needed in the application. In the figure, the direction of the center line of the first beam shaft 312a is in the Xw/Yw-plane between the Xw and Yw-axis of the world coordinate system. A tilting beam 302 is connected to a first beam bearing 301, which is mounted on the first beam shaft 312a. The tilting beam 302 is also connected to the tilting lever 300. Swinging the tilting lever 300 for example downwards, will therefore rotate the tilting beam 302 around the first beam shaft 312a to the right. A second beam bearing 303 is mounted at the lower end of the tilting beam 302 and a second beam shaft 304 is mounted in the second beam bearing 303. The second beam shaft 304 is connected to a beam 305 via a ninth lever 309, a first beam bearing 310, a link 307 and a second beam bearing 306. This linkage design between the beam 305 and the second beam shaft 304 will give the second beam shaft 304 a rotation in the same direction as the rotation of the tilting beam 302 when the tilting lever 300 is rotated. And as a consequence, the tool 44 with a tool holder or tool shaft 311 will rotate about double the angle of the rotation of the tilting lever 300 since the rotation of the tool 44 will be the sum of the rotation of the tilting beam 302 and the rotation of the second beam shaft 304. The beam 305 is mounted on the first outer link 23. The shaft 312, via the first beam shaft 312a, is also mounted on the first outer link 23. The tilting mechanism is configured to transfer a tilting movement of the tilting lever 300 to a correspondingly increased tilting movement of the tool 44. The tilting movements are in the same direction. Thus, the linkage mechanism magnifies the movement of the tilting lever 300 to the movement of the tool shaft 311. The first beam bearing 310 and the second beam bearing 306 are arranged at different sides of a plane defined by the axis of rotation of the second beam shaft 304 and the first beam shaft 312a. In this figure the eleventh actuator 320 rotates the tool 44 around two axes of rotation 502/503 of the tool, where both axes are situated in the horizontal plane and therefore are of the type of a second axis of rotation. The total rotation of the tool 44 is the sum of the rotations around the axes 502 and 503.

FIG. 23B illustrates the kinematics of the tilting mechanism for tool rotation in FIG. 23A. The continuous lines show the state of the kinematics when the tool holder or tool shaft 311 is in vertical orientation. Broken lines show the kinematics after a rotation of the tilting lever 300. The numbering of the components is the same as in FIG. 23A. The upper figure shows when the tilting lever 300 is rotated upwards an angle 390. As result the link 307 is rotated the same angle and a second beam bearing 303 will be moved to position 303r. Because of the tilting beam 302, the ninth lever 309 will be rotated relative the link 307 upwards and the bearing 310 will be moved to position 310r. This means that the tool 44 will be rotated and moved along the line 391 to get the orientation and position 44r. The lower figure of FIG. 23B shows the corresponding kinematics when the tilting lever 300 is rotated downwards the angle 392. The tool 44 will then be rotated and moved along the line 393 to 44r. The combined rotation and movement of the tool 44 can be used to reach restricted spaces with the tool 44, for example in machine tending applications. Then it will be possible to adapt the length relations between the tool holder or tool shaft 311, the link 307 and the link 23 and link 324 to match the geometry of the machine to be tended.

Figure 24:
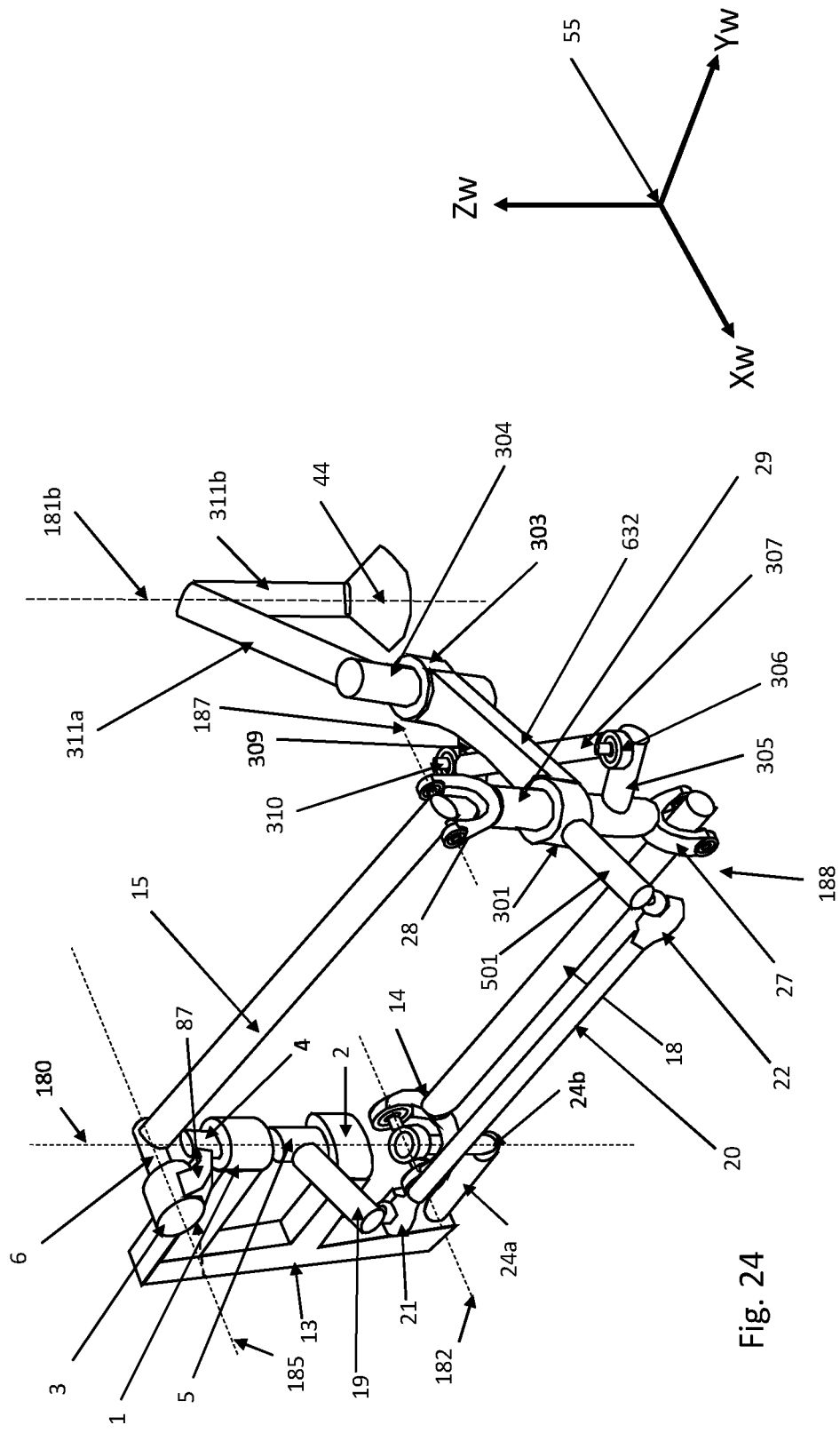
FIG. 24 illustrates part of a robot arm according to a fifteenth embodiment of the disclosure, including a similar tilting mechanism as FIG. 23B.

FIG. 24 illustrates part of a robot arm according to a fourteenth embodiment of the disclosure, including a similar tilting mechanism as FIG. 23B. FIG. 24 illustrates how the kinematics of the mechanics in FIG. 23B can be used also in the case when the first axis of rotation 180 is vertical (parallel with the Zw-axis) and when the first beam bearing 301 is mounted directly on the inner lever 19. Now a tilting beam 632, similar to the tilting beam 302 in FIG. 23, replaces the first outer link 23 in FIG. 23A and the second actuator 2 is used to rotate the tilting beam 632 via the inner lever 19, the joint 21, the link 20, the joint 22 and the seventh lever 501. A center axis 181b of the tool holder or tool shaft 311b is mounted to be parallel with the first axis of rotation 180 and therefore it will always be parallel with the Zw-axis as for a SCARA-type of robot. The kinematics of the mechanism controlled by the seventh lever 501 is the same as described in FIG. 23B, which means that the tool can for example fetch objects behind a pillar or complex wall. If the seventh lever 501 is mounted on the tilting beam 302 (in the figure on the outer ring of the first beam bearing 301, which is mounted on the tilting beam 632) as in FIG. 23B, the robot will have a so called backward bending feature, which means that the tool 44 can fetch objects both to the left and right of the plane defined by the links 15 and 18.

Figure 25:
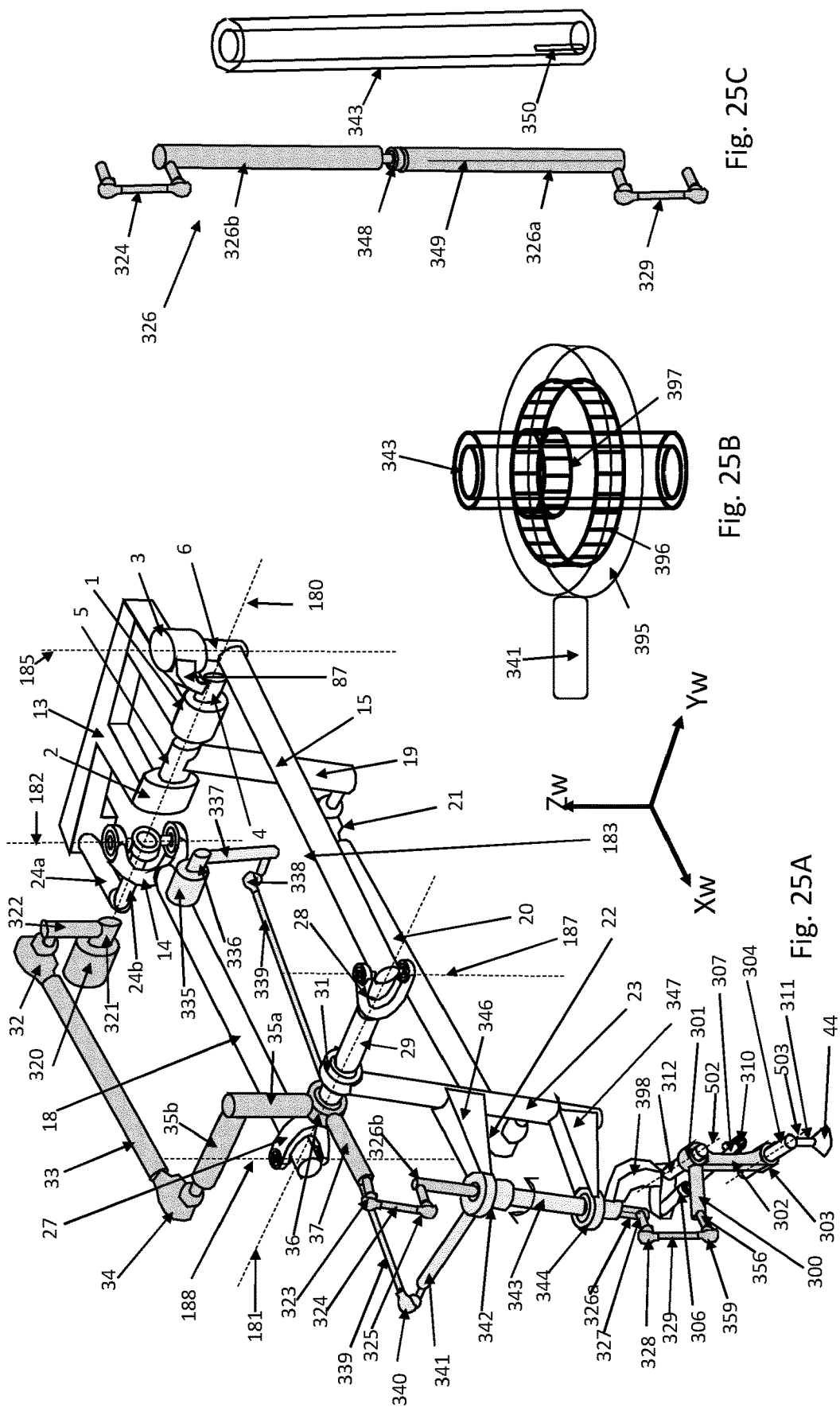
FIG. 25A illustrates a robot arm according to a sixteenth embodiment of the disclosure.
FIG. 25B schematically illustrates a compact gear according to some embodiments of the disclosure.
FIG. 25C illustrates a tilt mechanism according to some embodiments of the disclosure.

FIG. 25A illustrates a robot arm according to a sixteenth embodiment. In more detail, FIG. 25A illustrates the possibility to obtain both tilting and rotation of the tool 44 when using the mechanism described in FIG. 23B. For the clarity of the drawing, the link 20 is now working below the plane defined by the links 15 and 18, otherwise the base structure is the same as in FIG. 23A. The structure from the eleventh actuator 320 to the second lever 37 is also the same as in FIG. 23A. However, new concepts have been introduced to control the tilting mechanism of FIG. 23B. Thus, the tilting lever 300 is now connected to the second lever 37 via a link 329, a shaft mechanism 326 (326a-326b) and the link 324. The shaft 312 of the tilt mechanism is mounted via a bracket 398 on a tube 343, which is rotated by a first rotation amplifier 342. FIG. 25C illustrates a tilt mechanism according to some embodiments of the disclosure. The shaft mechanism 326 is shown in FIG. 25C. It comprises two shaft parts, a first shaft part 326a and a second shaft part 326b, connected by a bearing 348 with its rotation center coinciding with the coinciding centers of the shaft parts 326a and 326b. The shaft parts 326a and 326b are mounted to slide inside the tube 343 shown to the right in FIG. 25C. The first shaft part 326a has a cut 349 along its surface and the tube 343 has a tap 350 designed to run in the cut 349. Alternatively, there could instead be a cut along the lower part of the tube 343 and a tap on the first shaft part 326a. With this arrangement the first shaft part 326a will rotate with the tube 343. However, the second shaft part 326b will not rotate and can therefore be attached to the link 324. If the link 324 will not be able to avoid the second shaft part 326b from having some rotation, a rotation locking mechanism for the second shaft part 326b can be added above the tube 343. Now, looking at FIG. 25A, the second shaft part 326b is connected to the second lever 37 via a joint 325, the link 324 and a joint 323 and the first shaft part 326a is connected to the tilting lever 300 via a pin 327, a joint 328, the link 329, a joint 359 and a tenth lever 356. Thus, the eleventh actuator 320 will rotate the tilting lever 300 around the shaft 312 and tilt the tool 44 according to the kinematics in FIG. 23B. Thus, the eleventh actuator 320 rotates the tool 44 around two axes of rotation 502/503 of the type of a second axis of the tool, compare with FIG. 23A. A twelfth actuator 335 rotates a shaft 336, which rotates an eleventh lever 337, which will rotate a twelfth lever 341 via a joint 338, a link 339 and a joint 340. When the twelfth lever 341 rotates, the first rotation amplifier 342, which includes a transmission as for example the gear mechanism in FIG. 25B to make the tube 343 to rotate at a larger angle than the lever 341, will rotate the tube 343 and the tilting mechanism will rotate since it is mounted on the tube 343 via the bracket 398. Since the first shaft part 326a will rotate with the tube 343 according to the mechanism described with respect to FIG. 25C, the transmission 327-328-329-359-356 will follow the rotation of the tilt mechanism and the tilting will be independent of the rotation. The concept demonstrated in FIG. 25C will make it possible to obtain full tilting performance according to FIG. 23B in all directions. This will be very useful for picking or placing hanging or leaning objects. The rotation amplifier 342 can rely on different concepts including gears and or link structures. One example of a rotation amplifying link structure is a backhoe mechanism, for example according to the international patent application PCT/EP2020/063573. Thus, the twelfth actuator 335 rotates the tool 44 around a first axis of rotation 505 of the tool (see 505 in FIG. 26). Different gear concepts can of course be used. FIG. 25B schematically illustrates an example of a compact gear according to some embodiments of the disclosure. The twelfth lever 341 is mounted on a ring 395. The inside of the ring has gear teeth, which engage an inner gear 397, mounted on the tube 343.

Figure 26:
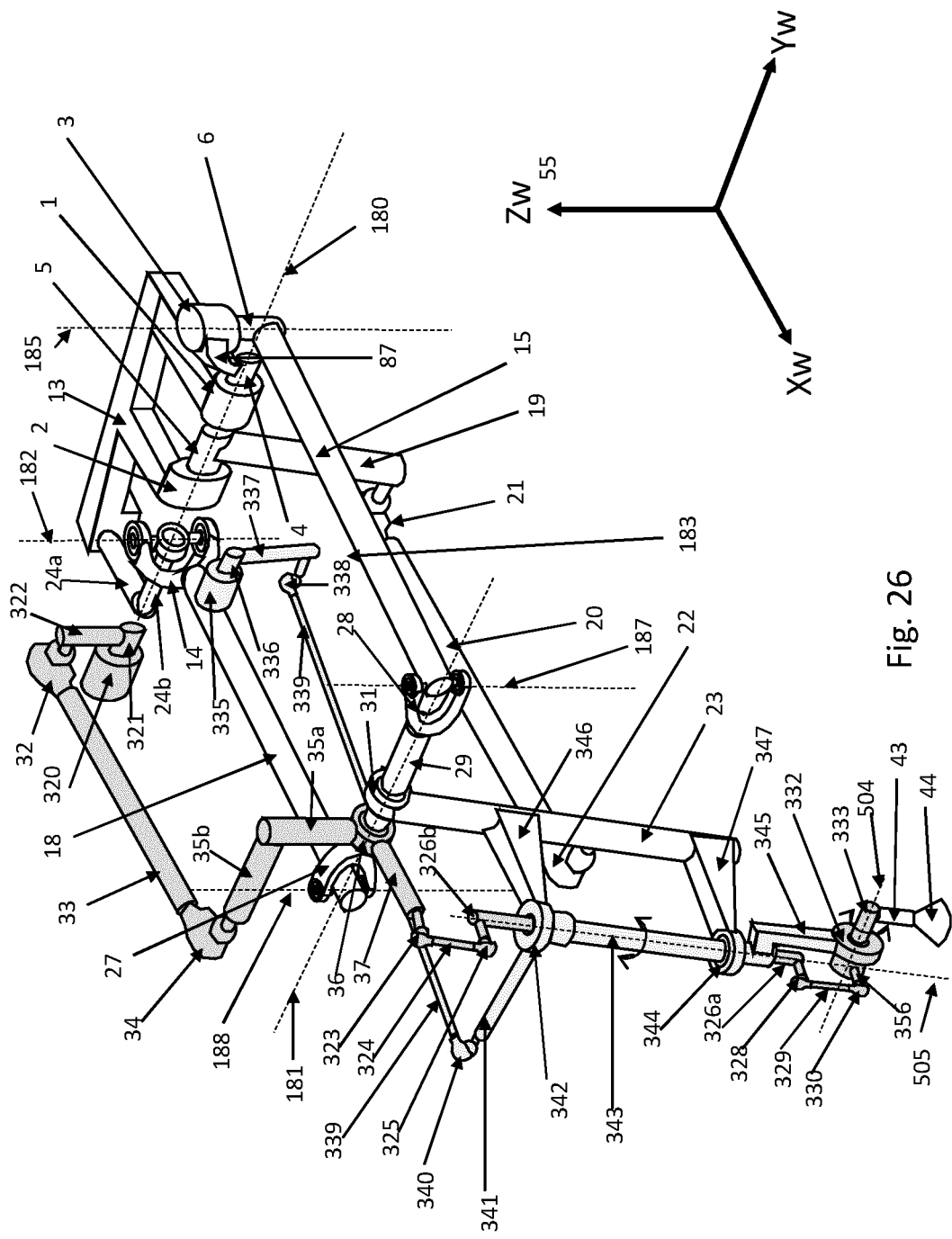
FIG. 26 illustrates a robot arm according to a seventeenth embodiment of the disclosure.
Figure 27:
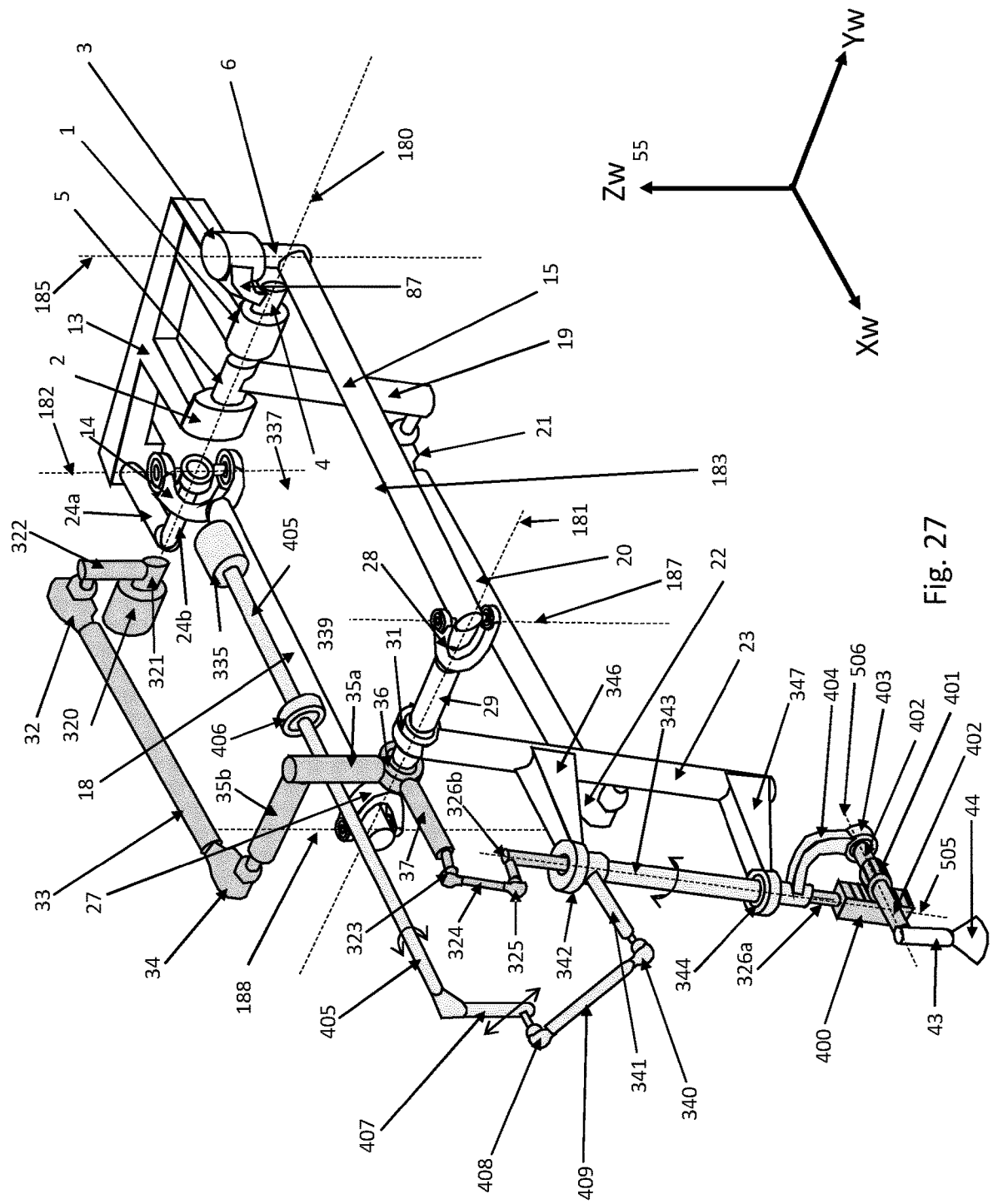
FIG. 27 illustrates a robot arm according to an eighteenth embodiment of the disclosure.

FIG. 26 illustrates a robot arm according to a seventeenth embodiment of the disclosure. In more detail, FIG. 26 illustrates the same main structure as in FIG. 23A but here the tilting mechanism from FIG. 23B has been replaced by a second rotation amplifier 332, which can be identical to the first rotation amplifier 342. Thus, the tenth lever 356, which engages the second rotation amplifier 332 is connected via the link 329 to the first shaft part 326a. Rotating the second lever 37 will rotate the tenth lever 356 as has according to the description of FIG. 25A and FIG. 25C. Rotating the tenth lever 356 will result in an amplified rotation of a shaft 333 and thereby the tool 44. The second rotation amplifier 332 is mounted on the tube 343 by means of a bracket 345. Rotating the twelfth lever 341 will thus rotate the first rotation amplifier 342 and because of the mechanism according to FIG. 25C, the first connection shaft 29 and the tenth lever 356 will follow the rotation and the tool 44 can independently be rotated around the shaft 333 and the tube 343. Thus, the eleventh actuator 320 rotates the tool 44 around a second axis of rotation 504. The twelfth actuator 335 rotates the tool 44 around a first axis of rotation 505. One advantage of this design in relation to the design in FIG. 25A is that higher rotation amplification can be obtained FIG. 27 illustrates a robot arm according to an eighteenth embodiment of the disclosure. In more detail, FIG. 27 shows one more way to use the concept in FIG. 25C to obtain tilting and rotation of the tool 44 independent of each other. Here a rack- and pinion solution is used with a rack 400 mounted directly on a shaft part 226a and a pinion 401 mounted on a shaft 401/402, which is mounted on a bearing 403. The bearing 403 is connected to the tube 343 via a bracket 404. Rotating the tube 343 will rotate both the rack and the pinion, and the tool 44 can be tilted in any direction by the rack and pinion arrangement. This figure also shows a different concept to engage the first rotation amplifier 342. The twelfth actuator 335 now rotates a shaft 405 parallel with the second inner link 18. The twelfth actuator 335 is mounted on the second inner link 18 and the shaft 405 is supported by a bearing 406, which is also mounted on the second inner link 18. A thirteenth lever 407 is mounted on the shaft 405 at an angle, for example 90 degrees, to obtain a swinging movement of the thirteenth lever 407. The thirteenth lever 407 engages the first rotation amplifier 342 by rotating the lever 341. The thirteenth lever 407 is connected to the twelfth lever 341 via a joint 408, a link 409 and the joint 340. Of course, this concept for engaging the first rotation amplifier 342 can be used also in the cases illustrated in FIG. 24A and FIG. 26. Thus, the eleventh actuator 320 rotates the tool 44 around a second axis of rotation 506. The twelfth actuator 335 rotates the tool 44 around a first axis of rotation 505.

Figure 28:
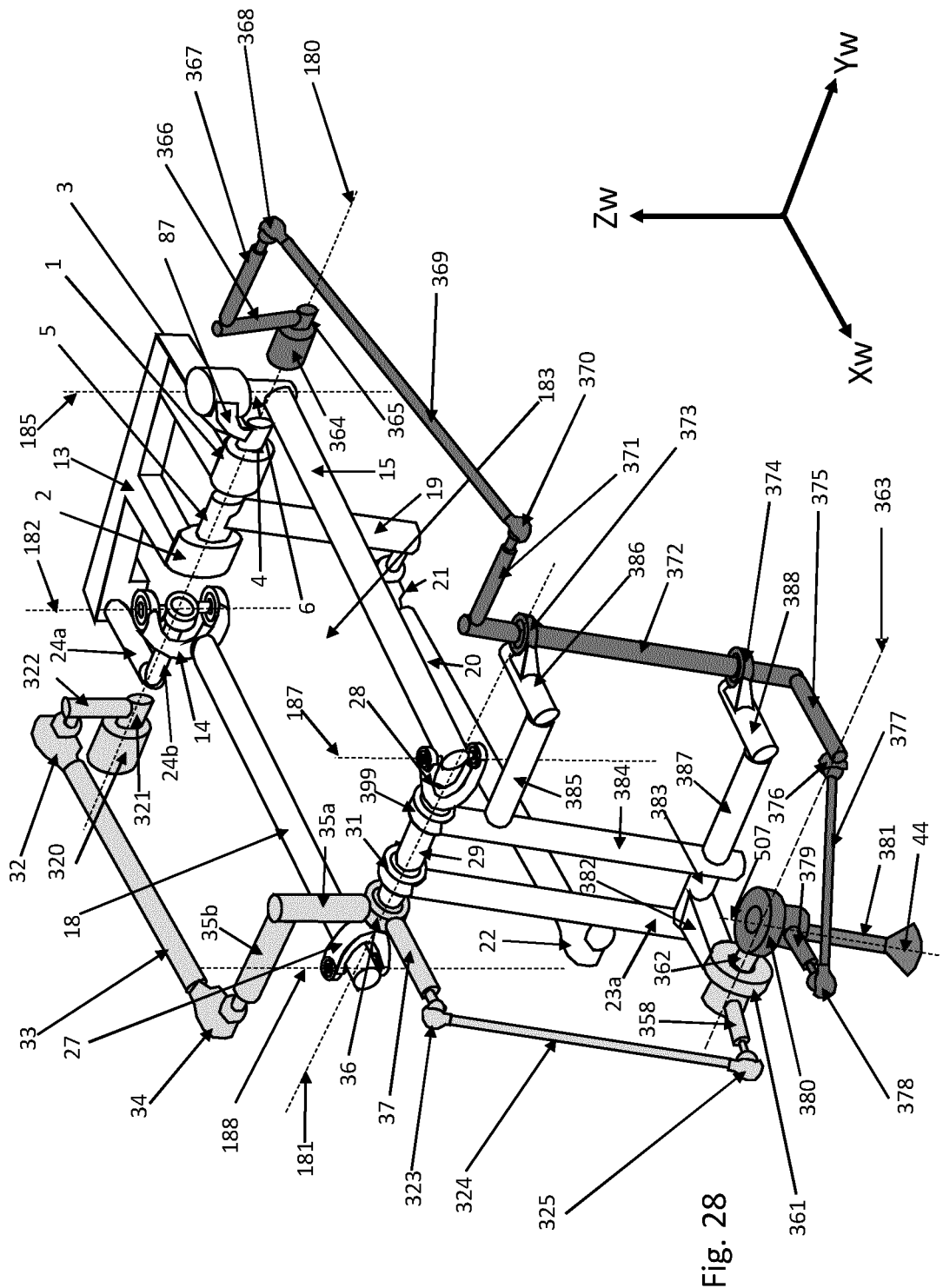
FIG. 28 illustrates a robot arm according to a nineteenth embodiment of the disclosure.

FIG. 28 illustrates a robot arm according to a nineteenth embodiment of the disclosure. In FIGS. 25A to 27 the rotation DOF is kinematically before the tilting DOF. FIG. 28 shows an example of the opposite case with tilting before rotation. A first rotation amplifier 361 rotates a second rotation amplifier 380 via a shaft 362. The first rotation amplifier 361 is mounted on a link 23a and a link 384 via a beam 382 and a beam 383. The link 384 is parallel with the link 23a and is mounted on the first connection shaft 29 with a bearing 399. The purpose of the link 384 is to make the mounting of the tool tilting and rotation structures more rigid. The eleventh actuator 320 will rotate the second lever 37 and via the joint 323, the link 324 and the joint 325, another lever 358 will rotate and thereby the shaft 362 and the second rotation amplifier 380. The second rotation amplifier 380 is engaged by a fourteenth lever 379, which is connected to a fifteenth lever 375 via a joint 378, a link 377 and a ball and socket joint 376. When the first rotation amplifier 361 rotates the second rotation amplifier 380 around an axis 363 (rotation axis of shaft 362), the joint 378 will make a circle around the axis 363. Since the ball and socket joint 376 is mounted close to the axis 363, the dependence of the rotation DOF on the tilting DOF will be weak. The fifteenth lever 375 is mounted on a shaft 372, which rotates in a bearing 373 and another bearing 374. The bearing 373 is mounted on the link 384 via a beam 385 and a beam 386 and the other bearing 374 is mounted on the link 384 via a beam 387 and a beam 388. The shaft 372 is rotated by a thirteenth actuator 364 via a shaft 365, a sixteenth lever 366, a distance beam 367, a joint 368, a link 369, a joint 370 and a seventeenth lever 371. Thus, rotating the shaft 365 will rotate a tool holder 381 and the tool 44 almost independent of the tilting obtained by engaging the first rotation amplifier 361 with the eleventh actuator 320. Hence, the eleventh actuator 320 rotates the tool 44 around a second axis of rotation 363. The thirteenth actuator 364 rotates the tool 44 around a first axis of rotation 507.

In FIGS. 25A, 26 and 17 the first rotation amplifier 342 is placed with an offset from the second axis of rotation 181, mainly to make the figures easier to understand. In order to obtain a larger working range of the transmission between the rotation of the eleventh lever 337 and the twelfth lever 341 with respect to the positional work space of the tool 44, the rotation amplifier should be as close to the second axis of rotation 181 as possible. In FIG. 28 the seventeenth lever 371 has thus been placed closer to the second axis of rotation 181. However, the transmission efficiency between the distance beam 367 and seventeenth lever 371 in FIG. 28 will still be low at the borders of the positional workspace of the tool 44.

Figure 29:
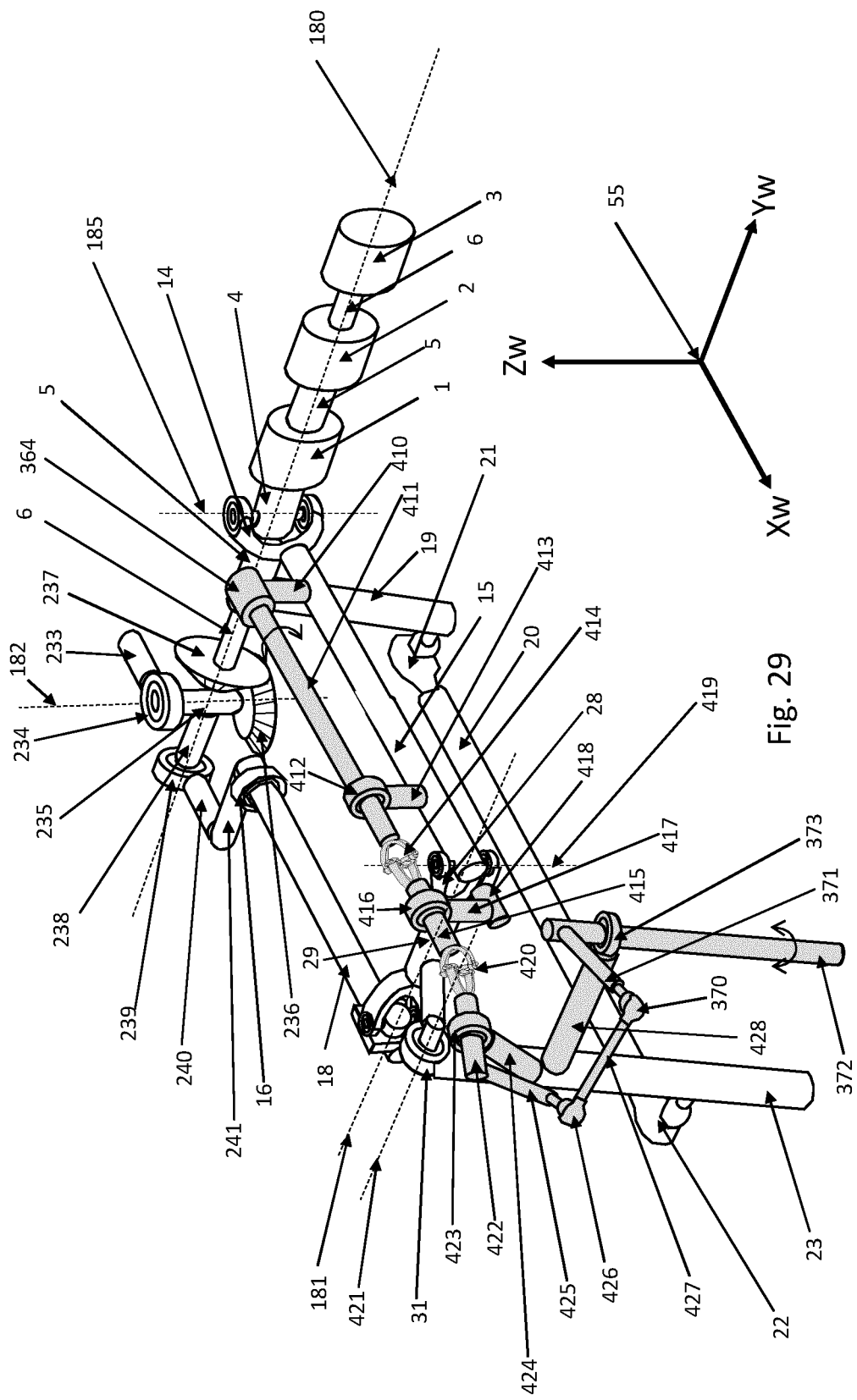
FIG. 29 illustrates a part of a robot arm according to a twentieth embodiment of the disclosure.

FIG. 29 illustrates a part of a robot arm according to a twentieth embodiment of the disclosure. In more detail, FIG. 29 illustrates one way to improve the transmission to the seventeenth lever 371 by means of a sixth cardan joint 414 and a seventh cardan joint 420. FIG. 29 is essentially the same as the part in FIG. 28, on which the transmission solution with the cardan joints 414 and 420 have been mounted. Thus, the thirteenth actuator 364 is mounted on the first inner link 15 via a distance beam 410. The thirteenth actuator 364 rotates a rotating shaft 411, which is mounted in a bearing 412. The bearing 412 is also mounted on the first inner link 15 via a distance beam 413. For maximum transmission efficiency the shaft 411 should be parallel with the first inner link 15. The sixth cardan joint 414 is mounted at the end of the end of the shaft 411 in such a way that the center of the sixth cardan joint 414 is on an axis of rotation 419. The axis of rotation 419 is the rotation axis of the joint 28. The output of the sixth cardan joint 414 rotates a shaft 415, which is mounted in a bearing 416. The bearing 416 is mounted via beams 417 and 418 on the part of the joint 28 that is mounted on the first connection shaft 29. Alternatively, the beams 417 and 418 can be directly mounted on the first connection shaft 29. The seventh cardan joint 420 is mounted on the shaft 415 and rotates a shaft 422. The seventh cardan joint 420 is mounted in such a way that its center is on an axis of rotation 421. The axis of rotation 421 is the rotation axis of the first connection bearing 31, around which the first outer link 23 rotates. The shaft 422 is mounted in a bearing 423, which is mounted on the first outer link 23 via a beam 424. An eighteenth lever 425 is mounted at a right angle on the shaft 422 and rotates the shaft 372 via a joint 426, a link 427, the joint 370 and the seventeenth lever 371. The shaft 372 (compare with FIG. 28) is mounted in the bearing 373, which in turn is mounted on the first outer link 23 via a beam 428. The effect of the sixth cardan joint 414 is that the rotation of the shaft 411 is transmitted to a shaft 415, whereby rotation of the first inner link 15 relative the shaft 29 around the rotation axis 419 will not have any influence on the rotation of the shaft 415. In the same way the seventh cardan joint 420 makes the transmission of the rotation of shaft 415 to the shaft 422 independent of the rotation of the first outer link 23. Thus, the transmission between the shaft 422 and the shaft 372 is independent of the position of the tool 44 (see FIG. 28) and besides using a transmission with a link 427, a 90 degree gear transmission (see for example FIG. 10) can be used. It should also be pointed out that it is possible to use a second transmission of the same type mounted on the second inner link 18 with a cardan joint corresponding to the sixth cardan joint 414 having its center on the rotation axis of the joint at the end of the second inner link 18. In this way it is possible to use the concept to simultaneously control 2 DOF for the rotation of the tool.

Figure 30:
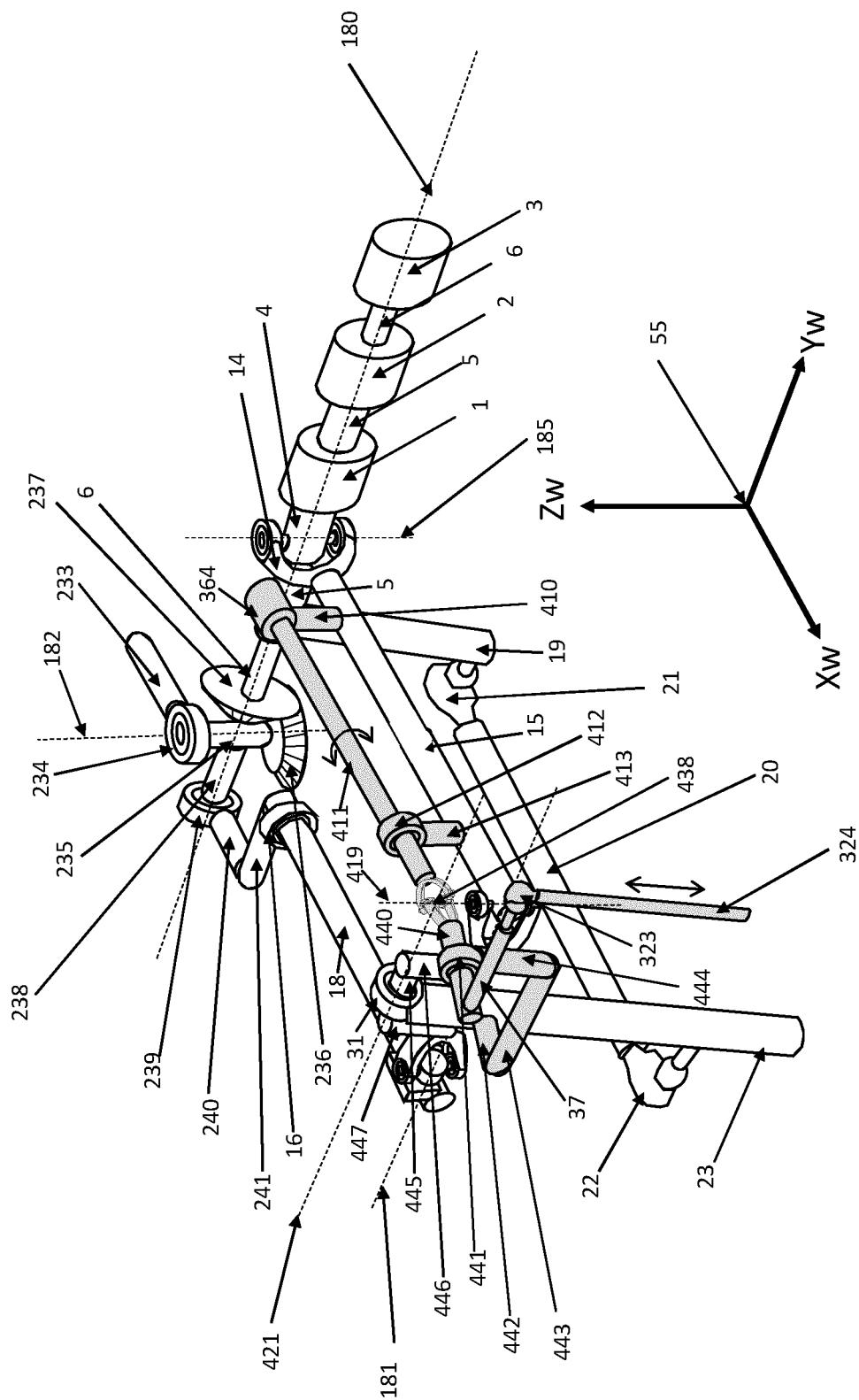
FIG. 30 illustrates a part of a robot arm according to a twenty-first embodiment of the disclosure.

FIG. 30 illustrates a part of a robot arm according to a twenty-first embodiment of the disclosure. In more detail, FIG. 30 illustrates how it is possible to obtain the same transmission functionality as in FIG. 29 with only one cardan joint if it is mounted in such a way that its center is where the axis of rotation 419 crosses axis of rotation 421. Thus, the first connection bearing 31 is now mounted in such a way that its center of rotation coincides with the center of an eight cardan joint 438. The first connection bearing 31 is now mounted on beams 446 and 447, which are mounted on the first connection shaft 29 (hidden in the figure, see instead for example FIG. 29, where the first connection shaft 29 is visible). A shaft 445 for the first connection bearing 31 is mounted between the beams 446 and 447, which are introduced to get the axis of rotation 421 to pass through the center of the eight cardan joint 438. The eight cardan joint 438 is mounted on the shaft 411 and drives a shaft 440. The shaft 440 is mounted on a bearing 441, which is mounted on the first outer link 23 via beams 442, 443 and 444. The second lever 37 is mounted at a right angle to the shaft 440 and moves the link 324 (compare for example with FIG. 27) up and down via the joint 323. As in FIG. 29 the shaft 411 is rotated by the thirteenth actuator 364 and goes through the bearing 412. Both the thirteenth actuator 364 and the bearing 412 are mounted on the first inner link 15 via distance beams 410 and 413 respectively. The advantage of the solution in FIG. 30 in relation to FIG. 29 is of course that only one cardan joint is needed, but the work space will be somewhat more limited when both links 15 and 23 are at their maximum angles simultaneously. As for the concept in FIG. 29, also in this case a second transmission of the same type can be mounted on second inner link 18.

Figure 31:
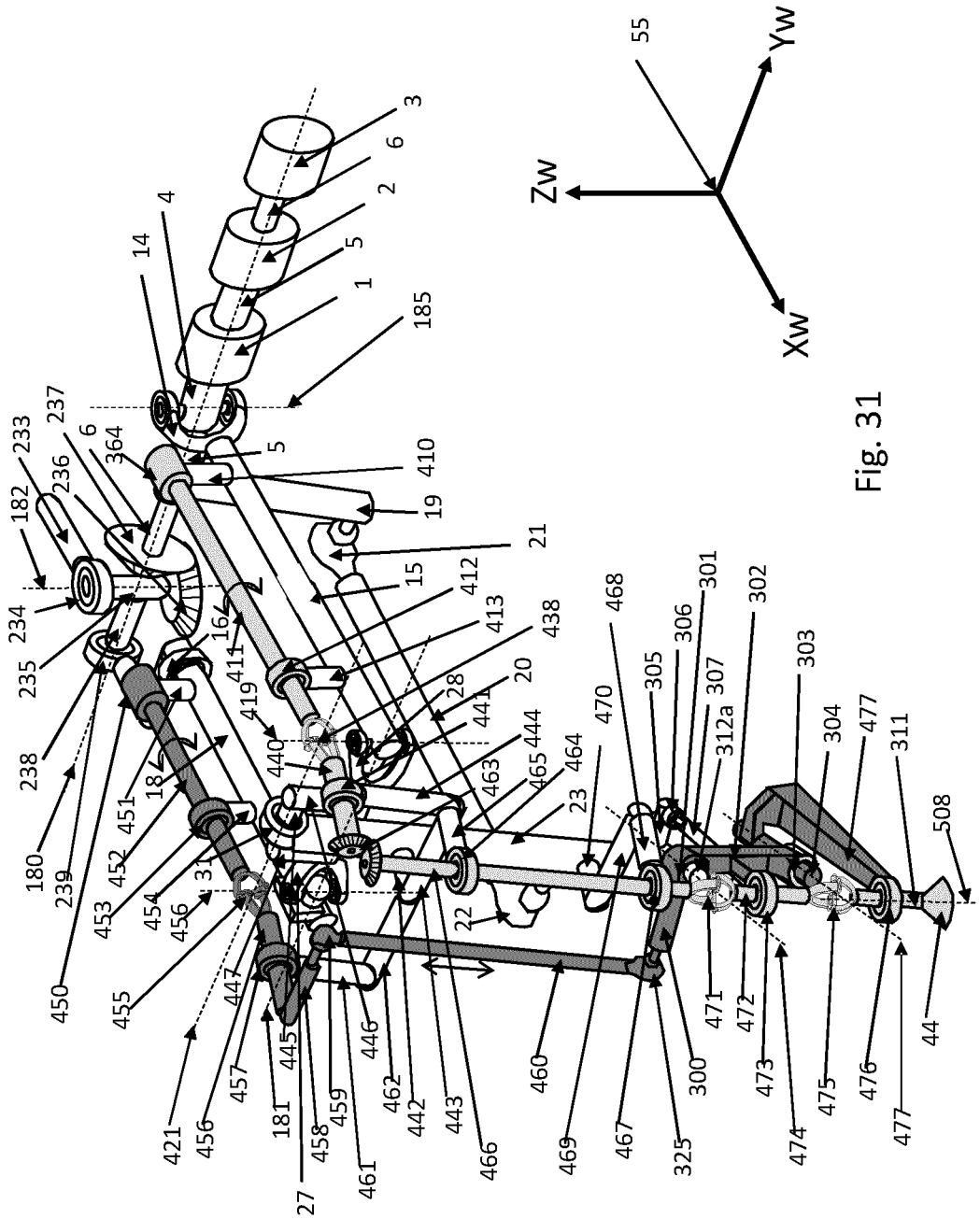
FIG. 31 illustrates a robot arm according to a twenty-second embodiment of the disclosure.

FIG. 31 illustrates a robot arm according to a twenty-second embodiment of the disclosure. In more detail, FIG. 31 illustrates how the tilting mechanism in FIGS. 23A and 23C can be used together with the transmission concept in FIG. 30 to obtain tool tilting together with infinite tool rotation. The basic structure with the actuated parallelogram formed by the links 15 and 18 is the same as in FIG. 30. In the same way as in FIG. 30, the thirteenth actuator 364 and the bearing 412 are mounted on the first inner link 15 by means of the distance beams 410 and 413, respectively, and the eight cardan joint 438 is mounted on the rotating shaft 411. The eight cardan joint 438 is mounted with its center of rotation in the crossing point of the axes of rotation 419 and 421. The axis of rotation 419 is the rotation axis of the bearings of the joint 28, which is mounted between the first inner link 15 and the first connection shaft 29 (not seen in the figure, see instead FIG. 29). The axis of rotation 421 is the rotation axis of the first connection bearing 31, on which the first outer link 23 is mounted. The first connection bearing 31 is mounted with an offset from the second axis of rotation 181 between the ends of the links 15 and 18. This offset is achieved by the beams 446 and 447, which are mounted on the joints 28 and 27 respectively. The first connection bearing 31 is mounted on a shaft 445 between the beams 446 and 447. The first outer link 23 can swing freely between the beams. The eight cardan joint 438 drives the shaft 440, which rotates in the bearing 441. The bearing 441 is mounted on the first outer link 23 via the beams 444, 443 and 442. An angular gear 463 is mounted on the shaft 440 and rotates a shaft 466. The shaft 466 is mounted in the bearings 464 and 467. The bearing 464 is mounted on the first outer link 23 via the beams 465, 443 and 442. The bearing 467 is mounted on the first outer link 23 via the beams 468, 469 and 470. A ninth cardan joint 471 is mounted on the lower end of the shaft 466 and is mounted in such a way that its center of rotation is on the rotation axis 474 of the first beam bearing 301 of the tilting mechanism. The ninth cardan joint 471 drives a shaft 472, which is mounted in the bearing 473. The bearing 473 is mounted on the tilting beam 302 of the tilting mechanism. Since the tilting beam 302 of the tilting mechanism swings not more than +/−50 degrees (see FIG. 23B) in relation to the first beam shaft 312a, which is mounted on the link 23, the range of the cardan joint angle is inside its working range. A tenth cardan joint 475 is mounted on the lower end to the shaft 472 and drives the tool shaft 311. The tenth cardan joint 475 is mounted to have its center of rotation on the rotation axis 477 of the second beam bearing 303 of the tilting mechanism. The tool shaft 311 is mounted in the bearing 476, which is mounted on the second beam shaft 304 of the tilting mechanism via the beam 477. Since the second beam shaft 304 of the tilting mechanism rotates not more than +/−50 degrees (see FIG. 23B) in relation to tilting beam 302, the range of the cardan joint angle is inside its working range. The tool 44 is mounted at the end of the tool shaft 311 and can thus be controlled to rotate by the thirteenth actuator 364 without any rotation angle limits.

To engage the tilting mechanism a similar transmission as on the first inner link 15 has been mounted on second inner link 18. Thus, a fourteenth actuator 450 rotates a shaft 452, which is mounted in the bearing 453. The fourteenth actuator 450 is mounted on the second inner link 18 via the offset beam 451 and the bearing 453 is mounted on the second inner link 18 with the offset beam 454. An eleventh cardan joint 455 is mounted on the left end of the shaft 452 in such a way that the center of the eleventh cardan joint 455 is in the crossing point between the axes of rotation 421 and 456. The axis of rotation 421 is defined by the rotation axis of the first connection bearing 31 and the axis of rotation 456 is defined by the rotation axis of the joint 27. The eleventh cardan joint 455 drives the shaft 456, which rotates in the bearing 457. The bearing 457 is mounted on the first outer link 23 via the beams 461, 462 and 442. A nineteenth lever 458 is mounted on the shaft 456 and engages the tilting mechanism via the joint 459, the link 460, the joint 325 and the tilting lever 300. Rotating the shaft 452 by fourteenth actuator 450 will thus engage the tilting mechanism according to FIG. 23B. When the tilting mechanism tilts the tool 44, the rotation mechanism with the cardan joints 471 and 475 will transmit a rotation to the tool 44 independent on the tilting angle. Thus, the fourteenth actuator 450 rotates the tool 44 around two axes of rotation 474/477, which are of the type of second axis of rotation of the tool. The thirteenth actuator 364 rotates the tool 44 around a first axis of rotation 508 of the tool.

FIG. 32 illustrates a robot arm according to a twenty-third embodiment of the disclosure. In more detail, FIG. 32 illustrates the possibility to use the transmission concept of FIGS. 30 and 31 to rotate a tool having the basic structure shown in FIG. 23A. FIG. 32 also illustrates the possibility to mount the shaft 411 below the first inner link 15, which will give more space around the joint 28. The upper structure with the actuated parallelogram formed by the links 15 and 18 and the linkage to control the tilting angle of the tool is the same as in FIG. 23A. The tilting of the tool is made around an axis of rotation 480, which is the axis of rotation of a bearing 483, mounted on the first outer link 23 via a beam 484. Eleventh actuator 320 makes the second lever 37 to rotate around the second axis of rotation 181 and via a link 324 beams 481, 482 and 485 are actuated to rotate (tilt) around the axis 480. To rotate the tool 44 independent of the tilting, a cardan joint is mounted on the shaft 466 in such a way that the joint center is on the axis 480. The tenth cardan joint 475 is actuated by the thirteenth actuator 364, mounted on the distance beam 410 below the first inner link 15. The actuator rotates a shaft 411, which is mounted in a bearing 412. The bearing 412 is mounted on the lower side of the link with the distance beam 413. The eight cardan joint 438 is mounted on the end of the shaft 411 with the center of the eight cardan joint 438 placed in the cross formed between the axes of rotation 187 and 421. The axis 187 is defined by the rotation axis of the bearings in the joint 28 and the axis 421 is defined by the rotation axis of the first beam bearing 301, on which the first outer link 23 is mounted. As can be seen the axis of rotation 421 is now below second axis of rotation 181 to make it possible to have the shaft 411 below the first inner link 15 and thus the eight cardan joint 438 below the joint 28. To have the axis of rotation 421 below second axis of rotation 181, vertical beams 493 and 494 are introduced. These are mounted on the first connection shaft 29, which has a gap between the mounting points of the beams 493 and 494 (as in FIG. 31, but it is not that evident in FIG. 31 as in FIG. 32). If the joint 22 of the link 20 is mounted directly on the first outer link 23 instead of on the tilting lever 300 and if the link preferably is then working below the parallelogram including the links 15 and 18, the gap in the first connection shaft 29 is not needed in the design of FIG. 32, which could mean a more rigid design. The beams 493 and 494 according to FIG. 32 are thus in their upper end mounted on the parts of first connection shaft 29 and in the other end they are mounted on a shaft 492, on which the first beam bearing 301 rotates. The eight cardan joint 438 drives the angular gear 463. The input gear wheel is mounted on the shaft 440, which rotates in the bearing 441. The bearing 441 is mounted on this side of the gear in order to get the shaft 466 to be as close as possible the plane defined by the axes of rotation 421 and 181, whereby the working range of the tenth cardan joint 475 will be as symmetric as possible around the vertical direction of the tool shaft 311. The bearing 441 is mounted on the first outer link 23 via beams 488, 489, 490 and 491. The output gear wheel of the angular gear 463 is mounted on the shaft 466, which rotates in the bearings 464 and 467. The bearing 464 is mounted on the first outer link 23 via the beams 490 and 491 and the bearing 467 is mounted on the first outer link 23 via the beams 486 and 487. Of course, the first beam bearing 301 for the first outer link 23 should be mounted close to the joint 187 not to need the long beams 485, 486 and 490. The beam 484 is used to compensate for the offset between the shaft 466 and the plane defined by the axes of rotation 181 and 421. Instead it is possible to mount a shaft 499 to tilt towards the plane of axes of rotation 181 and 421. There are of course many ways to make modifications of the design, for example, the second connection bearing 36 can be mounted on the shaft 492 instead of the first connection shaft 29. Now, rotating the shaft 466 will thus rotate the tenth cardan joint 475, which in turn will rotate the tool shaft 311. When the link 324 via the joint 325 rotates the beams 481, 482 and 485 around the rotation axis 480 of the bearing 483, the tool shaft and thus the tool 44 will tilt while the tenth cardan joint 475 will rotate the tool 44. Of course, also in this case as in FIG. 31, a rotating transmission with the shaft 452 as in FIG. 31 can be used instead of the transmission including the inner link 33 in this figure. Thus, the eleventh actuator 320 rotates the tool 44 around a second axis of rotation 480 of the tool. The thirteenth actuator 364 rotates the tool 44 around a first axis of rotation 508 of the tool.

The axes of rotation 186, 505, 507 and 508 may each be referred to as a first axis of rotation of the tool 44. The axes of rotation 226, 363, 474/477, 480, 501, 502/503, 504, 506, 509, 510, 511 and 700 may each be referred to as a second axis of rotation of the tool 44.

The present disclosure is not limited to the above-described preferred embodiments. Various alternatives, modifications and equivalents may be used. Therefore, the above embodiments should not be taken as limiting the scope of the disclosure.

The invention claimed is:

1. A robot arm for positioning a tool, comprising:
   an inner-arm linkage;
   an outer-arm linkage;
   a first actuator configured to rotate the inner-arm linkage about a first axis of rotation;
   wherein the inner-arm linkage:
   (a) includes a first inner link having a first inner end, that, at the first inner end, is arranged to rotate around a fourth axis of rotation, and a second inner link having a second inner end, that, at the second inner end is arranged to rotate around a different, third axis of rotation, wherein the third and fourth axes of rotation are perpendicular to the first axis of rotation, and rotations around the first, third, and fourth axes of rotation result in a geometric reconfiguration of the inner-arm linkage;
   (b) includes a connection shaft mounted at an outer end of the first inner link and at an outer end of the second inner link, by means of joints of at least one degree of freedom; and
   (c) is connected to the outer-arm linkage via the connection shaft; and
   wherein the outer-arm linkage is pivotably arranged to rotate around a second axis of rotation that is parallel or aligned with the connection shaft, and is connected to the tool, thereby forming a first kinematic chain from the first actuator to the tool, which gives a first degree of freedom for positioning the tool;
   a second actuator configured to rotate the outer-arm linkage around the second axis of rotation, thereby forming a second kinematic chain from the second actuator to the tool, which gives a second degree of freedom for positioning the tool; and
   a third actuator configured to move the outer-arm linkage by actuating the geometrically reconfigurable inner-arm linkage, resulting in a movement of the second axis of rotation around which the outer-arm linkage is arranged to rotate, thereby forming a third kinematic chain from the third actuator to the tool, which gives a third degree of freedom for positioning the tool;
   wherein the robot arm further comprises one or more transmission mechanisms that, in combination with the outer-arm linkage, are arranged to accomplish controlled orientation of the tool, wherein the one or more transmission mechanisms comprise:
   (i) one or more levers configured to transform a rotation to a translation, or a translation to a rotation; and
   (ii) one or more links comprising an inner link having a kinematic length between its axes of rotation equal to a kinematic length of the first inner link between its axes of rotation, wherein an outer link of the one or more links and the outer-arm linkage are parts of a second kinematic parallelogram.

2. The robot arm according to claim 1, wherein the first inner link and the second inner link of the inner-arm linkage are parts of a first kinematic parallelogram.

3. The robot arm according to claim 2, wherein the first kinematic parallelogram is configured to rotate around the first axis of rotation.

4. The robot arm according to claim 2, wherein the outer-arm linkage is configured to be rotated with one degree of freedom in a second plane perpendicular to a first plane of the first kinematic parallelogram.

5. The robot arm according to claim 1, wherein the second kinematic chain comprises a lever mechanism and at least one link, wherein the at least one link connects the lever mechanism to the outer arm linkage, and wherein the second actuator is configured to rotate the outer-arm linkage by actuating the lever mechanism.

6. The robot arm according to claim 1, wherein one of the one or more transmission mechanisms is arranged for rotating the tool around a first axis of rotation of the tool.

7. The robot arm according to claim 6, wherein another one of the one or more transmission mechanisms is arranged for rotating the tool around a second axis of rotation of the tool, the second axis of rotation of the tool being non-parallel to the first axis of rotation of the tool.

8. The robot arm according to claim 1, further comprising one or more additional actuators, each of the one or more additional actuators being configured to control an axis of rotation of the tool via one of the one or more transmission mechanisms, and wherein the one or more transmission mechanisms comprise one or more of a link transmission, a backhoe transmission, a gear wheels transmission, a belt transmission, a rotating shaft transmission, and a cardan joint transmission, connecting one of the one or more actuators with the tool.

9. The robot arm according to claim 8, wherein the one or more transmission mechanisms comprises one or more belt transmissions.

10. The robot arm according to claim 8, wherein at least one of the belt transmissions is connected in series with at least one cardan joint.

11. The robot arm according to claim 1, wherein one of an inner link and an inner transmission of at least one of the one or more transmission mechanisms is parallel with the first inner link and the second inner link, and one of an outer link and an outer transmission of at least one of the one or more transmission mechanisms is parallel with an outer arm of the outer arm linkage.

12. The robot arm according to claim 1, wherein at least one of the first inner link and the second inner link is configured to rotate around a fifth axis of rotation that is fixed to a base and is aligned with the first axis of rotation.

13. The robot arm according to any claim 1, wherein the second axis of rotation is parallel with the first axis of rotation.

14. The robot arm according to claim 1, wherein the one or more transmission mechanisms comprises one or more cardan joints, and wherein the one or more cardan joints are mounted in such a way that each cardan joint has a joint center that is on a cardan joint center axis defined by at least one of a center line of a shaft and an axis of rotation of a bearing.

15. The robot arm according to claim 1, wherein the one or more transmission mechanisms comprises a tilting mechanism including:
- a tilting lever;
- a tilting beam with a first beam bearing in a first end of the tilting beam and a second beam bearing in an opposed second end of the tilting beam;
- a first beam shaft mounted in the first beam bearing;
- a second beam shaft mounted in the second beam bearing, and wherein the first beam shaft is mounted on the first outer link of the outer arm linkage, the second beam shaft is connected to the tool; and
- a link connected between the first beam shaft and the second beam shaft via a bearing at each end of the link, wherein the tilting mechanism is configured to transfer a tilting movement of the tilting lever to a correspondingly increased tilting movement of the tool.

16. The robot arm according to claim 1, wherein the one or more transmission mechanisms comprises a shaft mechanism including:
- a first shaft part and a second shaft part connected by a bearing with a center of rotation coinciding with center lines of the first and second shaft parts;
- a tube configured to rotate; and
- wherein the first and second shaft parts and the bearing are mounted to slide inside the tube, wherein one of the first and second shaft parts is arranged to follow the rotation of the tube.

17. The robot arm according to claim 1, wherein the one or more transmission mechanisms comprises a rotating shaft mounted above one of the first inner link and the second inner link, and wherein the rotating shaft is configured to rotate at least one cardan joint.

18. The robot arm according to claim 1, wherein the one or more transmission mechanisms comprises a rotating shaft mounted under one of the first inner link and the second inner link, and wherein the rotating shaft is configured to rotate at least one cardan joint.

19. A robot arm for positioning a tool, comprising:
an inner-arm linkage;
an outer-arm linkage;
a first actuator configured to rotate the inner-arm linkage about a first axis of rotation;
wherein the inner-arm linkage:
(a) includes a first inner link having a first inner end, that, at the first inner end, is arranged to rotate around a fourth axis of rotation, and a second inner link having a second inner end, that, at the second inner end is arranged to rotate around a different, third axis of rotation, wherein the third and fourth axes of rotation are perpendicular to the first axis of rotation, and rotations around the first, third, and fourth axes of rotation result in a geometric reconfiguration of the inner-arm linkage;
(b) includes a connection shaft mounted at an outer end of the first inner link and at an outer end of the second inner link, by means of joints of at least one degree of freedom; and
(c) is connected to the outer-arm linkage via the connection shaft; and
wherein the outer-arm linkage is pivotably arranged to rotate around a second axis of rotation that is parallel or aligned with the connection shaft, and is connected to the tool, thereby forming a first kinematic chain from the first actuator to the tool, which gives a first degree of freedom for positioning the tool;
a second actuator configured to rotate the outer-arm linkage around the second axis of rotation, thereby forming a second kinematic chain from the second actuator to the tool, which gives a second degree of freedom for positioning the tool; and
a third actuator configured to move the outer-arm linkage by actuating the geometrically reconfigurable inner-arm linkage, resulting in a movement of the second axis of rotation around which the outer-arm linkage is arranged to rotate, thereby forming a third kinematic chain from the third actuator to the tool, which gives a third degree of freedom for positioning the tool;
wherein one of an inner link and an inner transmission of at least one of the one or more transmission mechanisms is parallel with the first inner link and the second inner link, and one of an outer link and an outer transmission of at least one of the one or more transmission mechanisms is parallel with an outer arm of the outer arm linkage.

20. A robot arm for positioning a tool, comprising:
an inner-arm linkage;
an outer-arm linkage;
a first actuator configured to rotate the inner-arm linkage about a first axis of rotation;
wherein the inner-arm linkage:
(a) includes a first inner link having a first inner end, that, at the first inner end, is arranged to rotate around a fourth axis of rotation, and a second inner link having a second inner end, that, at the second inner end is arranged to rotate around a different, third axis of rotation, wherein the third and fourth axes of rotation are perpendicular to the first axis of rotation, and rotations around the first, third, and fourth axes of rotation result in a geometric reconfiguration of the inner-arm linkage,
(b) includes a connection shaft mounted at an outer end of the first inner link and at an outer end of the second inner link, by means of joints of at least one degree of freedom, and
(c) is connected to the outer-arm linkage via the connection shaft; and
wherein the outer-arm linkage is pivotably arranged to rotate around a second axis of rotation that is parallel or aligned with the connection shaft, and is connected to the tool, thereby forming a first kinematic chain from the first actuator to the tool, which gives a first degree of freedom for positioning the tool;
a second actuator configured to rotate the outer-arm linkage around the second axis of rotation, thereby forming a second kinematic chain from the second actuator to the tool, which gives a second degree of freedom for positioning the tool;
a third actuator configured to move the outer-arm linkage by actuating the geometrically reconfigurable inner-arm linkage, resulting in a movement of the second axis of rotation around which the outer-arm linkage is arranged to rotate, thereby forming a third kinematic chain from the third actuator to the tool, which gives a third degree of freedom for positioning the tool; and
one or more transmission mechanisms that, in combination with the outer-arm linkage, are arranged to accomplish controlled orientation of the tool, wherein the one or more transmission mechanisms comprise one or more cardan joints, each of the cardan joints being mounted so as to have a joint center on a cardan joint center axis defined by at least one of a center line of a shaft and an axis of rotation of a bearing.

* * * * *